US012582986B2

United States Patent
Clark et al.

(10) Patent No.: US 12,582,986 B2
(45) Date of Patent: Mar. 24, 2026

(54) DEVICES AND SYSTEMS FOR ISOLATING PARTICLES IN SOLUTION BY PARTICLE PERMITTIVITY

(71) Applicant: SIGIL BIOSCIENCES, INC., Del Mar, CA (US)

(72) Inventors: Iryna Clark, Del Mar, CA (US); Rajaram Krishnan, Del Mar, CA (US)

(73) Assignee: SIGIL BIOSCIENCES, INC., Del Mar, CA (US)

(*) Notice: Subject to any disclaimer, the term of this patent is extended or adjusted under 35 U.S.C. 154(b) by 0 days.

(21) Appl. No.: 19/318,272

(22) Filed: Sep. 3, 2025

(65) Prior Publication Data

US 2026/0001074 A1 Jan. 1, 2026

Related U.S. Application Data

(63) Continuation of application No. 19/113,822, filed as application No. PCT/US2023/074936 on Sep. 22, 2023.

(60) Provisional application No. 63/376,687, filed on Sep. 22, 2022.

(51) Int. Cl.
*B01L 3/00* (2006.01)

(52) U.S. Cl.
CPC ..... *B01L 3/502715* (2013.01); *B01L 3/50273* (2013.01); *B01L 3/502707* (2013.01); *B01L 2200/10* (2013.01); *B01L 2300/0645* (2013.01); *B01L 2300/0663* (2013.01); *B01L 2300/0816* (2013.01); *B01L 2300/16* (2013.01)

(58) Field of Classification Search
CPC ........... B01L 3/502715; B01L 3/50273; B01L 3/502707; B01L 2200/10; B01L 2300/0645; B01L 2300/0663; B01L 2300/0816; B01L 2300/16
See application file for complete search history.

(56) References Cited

U.S. PATENT DOCUMENTS

| | | | | |
|---|---|---|---|---|
| 2004/0022677 | A1* | 2/2004 | Wohlstadter ......... | G01N 21/253 422/52 |
| 2004/0228770 | A1 | 11/2004 | Gandhi et al. | |
| 2011/0117580 | A1 | 5/2011 | Campbell et al. | |
| 2012/0211373 | A1 | 8/2012 | El-Sayed et al. | |
| 2015/0298124 | A1 | 10/2015 | Fischer et al. | |
| 2018/0080932 | A1 | 3/2018 | Goldberg et al. | |
| 2018/0272296 | A1 | 9/2018 | Link et al. | |
| 2019/0143321 | A1 | 5/2019 | Delamarche et al. | |
| 2020/0070167 | A1 | 3/2020 | Raillon et al. | |
| 2020/0369536 | A1 | 11/2020 | Motkuri et al. | |

(Continued)

FOREIGN PATENT DOCUMENTS

WO WO-2018009892 A1 * 1/2018 ............. B03C 5/005

OTHER PUBLICATIONS

International Search Report and Written Opinion for PCT App No. PCT/US2023/074936, mailed Jan. 8, 2024, 16 pgs.

(Continued)

*Primary Examiner* — Jennifer Wecker
*Assistant Examiner* — Jonathan Bortoli
(74) *Attorney, Agent, or Firm* — Procopio, Cory, Hargreaves & Savitch LLP

(57) ABSTRACT

Provided herein are electrohydrodynamic devices, systems, and methods configured to isolate of one or more particles of varying size and dielectric properties.

27 Claims, 27 Drawing Sheets

(56) References Cited

U.S. PATENT DOCUMENTS

| | | | |
|---|---|---|---|
| 2020/0378925 A1 | 12/2020 | Yanik et al. | |
| 2021/0146378 A1 | 5/2021 | Hinestrosa Salazar et al. | |
| 2022/0291111 A1 | 9/2022 | Nassef et al. | |

OTHER PUBLICATIONS

International Preliminary Report on Patentability for PCT App No. PCT/US2023/074936, mailed Mar. 1, 2025, 13 pgs.

* cited by examiner

DEVICES AND SYSTEMS FOR ISOLATING PARTICLES IN SOLUTION BY PARTICLE PERMITTIVITY

CROSS-REFERENCE

This application is continuation of U.S. application Ser. No. 19/113,822, filed Mar. 20, 2025, which is a National Stage of International Application No. PCT/US2023/074936, filed Sep. 22, 2023, which claims the benefit of U.S. Provisional Application No. 63/376,687, filed Sep. 22, 2022, which is incorporated by reference in its entirety.

BACKGROUND

Cell-derived and synthetic particles have been commercially used in life sciences for multiple applications e.g., drug discovery, disease biomarkers, drug nanocarriers, and others. These particles may be naturally occurring or engineered and can be characterized as, for example: cells, extracellular vesicles, cell-death bodies, organic polymers, synthetic nanovesicles or coated particles. Technological advancements in the field of particle manipulation and related applications are needed to further improve efficiencies of drug discovery or diagnostic development platforms.

SUMMARY

Provided in various embodiments herein are devices, systems, and methods suitable for isolating particles, such as from complex composition (e.g., biological fluids, etc.). In some embodiments, devices, systems, and methods provided herein allow for the isolation of single or multiple distinct particle types. Moreover, in some instances, such devices, systems, and methods provided herein are suitable for isolating such particles with high efficiency, high selectivity, or both. In some embodiments, the disclosure provided herein describes devices, systems, and methods to isolate one or more particles and/or one or more plurality of particles (e.g., membrane-bound particle). In specific instances, such particles can be isolated from complex fluids with minimal artifact (e.g., isolating only target particles with minimal accompanying particles not intended to be isolated). The methods described and implemented in by the systems and devices, described elsewhere herein, may be referred to as D.A.S.H. method. In certain embodiments, a D.A.S.H. method or system provided herein is one that involves a dielectric (D), alternating current (A), strictive(S), hydrodynamic (H) method, such as whereby permittivity of one or more particles is altered. In some instances, (e.g., D.A.S.H.) methods and systems provided herein are used for and/or facilitate high efficiency and/or selective isolation and/or collection of particles (e.g., single particle types or multiple distinct particle types). In some embodiments, the disclosure provided herein describes devices and/or systems that manipulates the relative permittivity of one or more particles suspended in a solution. In some instances, by increasing the relative permittivity of the one or more particles, methods, devices, and/or systems such as those disclosed herein may isolate, sort, capture, and/or elute the one or more particles using electrostrictive hydrodynamic forces.

Aspects of the disclosure comprise an electro fluidic device, comprising: a chip electrically coupled with at least one electrode attached to a surface of the chip, wherein the at least one electrode is coated, and wherein the coating provides an increase of at least 5% of a capture area of the surface where one or more particles of a fluid sample are isolated relative to a similar electrode under similar conditions without the coating when the fluid sample is transported across the surface. In some embodiments, the surface comprises a surface of a flow cell. In some embodiments, the flow cell comprises one or more microfluidic channels. In some embodiments, the coating comprises agarose, polyacrylamide, acrylamides, N-substituted acrylamides, N-substituted methacrylamides, methacrylamide chitosan, alginate, collagen, cellulose acetate, cellulose acetate butyrate, cellulose acetate phthalate, sol-gels, metal oxides, metal alkoxides, metal chlorides, organics nanoparticles, ceramic nanoparticles, conductive particles, semi-conductive particles, insulative nanoparticles, aerogels, xerogels, xylogels, cryogels, carbogels, subgels, silicone hydrogels, conjugated polymers, polypyrrole (Ppy), polyethylene, polyaniline, polythiophene derivatives, poly(3,4-ethylenedioxythiophene) doped with poly(styrene sulfonate) (PEDOT:PSS), acrylamide based polymer, polythiophene based polymer, vinyl based polymer, any derivatives thereof, or any combination thereof. In some embodiments, the coating comprises one or more particles. In some embodiments, the one or more particles comprise a diameter from about 1 nanometer to 5 millimeters. In some embodiments, the dielectric particles comprise polarizable particles with a relative permittivity range of 100 to 500,000,000 when measured at 1 kHz using conventional measuring methods. In some embodiments, the dielectric particles comprise particles with a relative permittivity range of 100,000 to 10,000,000 when measured at 1 kHz using conventional measuring methods. In some embodiments, the dielectric particles comprise particles with a relative permittivity range of 100 to 1,000,000 when measured at 1 kHz using conventional measuring methods. In some embodiments, the dielectric particles comprise particles with a relative permittivity range of 1,000 to 100,000 when measured at 1 kHz using conventional measuring methods. In some embodiments, the one or more particles comprise dielectric particles that can be electrically conductive particles, electrically semi-conductive particles, electrically insulative particles, or a combination thereof. In some embodiments, the conductive particles comprise conductive inks, liquid metals, charged polymer R groups, graphene, metallic nanoparticles (e.g., gold, silver, copper, aluminum, platinum, rhodium, etc.), polyacrylic acid, silicone hydrogels, conjugated polyelectrolytes, PEDOT-S, PTHS, p(g2T-TT), p(gNDI-g2T), NIPAM, PEDOT:PSS/guar slime (PPGS), ethylene glycol, poly ethylene glycol (PEG), any derivative thereof, or any combination thereof. In some embodiments, the conductive particles increase an electric field emitted by the at least one electrode by at least about 5%, at least about 10%, at least about 15%, at least about 20%, or at least about 25%. In some embodiments, the semi-conductive particles comprise semi-conductive inks, carbon, graphene, silicon, germanium, tin, selenium, tellurium, lead, boron, gallium, gallium arsenide, and oxide forms thereof, any derivative thereof, or any combination thereof. In some embodiments, the dielectric particles comprise dielectric insulative particles. In some embodiments, the dielectric insulative particles comprise insulative inks, dielectric inks, indium tin oxide, poly 2-hydroxyethylmeth acrylate, (pHEMA), polystyrene, polypropylene, conjugated polymer PVDF,conjugated polymers, conjugated co-polymers, polymers/copolymers—P(VDF-CTFE), P(VDF-TrFE), P(VDF-TrFE-CTFE), P(TFE-HFP), (PVDF-g-HEMA)], PARQ copolymers, phthalocyanines (cuPc, FePc), PTTEMA/PS, polythiourea blends, PNIPam, ceramic nanoparticles, polymer and ceramic particle blends, polymer and metal particle blends, ceramics, metal oxides, graphene oxide, silica beads, silicon dioxide, borosilicate, natural rubber beads, silicone rubber beads, 4-acryloylmorpholine (ACMO), 2-ethylhexyl acrylate (2-EHA), any derivates thereof, or any combination thereof. In some embodiments, the dielectric particles increase the surface area where the one or more particles of the fluid sample are isolated by at least about 5%, at least about 10%, at least about 15%, or at least about 20%, at least about 25% compared to a device without the coating particles. In some embodiments, the coating particles increase the surface area where the one or more particles of the fluid sample are isolated by at least about 5%, at least about 10%, at least about 15%, or at least about 20%, at least about 25% compared to a device without the coating particles. In some embodiments, the one or more particles are suspended in a gel, hydrogel, or a combination thereof. In some embodiments, the one or more particles are provided on a top surface of the coating, within the coating, in contact with a surface of the at least one electrode, or a combination thereof. In some embodiments, the one or more particles are embedded in a chip substrate. In some embodiments, the device comprises one or more sensors electrically coupled to the chip. In some embodiments, the one or more sensors are integrated into the device or external to the device. In some embodiments, the device comprises a passivation layer wherein a first surface of the passivation layer is in contact with a surface of the chip, and wherein a second surface of the passivation layer is in contact with a surface of the at least one electrode. In some embodiments, the passivation layer comprises a material of silicon dioxide, silicon nitride, silicon carbide, high-k dielectric polymers, high-k dielectric plastics, borosilicate glass, PSG, BPSG, or any combination thereof. In some embodiments, the device comprises an enclosure configured to mechanically and electrically coupled to the chip, wherein the enclosure is in electrical communication with one or more processors. In some embodiments, the coating comprises a thickness up to about ⅓ a distance between a first electrode and a second electrode of the at least one electrode. In some embodiments, a surface of the chip is coupled to a first surface of an impedance layer, and wherein a second. In some embodiments, the impedance layer is configured to reduce cross-talk between a first electrode and a second electrode of the at least one electrode by at least about 20%, at least about 30%, at least about 40%, at least about 50%, at least about 60%, at least about 70%, at least about 80%, at least about 90%, or at least about 95%. In some embodiments, the coating covers a surface of the passivation layer, the at least one electrode, or a combination thereof. In some embodiments, the one or more particles are provided to a first area of the at least one electrode or a second area of the at least one electrode, and wherein the first area and the second area partially overlap or do not overlap. In some embodiments, a surface of the chip is electrically coupled to a first surface of a conduction layer, and wherein a second surface of the conduction layer is electrically coupled to the at least one electrode. In some embodiments, the chip is comprised of a base layer, an impedance layer, a metal adhesion layer, conduction layer, or any combination thereof. In some embodiments, the metal adhesion layer comprises a thickness of 10 nm-300 nanometers (nm), and wherein the metal adhesion layer is comprised of titanium, tungsten, silver, copper, gold, or any combination thereof. In some embodiments, the impedance layer comprises a film deposited or thermally grown on a surface of the base layer, and wherein the impedance layer comprises a thickness of about 1 to about 100 micrometers (μm). In some embodiments, the base layer may comprise a substrate surface, a logic layer, a logic interface layer, or any combination thereof. In some embodiments, the base layer may comprise a substrate. In some embodiments, the base layer may comprise only a substrate. In some embodiments, the base layer comprises a substrate surface comprised of a silicon wafer, glass wafer, silicon carbide, PET, Polyvinyl chloride (PVC), thermoplastics, ABS resin plastic, polyethylene plastics, polypropylene, polyimides (PIs), thermoplastic elastomers, a black colored plastic configured to minimize fluorescence, a clear plastic configured to allow light transmission, or any combination thereof. In some embodiments, the logic layer is disposed, manufactured, and/or built on an outer surface of or outside the chip. In some embodiments, the substrate surface of the base layer interfaces directly with a top of the logic layer. In some embodiments the logic layer is comprised of a plurality of transistor (e.g., transistor system) where at least two transistors of the plurality of transistors are electrically and/or operably in communication and/or coupled. In some embodiments, the logic layer is fabricated by complementary metal oxide semiconductor (CMOS), metal oxide semiconductor field effect transistor (MOSFET), bipolar junction transistor (BJT), or any combination thereof processes. In some embodiments, the logic layer is comprised of doped silicon, doped silicon carbide, gallium nitride, gallium arsenide, germanium, derivatives thereof, or any combination thereof. In some embodiments, the logic layer comprises conductive or semiconductive metals embedded in printed circuit boards (PCB), glass, PET, polyvinyl chloride (PVC), thermoplastics, ABS resin plastic, polyethylene plastics, polypropylene, polyimides (PIs), thermoplastic elastomers, or any combination thereof. In some embodiments, the logic layer is electrically and/or operably coupled to a computer. In some embodiments the substrate interfaces logic layer via interface layer. In some embodiments the interface layer is an electrical pass-through layer between the logic layer and the chip substrate bottom layer. In some embodiments, the interface layer has a connection circuit printed that connects the logic layer to the substrate. In some embodiments, the interface layer has conductive or semiconductive metals embedded in silicon, silicon carbide, glass, PCB, PET, polyvinyl chloride (PVC), thermoplastics, ABS resin plastic, polyethylene plastics, polypropylene, polyimides (PIs), or thermoplastic elastomers. In some embodiments, the conduction layer comprises gold, silver, copper, aluminum, zinc, lithium, brass, nickel, palladium, platinum, tungsten, tin, titanium, or any combination thereof. In some embodiments, the at least one electrode comprises a material of platinum, zinc, lithium, brass, nickel, palladium, tungsten, tin, titanium, gold, silver, aluminum, copper, rubidium, carbon, graphene, graphite, platinized carbon, gold alloys, silver alloys, carbon plated gold. In some embodiments, a surface, an interior, or a combination thereof region of the coating may comprise one or more moieties configured to bind to nucleic acid molecules associated with membrane bound particles, and wherein the one or more moieties comprise antibodies, proteins, aptamers, DNA, RNA, or any combination thereof. In some embodiments, the one or more moieties comprise naturally occurring (e.g., biological), biosynthetic polymers, synthetic polymers, or any combination thereof. In some embodiments, the one or more moieties are configured to couple to one or more naturally occurring particles, such as extracellular vesicles with attached or surface-level proteins, free-floating proteins, aptamers, DNA, RNA, enzymes, phospholipids, any naturally occurring (e.g., biological) or biosynthetic polymers and/or particles, synthetic polymers and/or particles, or any combination thereof. In some embodiments, the one or more moieties are configured to couple to one or more inorganic or engineered particles, such as biosynthetic and synthetic vesicles, core shell particles, functionalized nanoparticles, nanocapsules, colloidal nanoparticles, other polymer nanoparticles, or any combination thereof. In some embodiments, the at least one electrode comprises one or more ellipsoid shaped electrodes, wherein an anode electrode is adjacent to cathode electrode of the at least one electrode. In some embodiments, the ellipsoid shaped electrodes comprise a minor axis of about 5 μm to about 1 mm and a major axis of about 10 μm to about 2 mm. In some embodiments, the surface comprises a surface of a 6, 12, 24, 48, 96, or 384 well plate. In some embodiments, the surface comprises a surface of a 1536 well plate. In some embodiments, the one or more particles comprise a diameter from about 1 nanometer to 50 micrometers. In some embodiments, the one or more particles comprise a diameter from about 500 micrometers to about 5 millimeters.

Another aspect of the disclosure comprises an electro fluidic device, comprising: a chip electrically coupled with at least one electrode attached to a surface of the chip, wherein the chip comprises at least one dielectric adjacent to the at least one electrode, wherein a surface of the dielectric coupled to the at least one electrode comprises a curved edge portion, and wherein the curved edge portion provides an increase of at least 5% of an area of the surface where one or more particles of a fluid sample are isolated relative to a surface of dielectric comprising a non-curved edge portion under similar conditions when the fluid sample is transported across the surface. In some embodiments, the device comprises one or more sensors electrically coupled to the chip. In some embodiments, the one or more sensors are integrated into the device or external to the device.

In some embodiments, the device comprises an enclosure configured to mechanically and electrically coupled to the chip, wherein the enclosure is in electrical communication with one or more processors. In some embodiments, at least one surface of the at least one dielectric is coupled to at least one surface of the at least one electrode. In some embodiments, the chip is comprised of a base layer, an impedance layer, a metal adhesion layer, conduction layer, or any combination thereof. In some embodiments, the metal adhesion layer comprises a thickness of 10-300 nanometers (nm), and wherein the metal adhesion layer is comprised of titanium, tungsten, silver, copper, gold, or any combination thereof. In some embodiments, the impedance layer comprises a film deposited or thermally grown on a surface of the base layer, and wherein the impedance layer comprises a thickness of about 1 to about 100 micrometers (μm). In some embodiments, the base layer comprises a substrate surface comprised of a silicon wafer, glass wafer, silicon carbide, PET, Polyvinyl chloride (PVC), thermoplastics, ABS resin plastic, polyethylene plastics, polypropylene, polyimides (PIs), thermoplastic elastomers, a black colored plastic configured to minimize fluorescence, or any combination thereof. In some embodiments, the conduction layer comprises silver, copper, aluminum, zinc, lithium, brass, nickel, palladium, platinum, tungsten, tin, titanium, or any combination thereof. In some embodiments, the at least one electrode comprises a material of platinum, zinc, lithium, brass, nickel, palladium, tungsten, tin, titanium, gold, carbon, silver, aluminum, copper, rubidium, carbon, graphene, graphite, platinized carbon, gold alloys, silver alloys, carbon plated gold. In some embodiments, the at least one electrode comprises one or more ellipsoid shaped electrodes, wherein an anode electrode is adjacent to cathode electrode of the at least one electrode. In some embodiments, the ellipsoid shaped electrodes comprise a minor axis of about 5 μm to about 1 mm and a major axis of about 10 μm to about 2 mm. In some embodiments, the ellipsoid shaped electrodes comprise a major and minor axis that are the same or different in length. In some embodiments, the major and minor axis comprise a length of about 5 μm to about 2 mm. In some embodiments, the surface comprises a surface of a 6, 12, 24, 48, 96, or 384 well plate. In some embodiments, the surface comprises a surface of a 1536 well plate. In some embodiments, the one or more particles comprise a diameter from about 1 nanometer to 50 micrometers. In some embodiments, the one or more particles comprise a diameter from about 500 micrometers to about 5 millimeters.

Another aspects of the disclosure comprises an electro fluidic device, comprising: a chip electrically coupled with at least one electrode attached to a surface of the chip, wherein the at least one electrode comprises a curved edge portion, wherein the curved edge portion comprises a tangential angle greater than 45 degrees for at least 25% of the curved edge portion, and wherein the curved edge portion of the electrode provides an increase of at least 5% of a capture area of the surface where one or more particles of a fluid sample are isolated relative to a similar electrode under similar conditions without the curved edge portion when the fluid sample is transported across the surface. In some embodiments, the at least one electrode comprises a first electrode and a second electrode, wherein a peak of a curved edge portion of the first electrode is centered a distance from the nadir of a curved edge portion of the second electrode. In some embodiments, the curved edge portion comprises a varying frequency and amplitude as a function of the length of the at least one electrode. In some embodiments, the at least one electrode comprises a non-curved edge portion, wherein the non-curved edge portion comprises a tangential angle of less than 5 degrees along the non-curved edge portion. In some embodiments, the surface comprises a surface of a flow cell. In some embodiments, the flow cell comprises one or more microfluidic channels. In some embodiments, the at least one electrode comprises one or more circular features disposed along a length of the curved edge portion of the at least one electrode. In some embodiments, the surface comprises a surface of a 6, 12, 24, 48, 96, or 384 well plate. In some embodiments, the surface comprises a surface of a 1536 well plate. In some embodiments, the curved edge portion comprises a non-zero derivative along a length of the curved edge portion. In some embodiments, the one or more circular features comprise a curved edge coaxial with the curved edge portion of the electrode. In some embodiments, the at least one electrode comprises a first electrode comprising a first curved edge portion, and a second electrode comprising a second curved edge portion. In some embodiments, the first electrode curved edge portion is at least about 5 μm distance from the second electrode curved edge portion, and wherein the distance is along a short axis of the chip. In some embodiments, the first electrode curved edge portion comprises up to about 20 degrees phase shift from the second electrode curved edge portion, and wherein the distance is along a long axis of the chip. In some embodiments, the first electrode comprises an angle of orientation of up to about 20 degrees from the second electrode. In some embodiments, the at least one electrode comprises a coating. In some embodiments, the coating comprises agarose, polyacrylamide, acrylamides, N-substituted acrylamides, N-substituted methacrylamides, methacrylamide chitosan, alginate, collagen, cellulose acetate, cellulose acetate butyrate, cellulose acetate phthalate, sol-gels, metal oxides, metal alkoxides, metal chlorides, organics nanoparticles, ceramic nanoparticles, aerogels, xerogels, xylogels, cryogels, carbogels, subgels, silicone hydrogels, conjugated polymers, polypyrrole (Ppy), polyethylene, polyaniline, polythiophene derivatives, poly(3,4-ethylenedioxythiophene) doped with poly(styrene sulfonate) (PEDOT:PSS), acrylamide based polymer, polythiophene based polymer, vinyl based polymer, any derivatives thereof, or any combination thereof. In some embodiments, the coating comprises, one or more particles. In some embodiments, the one or more particles comprise a diameter from about 1 nanometer to 50 micrometers. In some embodiments, the one or more particles comprise a diameter from about 500 micrometers to about 5 millimeters. In some embodiments, the one or more particles comprise dielectric particles, conductive particles, or a combination thereof. In some embodiments, the dielectric particles comprise particles with a relative permittivity range of 100 to 500,000,000 when measured at 1 kHz using conventional measuring methods. In some embodiments, the dielectric particles comprise particles with a relative permittivity range of 100,000 to 10,000,000 when measured at 1 kHz using conventional measuring methods. In some embodiments, the dielectric particles comprise particles with a relative permittivity range of 100 to 1,000,000 when measured at 1 kHz using conventional measuring methods. In some embodiments, the dielectric particles comprise particles with a relative permittivity range of 1,000 to 100,000 when measured at 1 kHz using conventional measuring methods. In some embodiments, the conductive particles comprise liquid metals, charged polymer R groups, graphene, gold, silver, copper, aluminum, platinum, metallic nanoparticles, polyacrylic acid, silicone hydrogels, conjugated polyelectrolytes, PEDOT-S, PTHS, p(g2T-TT), p(gNDI-g2T), NIPAM, PEDOT:PSS/guar slime (PPGS), ethylene glycol, poly ethylene glycol (PEG), any derivative thereof, or any combination thereof. In some embodiments, the conductive particles increase an electric field emitted by the at least one electrode by at least about 5%, at least about 10%, at least about 15%, at least about 20%, or at least about 25%. In some embodiments, the dielectric particles comprise poly 2-hydroxyethylmeth acrylate, (pHEMA), Polystyrene, polypropylene, conjugated polymer PVDF, polymers/copolymers—P(VDF-CTFE), P(VDF-TrFE), P(VDF-TrFE-CTFE), P(TFE-HFP), (PVDF-g-HEMA)], PARQ copolymers, cuPc, FePc, PTTEMA/PS, Polythiourea blends, PNIPam, polymer and ceramic particle blends, polymer and metal particle blends, ceramics, metal oxide, graphene oxide, silica beads, silicon dioxide, borosilicate, natural rubber beads, silicone rubber beads, 4-acryloylmorpholine (ACMO), 2-ethylhexyl acrylate (2-EHA), any derivates thereof, or any combination thereof. In some embodiments, the dielectric particles increase a surface area of an electric field emitted by the at least one electrode by at least about 5%, at least about 10%, at least about 15%, at least about 20%, or at least about 25%. In some embodiments, the one or more particles are suspended in a gel, hydrogel, or a combination thereof. In some embodiments, the one or more particles are provided on a top surface of the coating, within the coating, in contact with a surface of the at least one electrode, or a combination thereof. In some embodiments, the device comprises one or more sensors electrically coupled to the chip. In some embodiments, the one or more sensors are integrated into the device or external to the device. In some embodiments, the device comprises a passivation layer wherein a first surface of the passivation layer is in contact with a surface of the chip, and wherein a second surface of the passivation layer is in contact with a surface of the at least one electrode. In some embodiments, the passivation layer comprises a material of silicon dioxide, silicon nitride, silicon carbide, high-k dielectric polymers, high-k dielectric plastics, borosilicate glass, PSG, BPSG, or any combination thereof. In some embodiments, the passivation layer is coated with silicon dioxide on a surface of the passivation layer, and wherein the coating increases isolation of the one or more particles by at least about 5%, at least about 10%, at least about 15%, at least about 20%, or at least about 25%. In some embodiments, the device comprising an enclosure configured to mechanically and electrically coupled to the chip, wherein the enclosure is in electrical communication with one or more processors. In some embodiments, the coating comprises a thickness up to about ⅓ a distance between a first electrode and a second electrode of the at least one electrode. In some embodiments, a surface of the chip is coupled to a first surface of an impedance layer, and wherein a second surface of the impedance layer is coupled to the at least one electrode. In some embodiments, the impedance layer is configured to reduce cross-talk between a first electrode and a second electrode of the at least one electrode by at least about 20%, at least about 30%, at least about 40%, at least about 50%, at least about 60%, at least about 70%, at least about 80%, at least about 90%, or at least about 95%. In some embodiments, the coating covers a surface of the passivation layer, the at least one electrode, or a combination thereof. In some embodiments, the one or more particles may be provided to a first area of the at least one electrode or a second area of the at least one electrode, and wherein the first area and the second area partially overlap or do not overlap. In some embodiments, a surface of the chip is electrically coupled to a first surface of a conduction layer, and wherein a second surface of the conduction layer is electrically coupled to the at least one electrode. In some embodiments, the chip is comprised of a base layer, an impedance layer, a metal adhesion layer, conduction layer, or any combination thereof. In some embodiments, the metal adhesion layer comprises a thickness of 10-300 nanometers (nm), and wherein the metal adhesion layer is comprised of titanium, tungsten, silver, copper, gold, or any combination thereof. In some embodiments, the impedance layer comprises a film deposited or thermally grown on a surface of the base layer, and wherein the impedance layer comprises a thickness of about 1 to about 100 micrometers (μm). In some embodiments, the base layer comprises a substrate surface comprised of a silicon wafer, glass wafer, silicon carbide, PET, Polyvinyl chloride (PVC), thermoplastics, ABS resin plastic, polyethylene plastics, polypropylene, polyimides (PIs), thermoplastic elastomers, a black colored plastic configured to minimize fluorescence, or any combination thereof. In some embodiments, the conduction layer comprises silver, copper, aluminum, zinc, lithium, brass, nickel, palladium, platinum, tungsten, tin, titanium, or any combination thereof. In some embodiments, the at least one electrode comprises a material of platinum, zinc, lithium, brass, nickel, palladium, tungsten, tin, titanium, gold, carbon, silver, aluminum, copper, rubidium, carbon, graphene, graphite, platinized carbon, gold alloys, silver alloys, carbon plated gold. In some embodiments, a surface, an interior, or a combination thereof region of the coating may comprise one or more moieties configured to bind to nucleic acid molecules, and wherein the one or more moieties comprise antibodies, proteins. In some embodiments, the one or more moieties are configured to couple to one or more extracellular vesicles with attached or surface-level proteins, free-floating proteins, enzymes, phospholipids, any naturally occurring (e.g., biological) or biosynthetic polymers and/or particles, synthetic polymers and/or particles, or any combination thereof.

Another aspect of the disclosure comprises an electro fluidic device, comprising: a chip electrically coupled with at least one electrode attached to a surface of the chip, wherein the at least one electrode comprises a curved edge portion, wherein the curved edge portion comprises an average tangential angle greater than 45 degrees along the curved edge portion, and wherein the curved edge portion of the electrode provides an increase of at least 5% of a capture area of the surface where one or more particles of a fluid sample are isolated relative to a similar electrode under similar conditions without the curved edge portion when the fluid sample is transported across the surface. In some embodiments, the at least one electrode comprises a first electrode and a second electrode, wherein a peak of a curved edge portion of the first electrode is centered a distance from the nadir of a curved edge portion of the second electrode. In some embodiments, the curved edge portion comprises a varying frequency and amplitude as a function of a length of the at least one electrode. In some embodiments, the at least one electrode comprises a non-curved edge portion, wherein the non-curved edge portion comprises a tangential angle of less than 5 degrees along the non-curved edge portion. In some embodiments, the at least one electrode comprises one or more circular features disposed along a length of the curved edge portion of the at least one electrode. In some embodiments, the surface comprises a surface of a 6, 12, 24, 48, 96, or 384 well plate. In some embodiments, the surface comprises a surface of a 1536 well plate. In some embodiments, the one or more circular features comprise a curved edge coaxial with the curved edge portion of the electrode. In some embodiments, the at least one electrode comprises a first electrode comprising a curved edge portion, and a second electrode comprising a curved edge portion. In some embodiments, the first electrode curved edge portion is at least about 5 μm distance from the second electrode curved edge portion, and wherein the distance is along a short axis of the chip. In some embodiments, the first electrode curved edge portion comprises up to about 20 degrees phase shift from the second electrode curved edge portion, and wherein the distance is along a long axis of the chip. In some embodiments, the first electrode comprises an orientation angle of up to about 20 degrees from the second electrode. In some embodiments, the surface comprises a surface of a flow cell. In some embodiments, the flow cell comprises one or more microfluidic channels. In some embodiments, the at least one electrode comprises a coating. In some embodiments, the coating comprises agarose, polyacrylamide, acrylamides, N-substituted acrylamides, N-substituted methacrylamides, methacrylamide chitosan, alginate, collagen, cellulose acetate, cellulose acetate butyrate, cellulose acetate phthalate, sol-gels, metal oxides, metal alkoxides, metal chlorides, organics nanoparticles, ceramic nanoparticles, aerogels, xerogels, xylogels, cryogels, carbogels, subgels, silicone hydrogels, conjugated polymers, polypyrrole (Ppy), polyethylene, polyaniline, polythiophene derivatives, poly (3,4-ethylenedioxythiophene) doped with poly(styrene sulfonate) (PEDOT:PSS), acrylamide based polymer, polythiophene based polymer, vinyl based polymer, any derivatives thereof, or any combination thereof. In some embodiments, the coating comprises, one or more particles. In some embodiments, the one or more particles comprise dielectric particles, conductive particles, or a combination thereof. In some embodiments, the dielectric particles comprise particles with a relative permittivity range of 100 to 1,000,000 when measured at 1 kHz using conventional measuring methods. In some embodiments, the dielectric particles comprise particles with a relative permittivity range of 10,000 to 1,000,000 when measured at 1 kHz using conventional measuring methods. In some embodiments, the dielectric particles comprise particles with a relative permittivity range of 1,000 to 100,000 when measured at 1 kHz using conventional measuring methods. In some embodiments, the conductive particles comprise conductive inks, liquid metals, charged polymer R groups, graphene, metallic nanoparticles (e.g., gold, silver, copper, aluminum, platinum, rhodium, etc.), polyacrylic acid, silicone hydrogels, conjugated polyelectrolytes, PEDOT-S, PTHS, p(g2T-TT), p(gNDI-g2T), NIPAM, PEDOT:PSS/guar slime (PPGS), ethylene glycol, poly ethylene glycol (PEG), any derivative thereof, or any combination thereof. In some embodiments, the conductive particles increase an electric field emitted by the at least one electrode by at least about 5%, at least about 10%, at least about 15%, at least about 20%, or at least about 25%. In some embodiments, the semi-conductive particles comprise semi-conductive inks, carbon, graphene, silicon, germanium, tin, selenium, tellurium, lead, boron, gallium, gallium arsenide, and oxide forms thereof, any derivative thereof, or any combination thereof. In some embodiments, the dielectric particles comprise dielectric insulative particles. In some embodiments, the dielectric insulative particles comprise insulative inks, dielectric inks, indium tin oxide, poly 2-hydroxyethylmeth acrylate, (pHEMA), polystyrene, polypropylene, conjugated polymer PVDF, conjugated polymers, conjugated co-copolymers, polymers/copolymers—P (VDF-CTFE), P(VDF-TrFE), P(VDF-TrFE-CTFE), P(TFE-HFP), (PVDF-g-HEMA)], PARQ copolymers, phthalocyanines (cuPc, FePc), PTTEMA/PS, polythiourea blends, PNIPam, ceramic nanoparticles, polymer and ceramic particle blends, polymer and metal particle blends, ceramics, metal oxides, graphene oxide, silica beads, silicon dioxide, borosilicate, natural rubber beads, silicone rubber beads, 4-acryloylmorpholine (ACMO), 2-ethylhexyl acrylate (2-EHA), any derivates thereof, or any combination thereof. In some embodiments, the dielectric particles increase a surface area of an electric field emitted by the at least one electrode by at least about 5%, at least about 10%, at least about 15%, at least about 20%, or at least about 25%. In some embodiments, the coating particles increase the surface area where the one or more particles of the fluid sample are isolated by at least about 5%, at least about 10%, at least about 15%, or at least about 20%, at least about 25% compared to a device without the coating particles. In some embodiments, the one or more particles are suspended in a gel, hydrogel, or a combination thereof. In some embodiments, the one or more particles are provided on a top surface of the coating, within the coating, in contact with a surface of the at least one electrode, or a combination thereof. In some embodiments, the device comprises one or more sensors electrically coupled to the chip. In some embodiments, the one or more sensors are integrated into the device or external to the device. In some embodiments, the device comprises a passivation layer wherein a first surface of the passivation layer is in contact with a surface of the chip, and wherein a second surface of the passivation layer is in contact with a surface of the at least one electrode. In some embodiments, the passivation layer comprises a material of silicon dioxide, silicon nitride, silicon carbide, high-k dielectric polymers, high-k dielectric plastics, borosilicate glass, PSG, BPSG, or any combination thereof. In some embodiments, the passivation layer is coated with silicon dioxide on a surface of the passivation layer, and wherein the coating increases isolation of the one or more particles by at least about 5%, at least about 10%, at least about 15%, at least about 20%, or at least about 25%. In some embodiments, the device comprises an enclosure configured to mechanically and electrically coupled to the chip, wherein the enclosure is in electrical communication with one or more processors. In some embodiments, the coating comprises a thickness up to about ⅓ a distance between a first electrode and a second electrode of the at least one electrode. In some embodiments, a surface of the chip is coupled to a first surface of an impedance layer, and wherein a second surface of the impedance layer is coupled to the at least one electrode. In some embodiments, the impedance layer is configured to reduce cross-talk between a first electrode and a second electrode of the at least one electrode by at least about 20%, at least about 30%, at least about 40%, at least about 50%, at least about 60%, at least about 70%, at least about 80%, at least about 90%, or at least about 95%. In some embodiments, the coating covers a surface of the passivation layer, the at least one electrode, or a combination thereof. In some embodiments, the one or more particles may be provided to a first area of the at least one electrode or a second area of the at least one electrode, and wherein the first area and the second area partially overlap or do not overlap. In some embodiments, a surface of the chip is electrically coupled to a first surface of a conduction layer, and wherein a second surface of the conduction layer is electrically coupled to the at least one electrode. In some embodiments, the chip is comprised of a base layer, an impedance layer, a metal adhesion layer, conduction layer, or any combination thereof. In some embodiments, the metal adhesion layer comprises a thickness of 10-300 nanometers (nm), and wherein the metal adhesion layer is comprised of titanium, tungsten, silver, copper, gold, or any combination thereof. In some embodiments, the impedance layer comprises a film deposited or thermally grown on a surface of the base layer, and wherein the impedance layer comprises a thickness of about 1 to about 100 micrometers (μm). In some embodiments, the base layer comprises a substrate surface comprised of a silicon wafer, glass wafer, silicon carbide, PET, Polyvinyl chloride (PVC), thermoplastics, ABS resin plastic, polyethylene plastics, polypropylene, polyimides (PIs), thermoplastic elastomers, a black colored plastic configured to minimize fluorescence, or any combination thereof. In some embodiments, the conduction layer comprises silver, copper, aluminum, zinc, lithium, brass, nickel, palladium, platinum, tungsten, tin, titanium, or any combination thereof. In some embodiments, the at least one electrode comprises a material of platinum, zinc, lithium, brass, nickel, palladium, tungsten, tin, titanium, gold, carbon, silver, aluminum, copper, rubidium, carbon, graphene, graphite, platinized carbon, gold alloys, silver alloys, carbon plated gold. In some embodiments, a surface, an interior, or a combination thereof region of the coating may comprise one or more moieties configured to bind to nucleic acid molecules, and wherein the one or more moieties comprise antibodies, proteins. In some embodiments, the one or more moieties are configured to couple to one or more extracellular vesicles with attached or surface-level proteins, free-floating proteins, enzymes, phospholipids, any naturally occurring (e.g., biological) or biosynthetic polymers and/or particles, synthetic polymers and/or particles, or any combination thereof. In some embodiments, the curved edge portion comprises a non-zero derivative along a length of the curved edge portion. In some embodiments, the one or more particles comprise a diameter from about 1 nanometer to 50 micrometers. In some embodiments, the one or more particles comprise a diameter from about 500 micrometers to about 5 millimeters.

Another aspect of the disclosure comprises an electro-fluidic system, comprising: a chip electrically coupled with at least one electrode attached to a surface of the chip, wherein the at least one electrode is coated, wherein the coating provides an increase of at least 5% of a surface area of the surface where one or more particles of a fluid sample are isolated relative to a similar electrode under similar conditions without the coating; a controller comprising one or more processors electrically coupled to the at least one electrode; and a non-transient computer readable storage medium comprising software, wherein the software comprises executable instructions that, as a result of execution, cause the one or more processors of the controller to: receive an input, wherein the input indicates parameters of an electrical signal for isolating one or more particles of a fluid composition; and provide the electrical signal to the at least one electrode to isolate the one or more particles of the fluid composition on the surface of the device when the fluid composition is transported across the surface. In some embodiments, the input comprises a user input, a detected signal from one or more sensors, or a combination thereof. In some embodiments, the parameters of the electrical signal comprise frequency and amplitude of the electrical signal. In some embodiments, the frequency comprises one or more frequencies or a frequency range. In some embodiments, the surface comprises a surface of a flow cell. In some embodiments, the flow cell comprises one or more microfluidic channels. In some embodiments, the at least one electrode comprises a first electrode and a second electrode. In some embodiments, the electrical signal comprises a first electrical signal provided to the first electrode and a second electrical signal provided to the second electrode, wherein the first electrode and the second electrode partially or do not overlap. In some embodiments, the electrical signal comprises a first electrical signal provided at first time and a second electrical signal provided at a second time to the at least one electrode, wherein the first time precedes the second time. In some embodiments, the first electrical signal comprises a first frequency or frequency range and the second electrical signal comprises a second frequency or second frequency range. In some embodiments, the first frequency or frequency range and the second frequency or frequency range are the same. In some embodiments, the first frequency or frequency range and the second frequency or frequency range differ. In some embodiments, the coating comprises agarose, polyacrylamide, acrylamides, N-substituted acrylamides, N-substituted methacrylamides, methacrylamide chitosan, alginate, collagen, cellulose acetate, cellulose acetate butyrate, cellulose acetate phthalate, sol-gels, metal oxides, metal alkoxides, metal chlorides, organics nanoparticles, ceramic nanoparticles, aerogels, xerogels, xylogels, cryogels, carbogels, subgels, silicone hydrogels, conjugated polymers, polypyrrole (Ppy), polyethylene, polyaniline, polythiophene derivatives, poly(3,4-ethylenedioxythiophene) doped with poly(styrene sulfonate) (PEDOT:PSS), acrylamide based polymer, polythiophene based polymer, vinyl based polymer, any derivatives thereof, or any combination thereof. In some embodiments, the coating comprises, one or more particles. In some embodiments, the one or more particles comprise dielectric particles, conductive particles, or a combination thereof. In some embodiments, the dielectric particles comprise particles with a relative permittivity range of 100 to 1,000,000 when measured at 1 kHz using conventional measuring methods. In some embodiments, the dielectric particles comprise particles with a relative permittivity range of 10,000 to 1,000,000 when measured at 1 kHz using conventional measuring methods. In some embodiments, the dielectric particles comprise particles with a relative permittivity range of 1,000 to 100,000 when measured at 1 kHz using conventional measuring methods. In some embodiments, the conductive particles comprise liquid metals, charged polymer R groups, graphene, gold, silver, copper, aluminum, platinum, metallic nanoparticles, polyacrylic acid, silicone hydrogels, conjugated polyelectrolytes, PEDOT-S, PTHS, p(g2T-TT), p(gNDI-g2T), NIPAM, PEDOT:PSS/guar slime (PPGS), ethylene glycol, polyethylene glycol (PEG), any derivative thereof, or any combination thereof. In some embodiments, the conductive particles increase an electric field emitted by the at least one electrode by at least about 5%, at least about 10%, at least about 15%, at least about 20%, at least about 25%. In some embodiments, the dielectric particles comprise poly 2-hydroxyethylmeth acrylate, (pHEMA), Polystyrene, polypropylene, conjugated polymer PVDF, polymers/copolymers—P(VDF-CTFE), P(VDF-TrFE), P(VDF-TrFE-CTFE), P(TFE-HFP), (PVDF-g-HEMA)], PARQ copolymers, cuPc, FePc, PTTEMA/PS, Polythiourea blends, PNIPam, polymer and ceramic particle blends, polymer and metal particle blends, ceramics, metal oxide, graphene oxide, silica beads, silicon dioxide, borosilicate, natural rubber beads, silicone rubber beads, 4-acryloylmorpholine (ACMO), 2-ethylhexyl acrylate (2-EHA), any derivates thereof, or any combination thereof. In some embodiments, the dielectric particles increase a surface area of an electric field emitted by the at least one electrode by at least about 5%, at least about 10%, at least about 15%, at least about 20%, or at least about 25%. In some embodiments, the one or more particles are suspended in a gel, hydrogel, or a combination thereof. In some embodiments, the one or more particles are provided on a top surface of the coating, within the coating, in contact with a surface of the at least one electrode, or a combination thereof. In some embodiments, the system comprises one or more sensors electrically coupled to the chip. In some embodiments, the one or more sensors are integrated into the device or external to the device. In some embodiments, the system comprises a passivation layer wherein a first surface of the passivation layer is in contact with a surface of the chip, and wherein a second surface of the passivation layer is in contact with a surface of the at least one electrode. In some embodiments, the passivation layer comprises a material of silicon dioxide, silicon nitride, silicon carbide, high-k dielectric polymers, high-k dielectric plastics, borosilicate glass, PSG, BPSG, or any combination thereof. In some embodiments, the passivation layer is coated with silicon dioxide on a surface of the passivation layer, and wherein the coating increases isolation of the one or more particles by at least about 5%, at least about 10%, at least about 15%, at least about 20%, or at least about 25%. In some embodiments, the system comprises an enclosure configured to mechanically and electrically coupled to the chip, wherein the enclosure is in electrical communication with one or more processors. In some embodiments, the coating comprises a thickness up to about ⅓ a distance between a first electrode and a second electrode of the at least one electrode. In some embodiments, a surface of the chip is coupled to a first surface of an impedance layer, and wherein a second surface of the impedance layer is coupled to the at least one electrode. In some embodiments, the impedance layer is configured to reduce cross-talk between a first electrode and a second electrode of the at least one electrode by at least about 20%, at least about 30%, at least about 40%, at least about 50%, at least about 60%, at least about 70%, at least about 80%, at least about 90%, or at least about 95%. In some embodiments, the system comprises a passivation layer, wherein at least one surface of the passivation layer is coupled to at least one surface of the at least one electrode. In some embodiments, the coating covers a surface of the passivation layer, the at least one electrode, or a combination thereof. In some embodiments, the one or more particles may be provided to a first area of the at least one electrode or a second area of the at least one electrode, and wherein the first area and the second area partially overlap or do not overlap. In some embodiments, a surface of the chip is electrically coupled to a first surface of a conduction layer, and wherein a second surface of the conduction layer is electrically coupled to the at least one electrode. In some embodiments, the chip is comprised of a base layer, a resistance layer, a metal adhesion layer, conduction layer, or any combination thereof. In some embodiments, the metal adhesion layer comprises a thickness of 10-300 nanometers (nm), and wherein the metal adhesion layer is comprised of titanium, tungsten, silver, copper, gold, or any combination thereof. In some embodiments, the impedance layer comprises a film deposited or thermally grown on a surface of the base layer, and wherein the impedance layer comprises a thickness of about 1 to about 100 micrometers (μm). In some embodiments, the base layer comprises a substrate surface comprised of a silicon wafer, glass wafer, silicon carbide, PET, Polyvinyl chloride (PVC), thermoplastics, ABS resin plastic, polyethylene plastics, polypropylene, polyimides (PIs), thermoplastic elastomers, a black colored plastic configured to minimize fluorescence, or any combination thereof. In some embodiments, the conduction layer comprises silver, copper, aluminum, zinc, lithium, brass, nickel, palladium, platinum, tungsten, tin, titanium, or any combination thereof. In some embodiments, the at least one electrode comprises a material of platinum, zinc, lithium, brass, nickel, palladium, tungsten, tin, titanium, gold, carbon, silver, aluminum, copper, rubidium, carbon, graphene, graphite, platinized carbon, gold alloys, silver alloys, carbon plated gold. In some embodiments, a surface, an interior, or a combination thereof region of the coating may comprise one or more moieties configured to bind to nucleic acid molecules, and wherein the one or more moieties comprise antibodies, proteins. In some embodiments, the one or more moieties comprise naturally occurring (e.g., biological), biosynthetic polymers, synthetic polymers, or combination of thereof. In some embodiments, the one or more moieties are configured to couple to one or more extracellular vesicles with attached or surface-level proteins, free-floating proteins, enzymes, phospholipids, any naturally occurring (e.g., biological), biosynthetic polymers and/or particles, synthetic polymers and/or particles, or any combination thereof. In some embodiments, the at least one electrode comprises one or more ellipsoid shaped electrodes, wherein an anode electrode is adjacent to cathode electrode of the at least one electrode. In some embodiments, the ellipsoid shaped electrodes comprise a minor axis of about 5 μm to about 1 mm and a major axis of about 10 μm to about 2 mm. In some embodiments, the ellipsoid shaped electrodes comprise a major and minor axis that are the same or different in length. In some embodiments, the major and minor axis comprise a length of about 5 μm to about 2 mm. In some embodiments, the at least one electrode comprises a curved edge portion, wherein the curved edge portion comprises an average tangential angle greater than 45 degrees along the curved edge portion. In some embodiments, the at least one electrode comprises a curved edge portion, wherein the curved edge portion comprises a tangential angle greater than 45 degrees for at least 25% of the curved edge portion. In some embodiments, a peak of a curved edge portion of the first electrode is centered a distance from the nadir of a curved edge portion of the second electrode. In some embodiments, the curved edge portion comprises a varying frequency and amplitude as a function of a length of the at least one electrode. In some embodiments, the at least one electrode comprises a non-curved edge portion, wherein the non-curved edge portion comprises a tangential angle of less than 5 degrees along the non-curved edge portion. In some embodiments, the at least one electrode comprises one or more circular features disposed along a length of the curved edge portion of the at least one electrode. In some embodiments, the one or more circular features comprise a curved edge coaxial with the curved edge portion of the electrode. In some embodiments, the at least one electrode comprises a first electrode comprising a first curved edge portion, and a second electrode comprising a second curved edge portion. In some embodiments, the first electrode first curved edge portion is at least about 5 μm distance from the second electrode second curved edge portion, and wherein the distance is along a short axis of the chip. In some embodiments, the first electrode first curved edge portion comprises up to about 20 degrees phase shift from the second electrode second curved edge portion, and wherein the distance is along a long axis of the chip. In some embodiments, the first electrode comprises an orientation angle of up to about 20 degrees from the second electrode. In some embodiments, the surface comprises a surface of a 6, 12, 24, 48, 96, or 384 well plate. In some embodiments, the surface comprises a surface of a 1536 well plate. In some embodiments, the one or more particles comprise a diameter from about 1 nanometer to 50 micrometers. In some embodiments, the one or more particles comprise a diameter from about 500 micrometers to about 5 millimeters.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

two types of particles with connected isolating regions, as described in embodiments herein.

FIGS. 5A-5D show an example device configuration where the surface of the device a surface of a multi-well plate assembly, as described in some embodiments herein.

FIGS. 6A-6E show example device cross-sectional diagrams of coated electrodes, and coated electrodes where the coating incorporate dielectric or conductive enhancing particles, as described in some embodiments herein.

Figure 7:
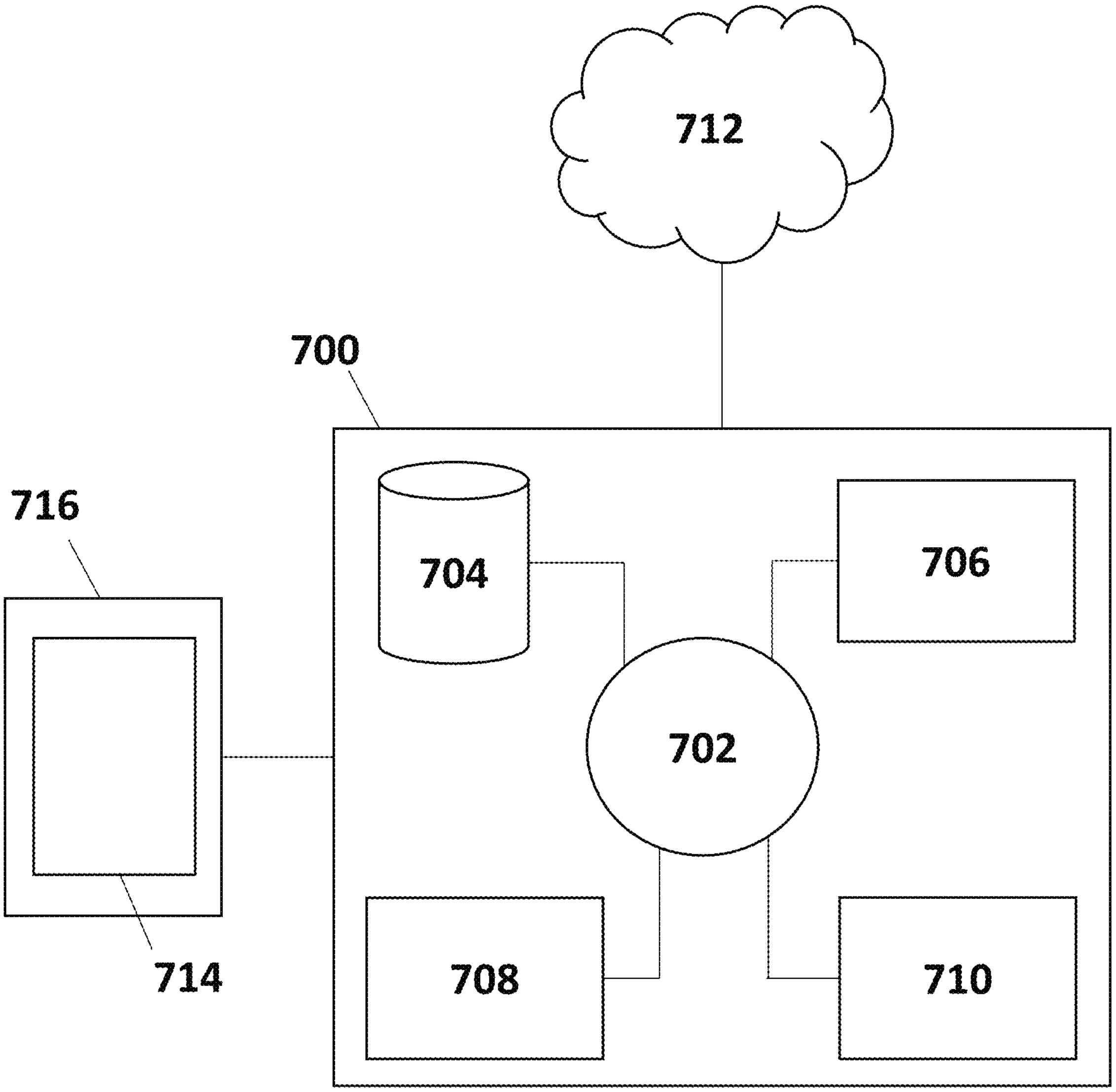

FIG. 7 shows a computer system that is programmed or otherwise configured to implement methods provided herein, as described in some embodiments herein.

FIGS. 8A-8F show example perspective and cross-sectional view diagrams for a device with planar and curved electrodes and unexposed planar or exposed curved connectors, as described in some embodiments herein.

Figure 9A:
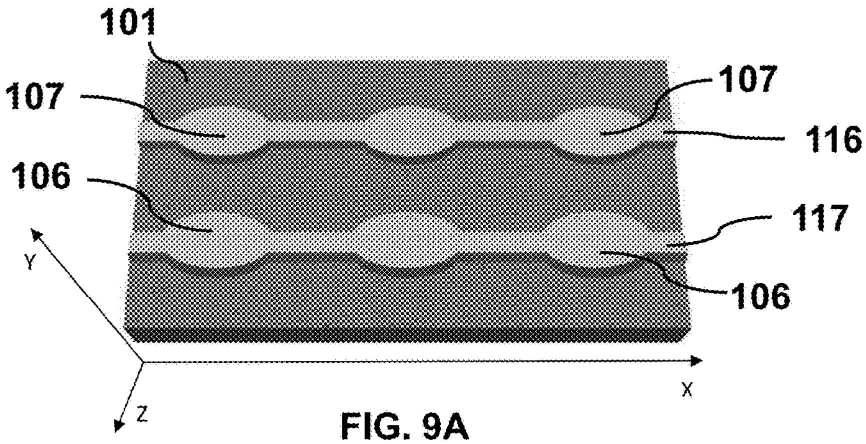
Figure 9B:
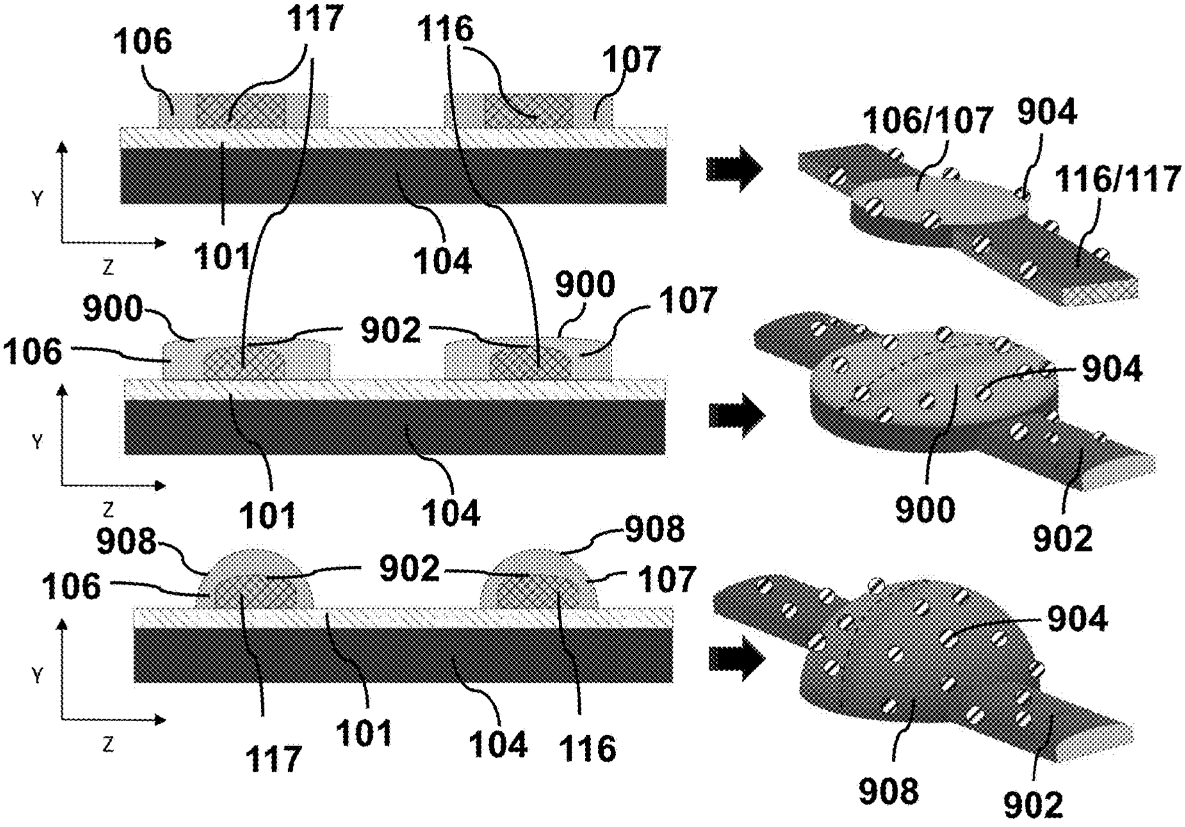

FIGS. 9A-9B show example perspective and cross-sectional view diagrams for a device with planar and curved electrodes with exposed planar and curved connectors and corresponding capture of particles for each variation, as described in some embodiments herein.

FIGS. 10A-10D show example diagrams of a simulation of an electric field generated by electrodes with and without circular and/or curved features, as described in some embodiments herein.

FIGS. 11A-11F show example experimental results comparing capture of particles for linear electrodes with and without circular and/or curved features, as described in some embodiments herein.

FIGS. 12A-12F show example experimental results comparing capture of particles for linear electrodes with no coating, with conductive coating, and a dielectric coating, as described in some embodiments herein.

FIGS. 13A-13F show example experimental results comparing capture of particles for zig-zag electrodes and zig-zag electrodes with circular and/or curved features, as described in some embodiments herein.

FIGS. 14A-14F show example experimental results comparing capture of particles for zig-zag electrodes with no coating, with a conductive coating, and a dielectric coating, as described in some embodiments herein.

DETAILED DESCRIPTION

Commonly used particle-based isolation devices and system include ultracentrifugation, density gradient centrifugation, size exclusion chromatography, and polymer-based precipitation device and/or systems. Each of the commonly used particle-based isolations devices and/or systems experience various shortcomings e.g., ability to isolate a particular target particle (e.g., extracellular vesicles) with minimal contamination from other non-target particles, capability of depleting an isolated sample of lipoproteins and protein contaminates, labor-intensity required to operate a system implementing the method of isolating particles, and cost of performing the assay involved with the method. Other challenges with the commonly used particle-based isolation devices and/or systems may include isolating particles with a high abundance of serum proteins, such as albumin and globulins, and non-extracellular vesicle lipid particles e.g., chylomicrons and lipoprotein particles that interfere with particle counts.

Electro fluidic particle isolation devices and systems have recently emerged as an alternative to the commonly used particle-based isolation methods. These devices and systems implement electrode design to capture particles at a point on a tip of an electrode or at a corner of two edges where an electrode's electric field is maximized. However, such designs with limited area of isolation at two spatially constrained locations (e.g., pointed tips and corners) are limited in ability to isolate, concentrate, and/or capture particles across at least 5% of a surface of the device. With a limited region (e.g., surface area) of capture of one or more particles on an electrode, such technology would be limited in throughput and integration into widescale processing assays. Thus, the disclosure provided herein describes one or more devices and/or systems that maximize the capture region, area, and/or volume of one or more particles across a surface of the device and/or one or more electrodes.

Instead of maximizing particle capture, isolation, or concentration at a tip or a corner of two edges of an electrode, the devices, and systems, described elsewhere herein, maximize an aggregate and/or sum of an electric field of one or more electrodes across a surface of the device. To maximize the capture across a surface of the device, physical features of the electrode may be designed to maximize the gradient ($\nabla\vec{E}^2$) of the applied electric field of an electrode. A phenomenon that takes into consideration both a surface area (physical features) of an electrical conductor (i.e., electrode) as well as an emitted electric field is electric flux $\Phi_E$ (equation 1)

$$\Phi_E = \oiint \vec{E} \cdot d\vec{A} \tag{1}$$

Where $\vec{dA}$ is a vector representing an infinitesimal element of area of the surface, $\vec{E}$ is electric field, and · is a dot product of two vectors The electric flux through an area is defined as a surface integral of the electric field multiplied by the area of the surface projected in a plane perpendicular to the field. In order to find a critical point where the flux of a system is maximized, consideration must be given to the divergence theorem as it relates to the flux of a vector field through a closed surface (equation 2), and particularly when the vector field $\vec{F}$ is a square of the gradient of the electric field ($\nabla\vec{E}^2$) emitted by an electrode (equation 3).

$$\oiint \vec{F} \cdot d\vec{A} = \iiint \nabla \cdot \vec{F}\, dV \tag{2}$$

Since F could be any vector field, we substitute F for $\nabla\vec{E}^2$, so $\vec{F}=\nabla\vec{E}^2$, therefore $$\oiint \nabla\vec{E}^2 \cdot d\vec{A} = \iiint \nabla \cdot \nabla\vec{E}^2\, dV \tag{3}$$

To identify the surface where the electric field is maximized, equation 3 may be further analyzed by taking the derivative and setting the result equal to 0 to identify critical maxima and minima, as shown in equation 4 and 5.

$$\nabla\vec{E}^2 \cdot d\vec{A} = \nabla \cdot \nabla\vec{E}^2\, dV = 0 \tag{3}$$

$$\nabla\vec{E}^2 = \vec{E} \cdot \nabla\vec{E} + \vec{E} \cdot \nabla\vec{E} = 2\vec{E}\nabla\vec{E} \tag{4}$$

Where · is a dot product of two vectors

Accordingly, substituting equation 5 into equation 4 provides equation 6:

$$\nabla \cdot 2\vec{E}\nabla\vec{E}\, dV = 0 \tag{5}$$

Since the surface described by equation 6 exists, dV≠0, so for $\nabla\cdot\overrightarrow{2E}\nabla\vec{E}=0$, which simplifies approximately to $\nabla\cdot\nabla\vec{E}=0$, which can only exist at conditions outlined by the solution to Laplace's equation. Therefore, the simplified equation to maximizing the electric field over a 3D surface is shown in equation 7:

$$\nabla^2\vec{E}\, dV = 0 \tag{7}$$

Integrating both sides over the volume of the surface leads to equation 8 and 9:

$$\iiint \nabla \cdot \nabla E\, dV = \iiint 0\, dV \tag{8}$$

$$\iiint \nabla \cdot \nabla E\, dV = \text{Constant} \tag{9}$$

By divergence theorem and the definition of Electric Flux, equation 9 becomes equation 10:

$$\nabla\Phi_E = \text{Constant} \tag{10}$$

Therefore, the solution of the system is one where the gradient of the electric flux ($\nabla\vec{\Phi}_E$) is constant and the Laplacian of the Electric Field is zero (i.e., $\vec{\nabla}^2\vec{E}dV=0$). Accordingly, the corresponding cartesian coordinate solution of the structure can be determined to be a combination of sine and cosine functions in two dimensions and a hyperbolic sine or hyperbolic cosine in a third dimension, as shown in equations 11-13.

$$X \sim \cos k_x x \text{ or } \sin k_x x \tag{11}$$

$$Y \sim \cos k_y y \text{ or } \sin k_y y \tag{12}$$

$$Z \sim \cos k_z z \text{ or } \sin k_z z \tag{13}$$

Thus, as described elsewhere herein, in some cases, the devices and/or systems comprise at least one electrode with a curved edge portion (e.g., semi-circular, circular, and/or sinusoidal curved edge portions) to maximize a gradient of electrical flux across the electrode. In some cases, the curved edge portion of can be described by a sinusoid, as described elsewhere herein, with amplitude, frequency, difference in phase angle between a first electrode and a second electrode, or any combination thereof, described elsewhere herein, where the second electrode may be adjacent the first electrode. In some cases, the curved edge portion may be described by the equations 14-16.

$$X = A\sin(B_x x + C) \text{ or } A\cos(B_x x + C) \tag{14}$$

$$Y = A\sin(B_y y + C) \text{ or } A\cos(B_y y + C) \tag{15}$$

$$Z = A\sinh(B_z z + C) \text{ or } A\cosh(B_z z + C) \tag{16}$$

where A is the amplitude of the sinusoidal curved edge portion, $B_x$, $B_y$, and $B_z$ are the frequency (i.e., periodicity) of the sinusoidal curved edge portion for x, y, and z dimensions of the sinusoidal curved edge portion, And C is the phase angle which can be shifted relative to adjacent electrodes. The X & Y dimensions may share the same A,B & C constants for any one curved edge potion of the electrode for manufacturing purposes.

In some embodiments, the curvature of a surface (κ) is the amount by which a curve deviates from a straight line, or a surface deviates from a plane. For curves such as a circle, the curvature may comprise a value equal to the reciprocal of its radius. For example, smaller circles bend more sharply, and hence have higher curvature. The curvature at a point of a differentiable curve may comprise the curvature of a circle that best approximates the curve near this point (i.e., an osculating circle). The curvature of a straight line may comprise a value of zero and curvature of a point may comprise a value of infinity. The radius of curvature may be defined as the inverse of curvature ($R_c=1/\kappa$) with units of meters/radians. For example, for a circle, Re may comprise a radius of the circle. In some embodiments, the curvature of the electrodes used in the device, described elsewhere herein, can be calculated using the surface curvature equation method:

1. First create a parametric representation of any plane curve i.e. Let z(t)=(x(t),y(t)), where $$z' = \frac{dz}{dt}$$

is defined, differentiable and nonzero.

2. Calculate curvature as:

$$k = \frac{|x'y'' - y'x''|}{\left(x'^2 + y'^2\right)^{3/2}}$$

This method can be used to calculate curvature of a surface and maximize the gradient squared of the electric field (GSEF aka $\nabla\vec{E}^2$) as $\nabla\vec{E}^2 \propto V^2\kappa^2$ In some embodiments, the curvature of the electrodes used in the device, described elsewhere herein, can be calculated using the more conventional method of calculating the tangential angle of the curve in a plane. In some embodiments the tangential angle of a curve in a plane, at a specific point, is the angle between the tangent line to the curve at the given point and a fixed starting point. In some embodiments, the fixed starting point is one of the planar axes in a coordinate system. This method of determining curvature, as described elsewhere herein, may allow for calculating and representing curvatures of electrodes in a plane. For instance, using the method of determining curvature, circles comprise a tangential angle greater than 45 degrees for exactly 50% of the curved edge portion with 2 points on the circle at 90 degrees, and 2 points at 0 degrees as tangential angles to any fixed starting point on a plane. For instance, cosine waves would comprise a tangential angle greater than 45 degrees for at least 25% of the curved edge portion with two points on the wavelength at 90 degrees, and three points at zero degrees. A 3D barrel shape, pill shape and/or cylindrical shape would also have the same tangential angle as described for circles. A 3D tunnel shape, spherical, hemispherical, spheroid and/or ellipsoid shape would have a curvature wherein the curved edge portion comprises an average tangential angle greater than 45 degrees along the curved edge portion. An upside-down J shape may be the traditional shape of the permeation layer and passivation layers off the edge of an electrode (e.g., for electrodes made with additive manufacturing processes, as described elsewhere herein) and may have a tangential angle greater than 45 degrees for ~75% of the curved edge portion. A non-curved line (i.e., straight line) nay be defined as a curve that comprises a tangential angle of less than 5 degrees along its edge portion. In some cases, the straight line may capture particles across its surface if the line is curved in the 3D dimension, i.e., from a top-down perspective the line may be a straight line, where cross-sectionally the line may comprise a half-circle curved geometry—the 3D representation of the line would resemble the geometry of a tunnel and/or a house with a curved roof.

In some embodiments, the capture, isolation, and/or concentration of one or more particles on a surface of a device, as described elsewhere herein, may be increased by at least 5% by coating an electrode on the surface of the device, providing electrodes to the surface with curved edge portions (e.g., both the electrode and/or electrode passivation layer and/or structures), or a combination thereof. In some cases, the coating incorporates one or more conductive, dielectric, or a combination thereof particles, described elsewhere herein. In some cases, the device comprises a curved edge portion and a non-curved edge portion. In some cases, the ratio of a length of the curved edge portion and the non-curved edge portion is about 1 to 10 or 10 to 1. In some cases, the one or more conductive and/or dielectric particles may be disposed on an uncoated surface of the one or more electrodes of the device. In some cases, one or more conductive particles may be disposed on the surface of the one or more electrodes to form one or more curved edge structures (i.e., a dome, bell curve, etc.) with a thickness normal to the surface of the device.

The device and/or systems of the disclosure described herein may comprise combined electro-fluidic systems comprising one or more channels, electrodes, inlets, outlets, sensors, or any combination thereof. In some instances, the systems may comprise a microfluidic device comprising one or more electrodes configured to emit one or more frequencies, frequency ranges (i.e., frequency temporal sweeps where a frequency is modified from a first frequency at a first time point to a second frequency at a second time point where the second time point follows the first time point) configured to isolate particles in spatially non-overlapping positions and/or at temporally discrete points in time, described elsewhere herein. In some cases, the microfluidic device may comprise a flow cell.

A membrane may be any outer shell and/or surface of a particle, as described elsewhere herein, e.g., a nano or micro particle that interfaces with a media. In some cases, the media may comprise a fluid media, described elsewhere herein. Depending on whether the outer shell and a core comprised from the same material, membrane-bound particles are classified into either homogenous (same core & membrane, such as exomeres and supermeres) or heterogenous (solid, gel or liquid core, such as proteins, exosomes, nucleosomes). These particles could be naturally occurring (biological particles) or engineered (biosynthetic or synthetic particles). Depending on their biochemical and biophysical properties, in fluid solutions these particles could be free-floating, clustered, and/or complexed with other particles. Membrane-bound particles isolated by the devices and/or systems, described elsewhere herein, may comprise particles, including cell-derived membrane bound particles e.g., exomeres, small exosomes, large exosomes, microvesicles, ectosomes, migrasomes, synthetic particles, or any combination thereof. In some cases, cell-derived membrane bound particles may comprise necroptotic, apoptotic, or pyroptotic bodies, and other membrane bound bodies produced as a result of cell death. Synthetic nanovesicles and coated particles may be generated by supramolecular chemistry or other manufacturing methods. The particles may comprise synthetic nanoparticles e.g., chemically synthetic liposomes, gold, platinum, silver, titanium, ceramics, metal oxides, glass particles (silica beads, silicon dioxide, silicon nitride, borosilicate glass, or any combination thereof), rubber particles (natural and/or silicone rubber, etc.), graphene oxide, polystyrene, polypropylene, conjugated polymers (PVDF polymers and/or co-polymers, PARQ co-polymers (e.g., HO-PAQR and RO-PAQR, etc.), cuPc, FePc, PTTEMA/PS, Polythiourea blends, etc.), polymer and ceramic composites, polymer and metal composites, polymers with hyperbranched structures (hyper branched polyanilines etc.), or any combination thereof. The synthetic nanoparticles may be applied to a surface of the cell-derived membranes to improve the isolation of the particles. Sizes and size ranges of the cell-derived membrane bound particles, and synthetic nanoparticles that may be isolated by the methods, devices, and/or systems described herein may be seen in Table 1.

TABLE 1

| Category | Particle Size (diameter) | Particle type | Particle subtype |
|---|---|---|---|
| Naturally occurring particles | <50 nm | EVs, biopolymers, organelles | Exomeres, supermeres, DNA, RNA, proteins |
| | <100 nm | | Lipoproteins |
| | 60-80 nm | | Small exosomes, aggregated proteins, nucleosomes |
| | 90-120 nm | | Large exosomes |
| | 40-200 nm | | ARRDC1 mediated macrovesicles (ARMMs) |
| | 100 nm-1000 nm | | Microvesicles, ectosomes, organelles, filopodium derived vesicles |
| | 500 nm-3000 nm | | Migrasomes |
| | 500-1000+ nm | | Oncosomes, exophers |
| | >500 nm | Cell death markers | Necroptotic, apoptotic, and pyroptotic bodies and other membrane bound |
| | 500-2000 nm (>1000 nm) | | bodies produced as a result of cell death. |
| | 20-500 nm, 500 nm-5 μm, >4 μm, >10 μm, >16 μm | Cells | Virus, Bacteria, RBC, WBC, CTC/CEC, all other cell types, respectively etc. |
| Synthetic and biosynthetic nanoparticles | 1 nm-500 nm | Drug delivery nanoparticles | Polymeric, inorganic and lipid-based drug carries, such as liposomes, micelles, dendrimers, polymersomes, nanospheres etc. |
| | 1 nm-500 nm | Metal nanoparticles (coated and uncoated) | Gold, platinum, silver, titanium, etc. |
| | 1 nm-50 μm | Non-metal nanoparticles | Ceramics, metal oxides, graphene oxide, silica beads, silicon dioxide, glass, rubber (both natural and/or silicone) etc. |
| | 1 nm-50 μm | Polymer nanoparticles | Polystyrene, polypropylene, conjugated polymers [PVDF polymers or copolymers - P(VDF-CTFE), P(VDF-TrFE) and P(VDF-TrFE-CTFE), (P(TFE-HFP)), (PVDF-g-HEMA)], PARQ copolymers (e.g., HO-PAQR and RO-PAQR, etc.), cuPc, FePc, PTTEMA/PS, Polythiourea blends, polythiourea dielectrics with aromatic ring structures, polymer and ceramic particle composites, polymer and metal composites, naturally occurring and organic protein coronas, synthesized nucleic acids and other biopolymers, corpolymers with hyperbranched structures (hyper branched polyanilines) or any combination thereof. |

In some cases, the one or more cell-derived membrane bound particles may comprise a diameter of about 50 nm to about 16,000 nm. In some cases, the cell-derived membrane bound particles may comprise a diameter of about 50 nm to about 80 nm, about 50 nm to about 100 nm, about 50 nm to about 200 nm, about 50 nm to about 400 nm, about 50 nm to about 500 nm, about 50 nm to about 1,000 nm, about 50 nm to about 2,000 nm, about 50 nm to about 4,000 nm, about 50 nm to about 8,000 nm, about 50 nm to about 16,000 nm, about 80 nm to about 100 nm, about 80 nm to about 200 nm, about 80 nm to about 400 nm, about 80 nm to about 500 nm, about 80 nm to about 1,000 nm, about 80 nm to about 2,000 nm, about 80 nm to about 4,000 nm, about 80 nm to about 8,000 nm, about 80 nm to about 16,000 nm, about 100 nm to about 200 nm, about 100 nm to about 400 nm, about 100 nm to about 500 nm, about 100 nm to about 1,000 nm, about 100 nm to about 2,000 nm, about 100 nm to about 4,000 nm, about 100 nm to about 8,000 nm, about 100 nm to about 16,000 nm, about 200 nm to about 400 nm, about 200 nm to about 500 nm, about 200 nm to about 1,000 nm, about 200 nm to about 2,000 nm, about 200 nm to about 4,000 nm, about 200 nm to about 8,000 nm, about 200 nm to about 16,000 nm, about 400 nm to about 500 nm, about 400 nm to about 1,000 nm, about 400 nm to about 2,000 nm, about 400 nm to about 4,000 nm, about 400 nm to about 8,000 nm, about 400 nm to about 16,000 nm, about 500 nm to about 1,000 nm, about 500 nm to about 2,000 nm, about 500 nm to about 4,000 nm, about 500 nm to about 8,000 nm, about 500 nm to about 16,000 nm, about 1,000 nm to about 2,000 nm, about 1,000 nm to about 4,000 nm, about 1,000 nm to about 8,000 nm, about 1,000 nm to about 16,000 nm, about 2,000 nm to about 4,000 nm, about 2,000 nm to about 8,000 nm, about 2,000 nm to about 16,000 nm, about 4,000 nm to about 8,000 nm, about 4,000 nm to about 16,000 nm, or about 8,000 nm to about 16,000 nm. In some cases, the cell-derived membrane bound particles may comprise a diameter of about 50 nm, about 80 nm, about 100 nm, about 200 nm, about 400 nm, about 500 nm, about 1,000 nm, about 2,000 nm, about 4,000 nm, about 8,000 nm, or about 16,000 nm. In some cases, the cell-derived membrane bound particles may comprise a diameter of at least about 50 nm, about 80 nm, about 100 nm, about 200 nm, about 400 nm, about 500 nm, about 1,000 nm, about 2,000 nm, about 4,000 nm, or about 8,000 nm. In some cases, the cell-derived membrane bound particles may comprise a diameter of at most about 80 nm, about 100 nm, about 200 nm, about 400 nm, about 500 nm, about 1,000 nm, about 2,000 nm, about 4,000 nm, about 8,000 nm, or about 16,000 nm.

In some cases, the one or more synthetic particles may comprise a diameter of about 1 nm to about 50,000 nm. In some cases, the one or more synthetic particles may comprise a diameter of about 1 nm to about 50 nm, about 1 nm to about 80 nm, about 1 nm to about 100 nm, about 1 nm to about 500 nm, about 1 nm to about 1,000 nm, about 1 nm to about 5,000 nm, about 1 nm to about 10,000 nm, about 1 nm to about 20,000 nm, about 1 nm to about 25,000 nm, about 1 nm to about 50,000 nm, about 50 nm to about 80 nm, about 50 nm to about 100 nm, about 50 nm to about 500 nm, about 50 nm to about 1,000 nm, about 50 nm to about 5,000 nm, about 50 nm to about 10,000 nm, about 50 nm to about 20,000 nm, about 50 nm to about 25,000 nm, about 50 nm to about 50,000 nm, about 80 nm to about 100 nm, about 80 nm to about 500 nm, about 80 nm to about 1,000 nm, about 80 nm to about 5,000 nm, about 80 nm to about 10,000 nm, about 80 nm to about 20,000 nm, about 80 nm to about 25,000 nm, about 80 nm to about 50,000 nm, about 100 nm to about 500 nm, about 100 nm to about 1,000 nm, about 100 nm to about 5,000 nm, about 100 nm to about 10,000 nm, about 100 nm to about 20,000 nm, about 100 nm to about 25,000 nm, about 100 nm to about 50,000 nm, about 500 nm to about 1,000 nm, about 500 nm to about 5,000 nm, about 500 nm to about 10,000 nm, about 500 nm to about 20,000 nm, about 500 nm to about 25,000 nm, about 500 nm to about 50,000 nm, about 1,000 nm to about 5,000 nm, about 1,000 nm to about 10,000 nm, about 1,000 nm to about 20,000 nm, about 1,000 nm to about 25,000 nm, about 1,000 nm to about 50,000 nm, about 5,000 nm to about 10,000 nm, about 5,000 nm to about 20,000 nm, about 5,000 nm to about 25,000 nm, about 5,000 nm to about 50,000 nm, about 10,000 nm to about 20,000 nm, about 10,000 nm to about 25,000 nm, about 10,000 nm to about 50,000 nm, about 20,000 nm to about 25,000 nm, about 20,000 nm to about 50,000 nm, or about 25,000 nm to about 50,000 nm. In some cases, the one or more synthetic particles may comprise a diameter of about 1 nm, about 50 nm, about 80 nm, about 100 nm, about 500 nm, about 1,000 nm, about 5,000 nm, about 10,000 nm, about 20,000 nm, about 25,000 nm, or about 50,000 nm. In some cases, the one or more synthetic particles may comprise a diameter of at least about 1 nm, about 50 nm, about 80 nm, about 100 nm, about 500 nm, about 1,000 nm, about 5,000 nm, about 10,000 nm, about 20,000 nm, or about 25,000 nm. In some cases, the one or more synthetic particles may comprise a diameter of at most about 50 nm, about 80 nm, about 100 nm, about 500 nm, about 1,000 nm, about 5,000 nm, about 10,000 nm, about 20,000 nm, about 25,000 nm, or about 50,000 nm.

Isolating one or more cell-derived, and/or synthetic particles may be a necessary component for applications e.g., drug discovery, fluid-based disease diagnostics, disease and/or physiologic state biomarker discovery, or any combination thereof applications. The isolated one or more cell-derived, and/or synthetic particles may be utilized in downstream analysis. Downstream analysis may comprise, transmission electron microscopy (TEM), atomic force microscopy (AFM), nanoparticle tracking analysis (NTA), single extra cellular analysis (SEA), tunable resistive pulse sensing (TRPS), flow cytometry, western blot, enzyme-linked immunosorbent assay (ELISA), mass spectrometry (MS), liquid chromatography-tandem mass spectrometry (LCMS/MS), nucleic acid extraction, polymerase chain reaction (PCR), nucleic acid sequencing (e.g., next generation sequencing, sequencing-by-synthesis, nanopore sequencing, etc.), or any combination thereof.

The isolated particle or plurality of particles (e.g., extracellular vesicles) may be used in diagnosing, prognosing, and/or recommending adjustment to treatments for one or more disease areas. Extracellular vesicles (EV), a particle isolated by the systems, devices, and/or methods described elsewhere herein, are secreted by nearly all types of cells, and commonly found in bodily fluid (e.g., urine, blood ascites, cerebrospinal fluid, etc.). Extracellular vesicles may be secreted by one or more cell types, e.g., dendritic cells (DCs), B cells, T cells, mast cells, epithelial cells, tumor cells, viruses, bacteria, or any combination thereof cells. EVs are membrane encapsulated particles that contain molecular analytes e.g., metabolites, exosomal DNA, exosomal RNA, exosomal proteins, or any combination thereof which are analyzed by further downstream processes, described elsewhere herein. The one or more disease areas may comprise oncology, neurodegenerative diseases, aging, regenerative health and/or healing, vaccines, autoimmune diseases and/or immunomodulation, infectious disease, endocrine, or any combination thereof.

The one or more diseases or conditions of the one or more disease areas may comprise cancer, Alzheimer's, Parkinson, amyotrophic lateral sclerosis (ALS), stroke, psoriasis, colitis, irritable bowel syndrome (IBS), sepsis, cardiovascular diseases, multiple sclerosis, fissures, acute myocardial infarction, spinal cord injuries, wound healing, COVID-19, asthma, diabetes, obesity, or any combination thereof. In some cases, cancer may comprise lung cancer, pancreatic cancer, blood cancers, liver cancer, prostate cancer, brain cancer, colon cancer, skin cancer, or any combination thereof cancers.

The device and/or systems described elsewhere herein may isolate, capture, and/or elute EV or other biological or synthetic particles from biological fluids (e.g., blood, cerebrospinal fluid, urine, etc., described elsewhere herein) for one or more medical applications in the one or more of the disease areas. The one or more medical applications of the isolated EVs may comprise biomarker applications, drug discovery, and therapeutic development.

Drug discovery may involve the analysis of the isolated EVs or other biological or synthetic particles, as described elsewhere herein, and analysis of the content of the EVs or other biological or synthetic particles with a goal to understand targetable pathways and/or new drug targets determined by, e.g., analyzing the contents of the EVs prior to and after administering a drug candidate, a pharmaceutical substance, or another intervention.

Diagnostic applications and the use of isolated EVs as biomarkers may include uses of EVs and the contents thereof or other biological or synthetic particles for early-stage disease diagnosis, disease prognosis, predicting onset of disease, monitoring disease, detecting and/or predicting disease recurrence, or any combination thereof. For example, the measurement and detection level of exosomal content (e.g., exosomal DNA, RNA, and proteins) of isolated EVs or other biological or synthetic particles from human, non-human animals, bacteria, or plants may be used as a biomarker for early-stage disease diagnosis, disease prognosis, predicting onset of disease, monitoring disease, detecting and/or predicting disease recurrence, or any combination thereof.

Therapeutic development may use isolated EVs or other biological or synthetic particles to deliver therapeutic agents efficiently due to EVs vesicular structure. Therapeutic development may comprise the use of cell line derived exosomes for therapeutic delivery, exosome-mimetic nanovesicles (EMNVs) for therapeutic delivery, and therapeutic delivery vesicles with modified membranes to improve therapeutic targeting. In some cases, the endogenous content within cell-derived exosomes that may be used for therapeutic delivery could interfere with the mechanism of action of the delivered therapeutic. The methods, systems, and/or devices described elsewhere herein, may be used to isolate the cell-derived EVs or other biological or synthetic particles to analyze the contents that would assist in determining any negative and/or positive interactions with the therapeutic when the cell-derived EVs or other biological or synthetic particles would be used as a therapeutic delivery agent. In some instances, the methods, systems, and/or devices described elsewhere herein may provide measurement of in-vivo pharmacokinetic (PK), pharmacodynamic (PD), or any combination thereof measurements of therapeutic characteristics of drug carrying vesicles (e.g., cell line derived exosomes, EMNVS, and/or drug delivery vesicles with modified membranes for improved therapeutic targeting). In some cases, EVs or other biological or synthetic particles may be used as therapeutics in dermatology and cutaneous medical aesthetics. In some instances, EVs or other biological or synthetic particles may be used as vaccine delivery vectors.

Isolated EVs and/or the encapsulated contents thereof may be used as biomarkers during drug development. The biomarker uses during drug development may comprise diagnostic, monitoring, predictive, prognostic, pharmacodynamic and/or response, safety, risk management, or any combination thereof uses. The isolated EVs and/or encapsulated content thereof may provide a diagnostic capability of whether one or more subjects have one or more diseases or a phenotypic and/or anatomical classification and whether they should receive a treatment. The isolated EVs and/or encapsulated content thereof may be used to monitor, for example, a change in a degree and/or development of a disease of one or more subjects, toxicity, or safety of a treatment for a disease of one or more subjects, evidence of exposure of a subject to a disease or a treatment to a disease, or any combination thereof. In some cases, the isolated EVs and/or encapsulated content thereof may be used to monitor potential disease recurrence of one or more subjects. In some instances, the isolated EVs and/or encapsulated content thereof may be used when predicting a response to a treatment of a disease of one or more subjects. In some instances, the isolated EVs and/or encapsulated contents thereof or other biological or synthetic particles may be used in prognostic methods, for example, to stratify one or more subjects and to develop inclusion and/or exclusion criterion when preparing clinical trial patient cohorts. In some instances, the isolated EVs and/or encapsulated contents thereof or other biological or synthetic particles may be used to determine efficacy of a biomarker/surrogate end point and/or show biological response related to an intervention and/or exposure for one or more subject. In some cases, the isolated EVs and/or the encapsulated contents thereof or other biological or synthetic particles may be used to indicate the presence or extent of toxicity related to a therapeutic, intervention, and/or exposure to disease of one or more subjects. In some cases, the isolated EVs or other biological or synthetic particles and/or the encapsulated contents thereof may be used to indicate the potential for developing a disease or a sensitivity to an exposure to one or more diseases for one or more subjects. In some cases, EVs or other biological or synthetic particles may be used as biomarkers of early cancer detection. In some instances, EVs or other biological or synthetic particles may be used as substitutes for cerebral spine fluid biomarkers.

Device Structure

In some embodiments, the device, may comprise an electro-fluidic device as shown in a cross-sectional view in FIGS. 1A-1G and FIGS. 2A-2F. The device may comprise a chip 104 electrically coupled to at least one electrode (106, 107, 204, 205, 808, 809, 116, 117) e.g., such that the chip may transmit one or more electrical signals, described elsewhere herein, to the at least one electrode to generate one or more electric fields. In some cases, the chip (104, 206) is comprised of a base layer, an impedance layer, a metal adhesion layer, conduction layer, or any combination thereof layers. In some cases, the chip may be in electrical communication with and/or mechanically coupled to a logic layer 210, logic interface layer 212, logic connection layer 214, or any combination thereof layers, as shown in FIGS. 2E-2F. In some embodiments, a surface of the logic layer may be coupled electrically and/or mechanically to a surface of the logic interface layer 212 and/or the logic connection layer 214, where the logic connection layer and the logic interface layer comprise a surface electrically and/or mechanically coupled to the chip (104, 206). In some cases, the logic layer 210 may be housed and/or contained in a separate external device 216, as shown in FIG. 2F. In some cases, the logic layer 210 may be electrically and/or mechanically coupled to a surface of the logic connection layer 214, where the logic connection layer 214 is mechanically and/or electrically coupled to the logic interface layer 212.

In some cases, the at least one electrode (106, 107, 204, 205, 808, 809, 116, 117) may comprise a planar, curved surface, or a combination thereof surfaces, planes, contours, and/or edges. For example, an electrode of the at least one electrode may comprise at least two parallel planar surfaces and at least two curved surfaces. In some instances, an electrode of the at least one electrode may comprise one or more curved surfaces, contours, and/or edges. In some embodiments, the curved edge, contour, and/or surface of the at least one electrode may provide increase particle area capture on a surface of the at least one electrode by about 5% to about 100%. In some embodiments, the curved edge, contour, and/or surface of the at least one electrode may provide increase particle area capture on a surface of the at least one electrode by about 5% to about 10%, about 5% to about 20%, about 5% to about 50%, about 5% to about 70%, about 5% to about 80%, about 5% to about 90%, about 5% to about 100%, about 10% to about 20%, about 10% to about 50%, about 10% to about 70%, about 10% to about 80%, about 10% to about 90%, about 10% to about 100%, about 20% to about 50%, about 20% to about 70%, about 20% to about 80%, about 20% to about 90%, about 20% to about 100%, about 50% to about 70%, about 50% to about 80%, about 50% to about 90%, about 50% to about 100%, about 70% to about 80%, about 70% to about 90%, about 70% to about 100%, about 80% to about 90%, about 80% to about 100%, or about 90% to about 100%. In some embodiments, the curved edge, contour, and/or surface of the at least one electrode may provide increase particle area capture on a surface of the at least one electrode by about 5%, about 10%, about 20%, about 50%, about 70%, about 80%, about 90%, or about 100%. In some embodiments, the curved edge, contour, and/or surface of the at least one electrode may provide increase particle area capture on a surface of the at least one electrode by at least about 5%, about 10%, about 20%, about 50%, about 70%, about 80%, or about 90%. In some embodiments, the curved edge, contour, and/or surface of the at least one electrode may provide increase particle area capture on a surface of the at least one electrode by at most about 10%, about 20%, about 50%, about 70%, about 80%, about 90%, or about 100%.

In some cases, the at least one electrode may comprise a circular feature (106,107, 204, 205) and one or more electrical connectors (116, 117). In some cases, the one or more electrical connectors (116, 117) may comprise linear, curved, or zig-zag connectors. In some cases, the one or more electrical connectors (116, 117) may comprise one or more planar and/or one or more curved surfaces, as described elsewhere herein. In some cases, the one or more electrical connectors (116, 117) may be exposed or embedded within a layer of the base substrate, as shown in FIGS. 8A-8C and 9A-9B.

Figure 8A:
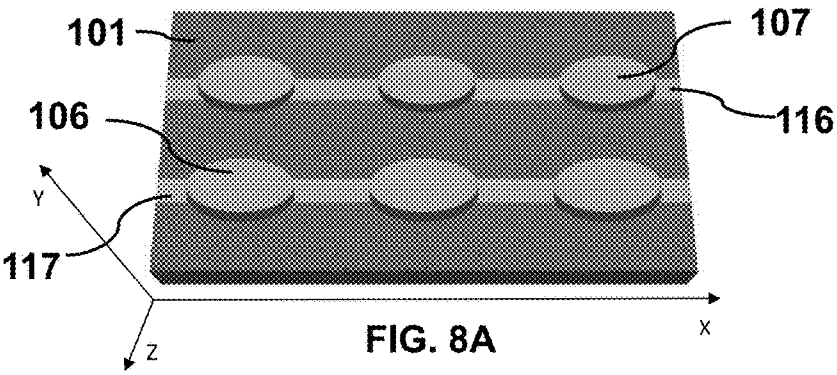
Figure 8B:
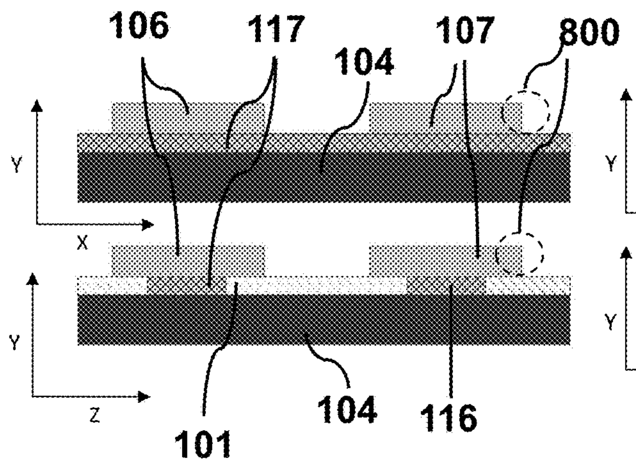
Figure 8C:
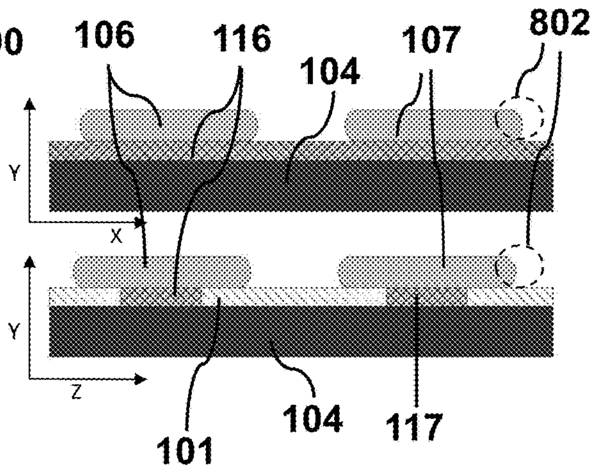
Figure 8D:
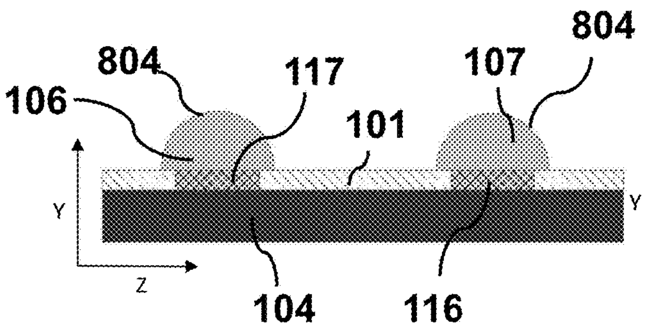
Figure 8E:
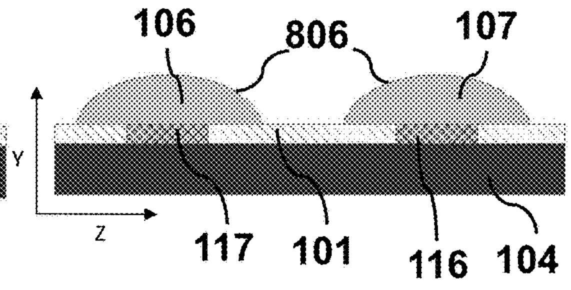

In some cases, the at least one electrode circular feature (106, 107, 204, 205) may comprise a planar electrode circular feature mechanically and/or electrically coupled to at least one electrical connector (116, 117). In some cases, all surfaces of the electrical connector (116, 117) may be shielded, masked, unexposed, and/or embedded within an upper layer 101 of the substrate and/or chip 104, as shown in FIG. 8B. In some cases, the at least one electrode circular feature (106, 107, 204, 205) may comprise one or more linear and/or planar surfaces, contours, edges, or any combination thereof (800) and/or one or more curved surfaces, contours, edges, or any combination thereof (802, 804, 806, 808, 809). In some cases, the at least one electrode circular feature (106, 107) may comprise a first radius of curvature 806 or a second radius of curvature 804, where the first radius of curvature is greater than the second radius of curvature, as shown in FIGS. 8D-8E. In some cases, the radius of curvature may comprise about 1 nm-100 μm. In some cases, the radius of curvature may comprise about 10 nm-1 μm. In some cases the radius of curvature may comprise at least 1 nm, at least 5 nm, at least 10 nm, at least 20 nm, at least 30 nm, at least 40 nm, at least 50 nm, at least 60 nm, at least 70 nm, at least 80 nm, at least 90 nm, at least 100 nm, at least 150 nm, at least 200 nm, at least 250 nm, at least 300 nm, at least 350 nm, at least 400 nm, at least 450 nm, at least 500 nm, at least 600 nm, at least 600 nm, at least 700 nm, at least 800 nm, at least 1000 nm, at least 1500 nm, at least 2000 nm, at least 2500 nm, at least 3000 nm, at least 3500 nm, 4000 nm, at least 4500 nm, at least 5000 nm, at least 6000 nm, at least 7000 nm, at least 8000 nm, at least 9000 nm, at least 1,000 nm, at least 2,000 nm, at least 3,000 nm, at least 4,000 nm, at least 5,000 nm, at least 6,000 nm, at least 7,000 nm, at least 8,000 nm, at least 9,000 nm, at least 10,000 nm, at least 20,000 nm, at least 30,000 nm, at least 40,000 nm, at least 50,000 nm, at least 60,000 nm, at least 70,000 nm, at least 80,000 nm, at least 90,000 nm, at least 100,000 nm.

In some cases, the radius of curvature may comprise about 1 nm to about 100,000 nm. In some cases, the radius of curvature may comprise about 1 nm to about 5 nm, about 1 nm to about 10 nm, about 1 nm to about 20 nm, about 1 nm to about 30 nm, about 1 nm to about 40 nm, about 1 nm to about 50 nm, about 1 nm to about 100 nm, about 1 nm to about 200 nm, about 1 nm to about 100 nm, about 1 nm to about 10,000 nm, about 1 nm to about 100,000 nm, about 5 nm to about 10 nm, about 5 nm to about 20 nm, about 5 nm to about 30 nm, about 5 nm to about 40 nm, about 5 nm to about 50 nm, about 5 nm to about 100 nm, about 5 nm to about 200 nm, about 5 nm to about 100 nm, about 5 nm to about 10,000 nm, about 5 nm to about 100,000 nm, about 10 nm to about 20 nm, about 10 nm to about 30 nm, about 10 nm to about 40 nm, about 10 nm to about 50 nm, about 10 nm to about 100 nm, about 10 nm to about 200 nm, about 10 nm to about 100 nm, about 10 nm to about 10,000 nm, about 10 nm to about 100,000 nm, about 20 nm to about 30 nm, about 20 nm to about 40 nm, about 20 nm to about 50 nm, about 20 nm to about 100 nm, about 20 nm to about 200 nm, about 20 nm to about 100 nm, about 20 nm to about 10,000 nm, about 20 nm to about 100,000 nm, about 30 nm to about 40 nm, about 30 nm to about 50 nm, about 30 nm to about 100 nm, about 30 nm to about 200 nm, about 30 nm to about 100 nm, about 30 nm to about 10,000 nm, about 30 nm to about 100,000 nm, about 40 nm to about 50 nm, about 40 nm to about 100 nm, about 40 nm to about 200 nm, about 40 nm to about 100 nm, about 40 nm to about 10,000 nm, about 40 nm to about 100,000 nm, about 50 nm to about 100 nm, about 50 nm to about 200 nm, about 50 nm to about 100 nm, about 50 nm to about 10,000 nm, about 50 nm to about 100,000 nm, about 100 nm to about 200 nm, about 100 nm to about 100 nm, about 100 nm to about 10,000 nm, about 100 nm to about 100,000 nm, about 200 nm to about 100 nm, about 200 nm to about 10,000 nm, about 200 nm to about 100,000 nm, about 100 nm to about 10,000 nm, about 100 nm to about 100,000 nm, or about 10,000 nm to about 100,000 nm. In some cases, the radius of curvature may comprise about 1 nm, about 5 nm, about 10 nm, about 20 nm, about 30 nm, about 40 nm, about 50 nm, about 100 nm, about 200 nm, about 100 nm, about 10,000 nm, or about 100,000 nm. In some cases, the radius of curvature may comprise at least about 1 nm, about 5 nm, about 10 nm, about 20 nm, about 30 nm, about 40 nm, about 50 nm, about 100 nm, about 200 nm, about 100 nm, or about 10,000 nm. In some cases, the radius of curvature may comprise at most about 5 nm, about 10 nm, about 20 nm, about 30 nm, about 40 nm, about 50 nm, about 100 nm, about 200 nm, about 100 nm, about 10,000 nm, or about 100,000 nm.

Figure 8F:
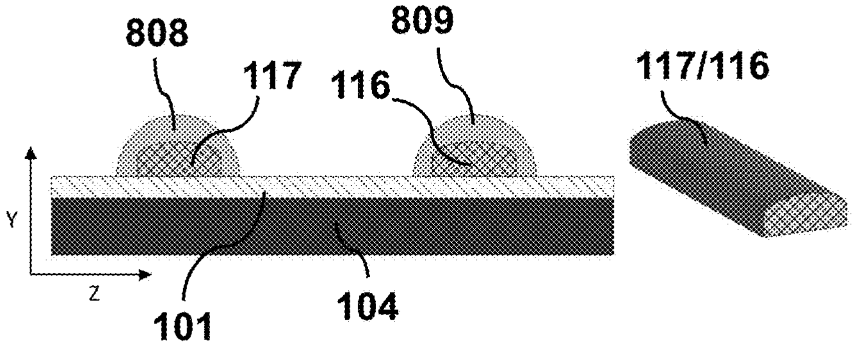

In some cases, the at least one electrode may comprise an electrode circular feature (106, 107) and one or more exposed planar electrical connectors (116, 117), as shown in FIGS. 8F and 9A-9B. In some cases, the electrode circular feature and the one or more exposed electrical connectors comprise one or more curved surfaces, contours, edges, or any combination thereof (900, 902, 908), as shown in FIGS. 8F and 9B. In some cases, the one or more planar electrode circular features (106, 107) and one or more exposed electrical connectors (116, 117) may capture particles 904 along a perimeter of the one or more planar electrode circular features and/or one or more exposed electrical connectors, as shown in FIG. 9B. In some cases, the one or more curved electrode circular features (900, 908) and one or more curved exposed electrical connectors may capture particles 904 across an area and/or surface area as shown in FIG. 9B.

Figure 5A:
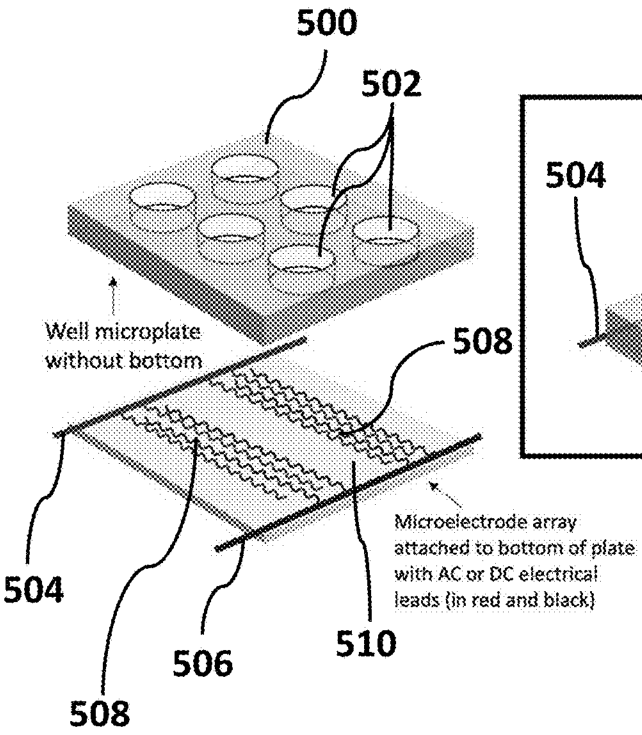
Figure 5B:
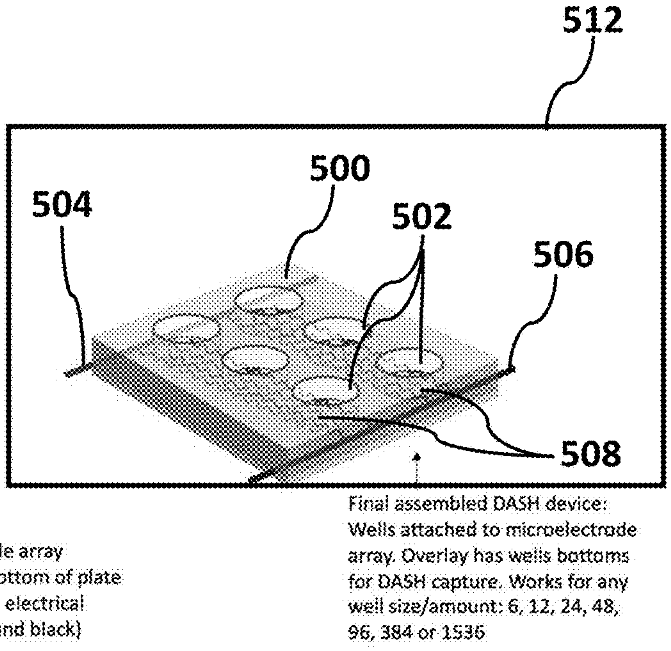

In some cases, the device may emit and/or transmit one or more electrical signals from one or more electric fields generated by the at least one electrode. The one or more electric fields may direct one or more particles towards a surface of the device where the one or more particles may be isolated, captured and/or concentrated. In some cases, the surface of the device may comprise a surface of a flow cell, where the flow cell may comprise one or more microfluidic channels. In some instances, the surface of the device may comprise a surface 510 of a multi-well plate assembly 512, e.g., a surface 510 of a 6, 12, 24, 48, 96, 384 or 1536 well plate 500, as shown in FIGS. 5A-5D. In some cases, the surface 510 may comprise at least one electrode 508, as described elsewhere herein and corresponding electrical contacts (504, 506) for the at least one electrode (i.e., contact for the cathode and/or contact for the anode electrodes, described elsewhere herein). In some cases, the electrical contacts (504, 506) may extend beyond the length and/or width of the well plate 500, as shown in FIG. 5B. In some instances, each well 502 of the multi-well plate may be placed around and/or adjacent the at least one electrode 508 such that a solution and/or fluid composition comprising one or more particles may be transported and/or provided in contact and/or adjacent to the at least one electrode 508 to isolate, concentrate, and/or capture the one or more particles on the surface 510.

Figure 5C:
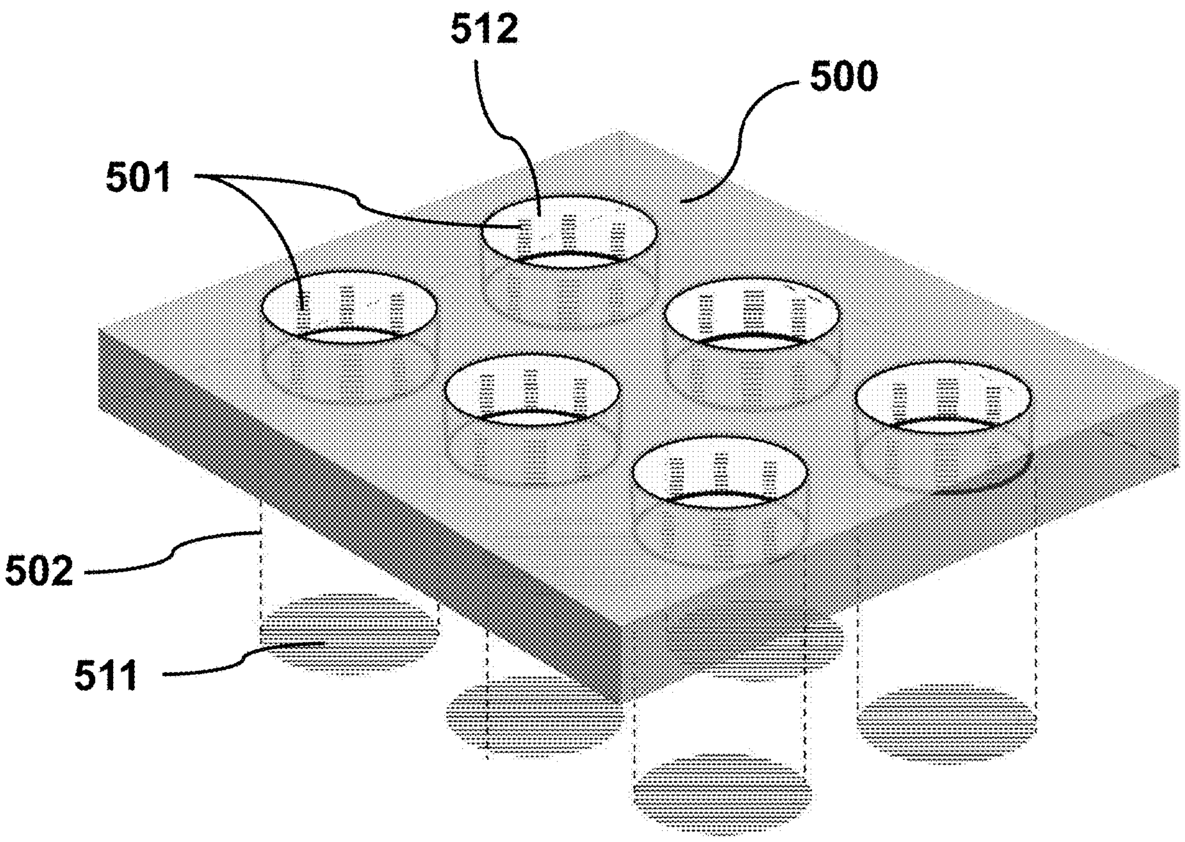
Figure 5D:
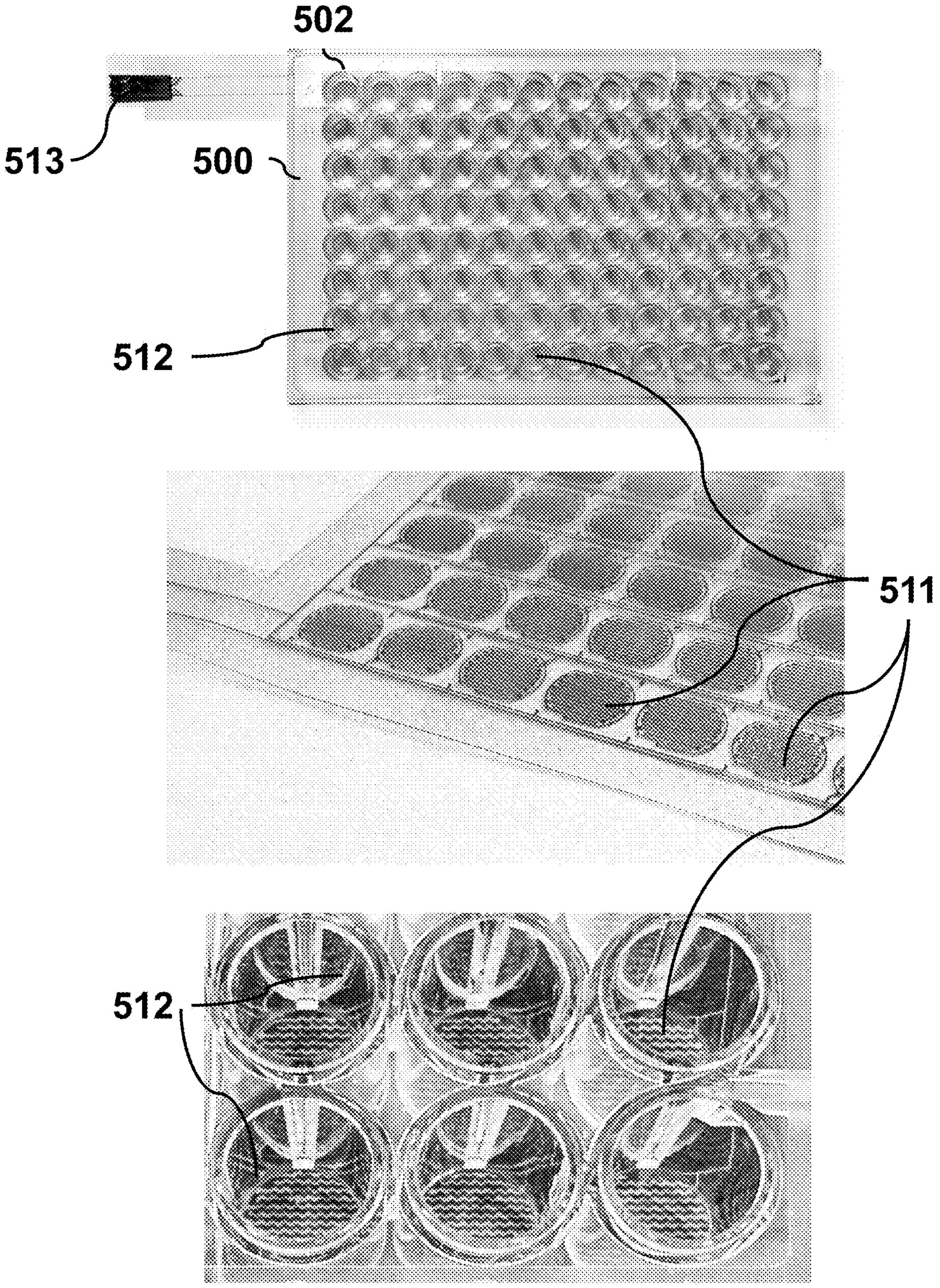

In some embodiments, a surface 512 e.g., an inner surface of the well 502 may comprise at least one electrode 501, as described elsewhere herein, coupled on a surface 512 (e.g., an inner surface) of the well 502, as shown in FIGS. 5C-5D. In some cases, the at least one electrode may facilitate and/or reduce a time to capture of one or more particles on a surface of at least one electrode 511 disposed on a surface of the bottom of the well 502. In some cases, the at least one electrode 501 disposed on an inner surface of the well 502 may provide a force (e.g., a hydro strictive force) to repel and/or push one or more particles towards the electrode 511 disposed on a surface of the bottom of the well 502. In some cases, capture of particles on the at least one electrode 501 disposed on the inner surface 512 of the well 502 may capture one or more particles based on spatial capture and/or isolation across the at least one electrode based on at least in part a geometry and curvature of the at least one electrode, as described elsewhere herein, and/or by a gravitational force acting on the one or more particles. In some cases, the at least one electrode 511 may comprise an array of electrodes, as seen in FIG. 5D. In some instances, one or more electrodes 511 of an array of electrodes may be electrically coupled to one another through one or more electrical leads or traces. In some cases, the one or more electrical leads or traces may be electrically and/or mechanically coupled to a logic layer 513, logic connection layer, and/or the logic interface layer, described elsewhere herein. In some cases, the one or more electrical leads or traces may be electrically coupled to a logic layer 513 external to the array of electrodes.

In some cases, the device may further comprise one or more sensors electrically coupled to the chip. The one or more sensors may be integrated into the device or external to the device. In some instances, the one or more sensors may be configured to measure a size (e.g., diameter) of one or more particles of a fluid sample transported across the sensors. The size determined by the one or more sensors may be utilized, in an algorithm or predictive model, as described elsewhere herein, to provide a specific frequency and/or frequency ranges of an electrical signal to the at least one electrode to isolate, capture, and/or concentrate a particle or plurality of particles of a fluid sample.

The at least one electrode (106, 107, 204, 205) may comprise a material of platinum, zinc, lithium, brass, nickel, palladium, tungsten, tin, titanium, gold, silver, aluminum, copper, rubidium, carbon, graphene, graphite, platinized carbon, gold allows, silver alloys, carbon plated gold. The device may be generated and/or manufactured by semiconductor or screen-printing methods comprised of either subtractive or additive fabrication processes or hybrid combinations of thereof. In some instances, subtractive fabrication processes may include machining, lithographic methods, removal and/or etching (e.g., laser, water jet, solvent, plasma, e-beam, etc.), patterning (e.g., mask, contact, step), or any combination thereof. In some instances, additive fabrication processes comprise deposition (e.g., thermal, chemical, ion, e-beam, sputtering, etc.), coating (e.g., dip, spin etc.), screen printing, inkjet printing, aerosol jet deposition, dispenser and/or extruder printing, nanoimprinting, gravure and gravure offset printing, 3D manufacturing, photopolymerization, powder bed fusion (selective laser/heat sintering (e.g., SLS, SHS), direct metal laser sintering (DMLS), direct metal laser melting (DMLM), electron beam melting (EBM), lamination (laminated object manufacturing (LOM), ultrasonic additive manufacturing (UAM), direct energy deposition, or any combination thereof. Subtractive fabrication processes are widely used for generating microfluidic components at scale; however, they are limited in their ability to generate complex three-dimensional geometry, they have high prototyping cost, slow turnaround and they produce significant material waste. The use of additive and hybrid fabrication processes provides the ability to generate complex geometric patterns out of materials, disclosed elsewhere herein, with high degree of precision, fast turnaround (days or weeks vs months with conventional processes), low prototyping cost, flexible production volumes, and material efficiency (up to 40% in direct material waste reduction and over 90% recyclability of components).

Figure 1A:
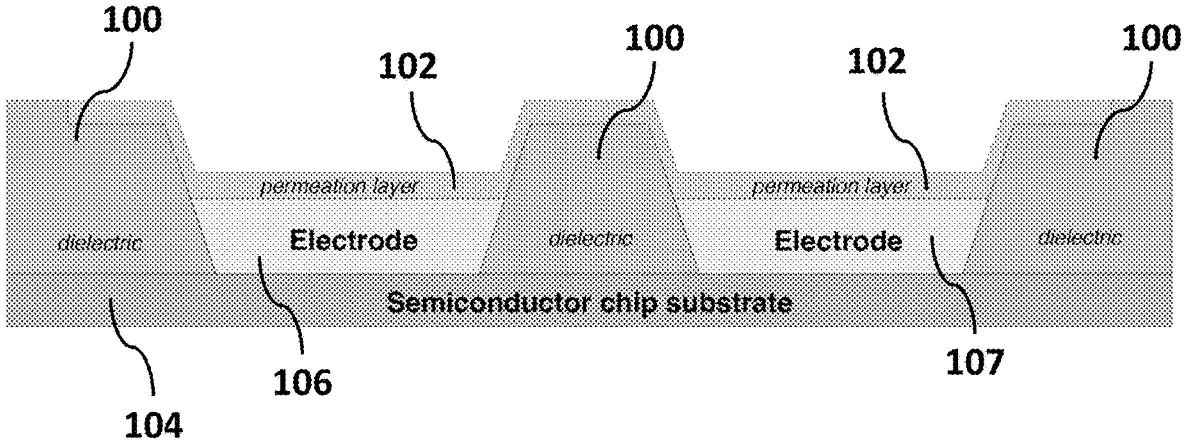
FIGS. 1A-1I show example device cross-sectional diagrams for a device constructed by semiconductor-based fabrication, as described in some embodiments herein.

The semiconductor devices, as shown in FIGS. 1A-1I, may comprise one or more structures. In some instances, the device structure may comprise a chip 104, at least one electrode (106, 107), a passivation layer (e.g., a dielectric material) 100, a coating 102, where the coating is provided on the at least one electrode (106, 107), or any combination thereof. In some cases, the chip 104 may comprise a base layer, an impedance layer 108, a metal conduction layer, or a combination thereof. In some embodiments, the base layer comprises a substrate surface comprised of a silicon wafer, glass wafer, silicon carbide, PET, Polyvinyl chloride (PVC), thermoplastics, ABS resin plastic, polyethylene plastics, polypropylene, polyimides (PIs), thermoplastic elastomers, a black colored plastic configured to minimize fluorescence, or any combination thereof. In some cases, the coating 102 may provide an increase of at least 5%, at least 10%, at least 15%, at least 20%, or at least 25% of a capture area of a surface of the chip where one or more particles of a fluid sample are isolated relative to a similar electrode under similar conditions without the coating when the fluid sample is transported across the surface. In some instances, a surface of the chip may be coupled to a passivation layer (e.g., one or more dielectric features) 100 configured to shape and/or influence a trajectory of a vector field of the emitted electric field between a first electrode 106 and a second electrode 107. In some cases, the passivation layer may comprise a first surface in contact with a surface of the chip 104 and a second surface in contact with a surface of the at least one electrode (106, 107). In some cases, the coating 102 covers surfaces of the passivation layer 100, the at least one electrode (106, 107), or a combination thereof, as shown in FIG. 1A. In some cases, the passivation layer comprises a material of silicon dioxide, silicon nitride, silicon carbide, dielectric polymers, dielectric plastics, borosilicate glass, phosphosilicate glass (PSG), borophosphosilicate glass (BPSG), or any combination thereof materials. In some cases, the dielectric polymers and/or the dielectric plastic may comprise a relative permittivity of at least 3.5 when measured at 1 kHz using conventional measuring methods.

Figure 1B:
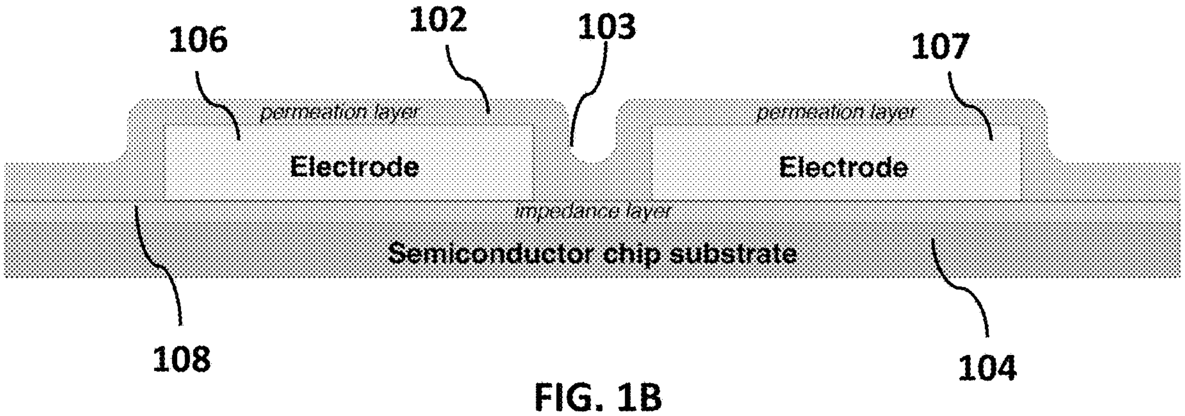

In some cases, the semiconductor devices may comprise at least one electrode (106, 107), where the at least one electrode is coated (102), and a chip 104, as seen in FIG. 1B. In some cases, the device may comprise either planar electrodes, nonplanar electrodes, or a combination of thereof. The coating 102 on the electrode may provide an increase of at least 5%, at least 10%, at least 15%, at least 20%, or at least 25% of a capture area of a surface of the device where one or more particles of a fluid sample are isolated relative to a similar electrode under similar conditions without the coating when the fluid sample is transported across the surface. In some cases, the coating may comprise a curved edge portion 103 where the curved edge portion increases capture area of the surface of the device, as described elsewhere herein. In some cases, the device comprises a curved edge portion and a non-curved edge portion. In some cases, the ratio of a length of the curved edge portion and the non-curved edge portion is about 1 to 10 or 10 to 1. In some cases, a surface of the chip may be in contact with a surface of an impedance layer 108. The impedance layer 108 may comprise a film deposited or thermally grown on a base layer surface of the chip 104. In some cases, the impedance layer may comprise thermally grown silicon dioxide, silicon nitride, silicon carbide, PSG, PBSG, or any combination thereof. In some cases, the one or more semiconductor electrodes, described elsewhere herein, may comprise PSG, PBSG, silicon nitride, silicon carbide, or any combination thereof materials.

In some instances, the impedance layer 108 may comprise a thickness of about 1 micrometer (μm) to about 100 μm. In some instances, the impedance layer may comprise a thickness of about 1 μm to about 5 μm, about 1 μm to about 10 μm, about 1 μm to about 20 μm, about 1 μm to about 30 μm, about 1 μm to about 40 μm, about 1 μm to about 50 μm, about 1 μm to about 60 μm, about 1 μm to about 70 μm, about 1 μm to about 80 μm, about 1 μm to about 90 μm, about 1 μm to about 100 μm, about 5 μm to about 10 μm, about 5 μm to about 20 μm, about 5 μm to about 30 μm, about 5 μm to about 40 μm, about 5 μm to about 50 μm, about 5 μm to about 60 μm, about 5 μm to about 70 μm, about 5 μm to about 80 μm, about 5 μm to about 90 μm, about 5 μm to about 100 μm, about 10 μm to about 20 μm, about 10 μm to about 30 μm, about 10 μm to about 40 μm, about 10 μm to about 50 μm, about 10 μm to about 60 μm, about 10 μm to about 70 μm, about 10 μm to about 80 μm, about 10 μm to about 90 μm, about 10 μm to about 100 μm, about 20 μm to about 30 μm, about 20 μm to about 40 μm, about 20 μm to about 50 μm, about 20 μm to about 60 μm, about 20 μm to about 70 μm, about 20 μm to about 80 μm, about 20 μm to about 90 μm, about 20 μm to about 100 μm, about 30 μm to about 40 μm, about 30 μm to about 50 μm, about 30 μm to about 60 μm, about 30 μm to about 70 μm, about 30 μm to about 80 μm, about 30 μm to about 90 μm, about 30 μm to about 100 μm, about 40 μm to about 50 μm, about 40 μm to about 60 μm, about 40 μm to about 70 μm, about 40 μm to about 80 μm, about 40 μm to about 90 μm, about 40 μm to about 100 μm, about 50 μm to about 60 μm, about 50 μm to about 70 μm, about 50 μm to about 80 μm, about 50 μm to about 90 μm, about 50 μm to about 100 μm, about 60 μm to about 70 μm, about 60 μm to about 80 μm, about 60 μm to about 90 μm, about 60 μm to about 100 μm, about 70 μm to about 80 μm, about 70 μm to about 90 μm, about 70 μm to about 100 μm, about 80 μm to about 90 μm, about 80 μm to about 100 μm, or about 90 μm to about 100 μm. In some instances, the impedance layer 108 may comprise a thickness of about 1 μm, about 5 μm, about 10 μm, about 20 μm, about 30 μm, about 40 μm, about 50 μm, about 60 μm, about 70 μm, about 80 μm, about 90 μm, or about 100 μm. In some instances, the impedance layer 108 may comprise a thickness of at least about 1 μm, about 5 μm, about 10 μm, about 20 μm, about 30 μm, about 40 μm, about 50 μm, about 60 μm, about 70 μm, about 80 μm, or about 90 μm. In some instances, the impedance layer 108 may comprise a thickness of at most about 5 μm, about 10 μm, about 20 μm, about 30 μm, about 40 μm, about 50 μm, about 60 μm, about 70 μm, about 80 μm, about 90 μm, or about 100 μm.

In some cases, a surface of the impedance layer 108 may be coupled to a first surface of metal adhesion layer, and where the metal adhesion layer may comprise a second surface coupled to the at least one electrode (106, 107). In some instances, the metal adhesion layer may allow for the at least one electrode to couple to the impedance layer. In some cases, the impedance layer 108 may be configured to reduce cross-talk between a first electrode 106 and a second electrode 107 by at least about 20%, at least about 30%, at least about 40%, at least about 50%, at least about 60%, at least about 70%, at least about 80%, at least about 90%, or by at least about 95%. In some cases, the metal adhesion layer may comprise a material of titanium, tungsten, silver, copper, gold, or any combination thereof.

In some instances, the metal adhesion layer may comprise a thickness of about 10 nm to about 300 nm. In some instances, the metal adhesion layer may comprise a thickness of about 10 nm to about 20 nm, about 10 nm to about 40 nm, about 10 nm to about 60 nm, about 10 nm to about 80 nm, about 10 nm to about 100 nm, about 10 nm to about 140 nm, about 10 nm to about 180 nm, about 10 nm to about 200 nm, about 10 nm to about 240 nm, about 10 nm to about 280 nm, about 10 nm to about 300 nm, about 20 nm to about 40 nm, about 20 nm to about 60 nm, about 20 nm to about 80 nm, about 20 nm to about 100 nm, about 20 nm to about 140 nm, about 20 nm to about 180 nm, about 20 nm to about 200 nm, about 20 nm to about 240 nm, about 20 nm to about 280 nm, about 20 nm to about 300 nm, about 40 nm to about 60 nm, about 40 nm to about 80 nm, about 40 nm to about 100 nm, about 40 nm to about 140 nm, about 40 nm to about 180 nm, about 40 nm to about 200 nm, about 40 nm to about 240 nm, about 40 nm to about 280 nm, about 40 nm to about 300 nm, about 60 nm to about 80 nm, about 60 nm to about 100 nm, about 60 nm to about 140 nm, about 60 nm to about 180 nm, about 60 nm to about 200 nm, about 60 nm to about 240 nm, about 60 nm to about 280 nm, about 60 nm to about 300 nm, about 80 nm to about 100 nm, about 80 nm to about 140 nm, about 80 nm to about 180 nm, about 80 nm to about 200 nm, about 80 nm to about 240 nm, about 80 nm to about 280 nm, about 80 nm to about 300 nm, about 100 nm to about 140 nm, about 100 nm to about 180 nm, about 100 nm to about 200 nm, about 100 nm to about 240 nm, about 100 nm to about 280 nm, about 100 nm to about 300 nm, about 140 nm to about 180 nm, about 140 nm to about 200 nm, about 140 nm to about 240 nm, about 140 nm to about 280 nm, about 140 nm to about 300 nm, about 180 nm to about 200 nm, about 180 nm to about 240 nm, about 180 nm to about 280 nm, about 180 nm to about 300 nm, about 200 nm to about 240 nm, about 200 nm to about 280 nm, about 200 nm to about 300 nm, about 240 nm to about 280 nm, about 240 nm to about 300 nm, or about 280 nm to about 300 nm. In some instances, the metal adhesion layer may comprise a thickness of about 10 nm, about 20 nm, about 40 nm, about 60 nm, about 80 nm, about 100 nm, about 140 nm, about 180 nm, about 200 nm, about 240 nm, about 280 nm, or about 300 nm. In some instances, the metal adhesion layer may comprise a thickness of at least about 10 nm, about 20 nm, about 40 nm, about 60 nm, about 80 nm, about 100 nm, about 140 nm, about 180 nm, about 200 nm, about 240 nm, or about 280 nm. In some instances, the metal adhesion layer may comprise a thickness of at most about 20 nm, about 40 nm, about 60 nm, about 80 nm, about 100 nm, about 140 nm, about 180 nm, about 200 nm, about 240 nm, about 280 nm, or about 300 nm. In some cases, the surface, of the devices described elsewhere herein, may comprise a surface of a flow cell, where the flow cell may comprise one or more microfluidic channels.

Figure 1C:
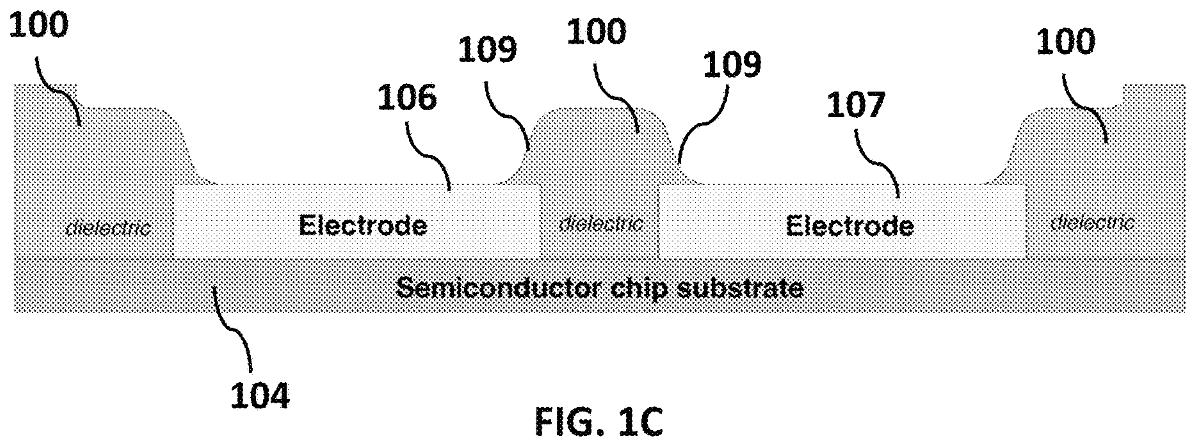

In some embodiments, the semiconductor devices may comprise a chip 104 coupled to at least one electrode (106, 107) and a passivation layer 100, as described elsewhere herein, where the passivation layer comprises one or more curved edge portions 109, as shown in FIG. 1C. The curved edge portion 109 of the electrode may provide an increase of at least 5%, at least 10%, at least 15%, at least 20%, or at least 25% of a capture area of a surface of the device where one or more particles of a fluid sample are isolated relative to a similar electrode under similar conditions without the coating when the fluid sample is transported across the surface. In some cases, the device comprises a curved edge portion and a non-curved edge portion. In some cases, the ratio of a length of the curved edge portion and the non-curved edge portion is about 1 to 10 or 10 to 1. In some cases, the passivation layer comprises a material of silicon dioxide, silicon nitride, silicon carbide, high-k dielectric polymers, high-k dielectric plastics, borosilicate glass, PSG, BPSG, or any combination thereof materials. In some instances, the passivation layer (e.g., one or more dielectric features) 109 may be configured to shape and/or influence a trajectory of a vector field of the emitted electric field between a first electrode 106 and a second electrode 107.

Figure 1D:
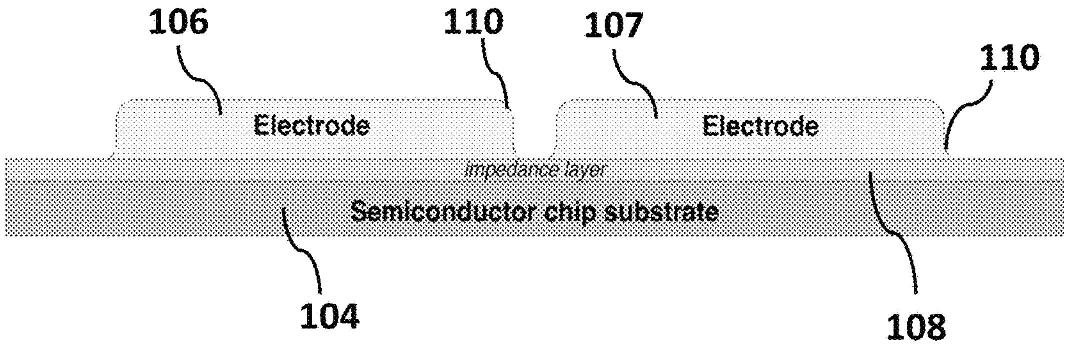

In some embodiments, the semiconductor devices may comprise a chip 104 coupled to at least one electrode (106,107) and an impedance layer 108 (as described elsewhere herein), as shown in FIG. 1D. In some cases, the at least one electrode (106, 107) may comprise one or more curved edge portions 110, as shown in FIG. 1D. The curved edge portion 110 of the at least one electrode (106, 107) may provide an increase of at least 5%, at least 10%, at least 15%, at least 20%, or at least 25% of a capture area of a surface of the device where one or more particles of a fluid sample are isolated, concentrated, and/or captured relative to a similar electrode under similar conditions without the coating when the fluid sample is transported across the surface. In some cases, the device comprises a curved edge portion and a non-curved edge portion. In some cases, the ratio of a length of the curved edge portion and the non-curved edge portion is about 1 to 10 or 10 to 1.

Figure 1E:
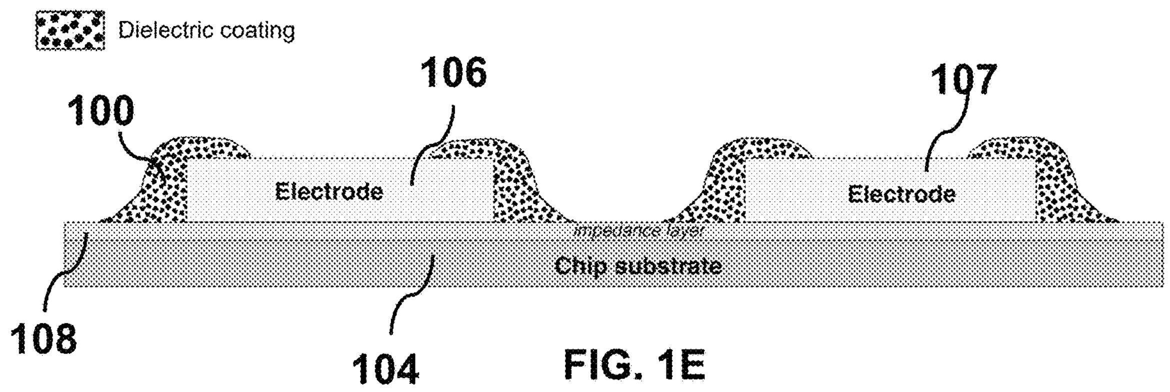
Figure 1F:
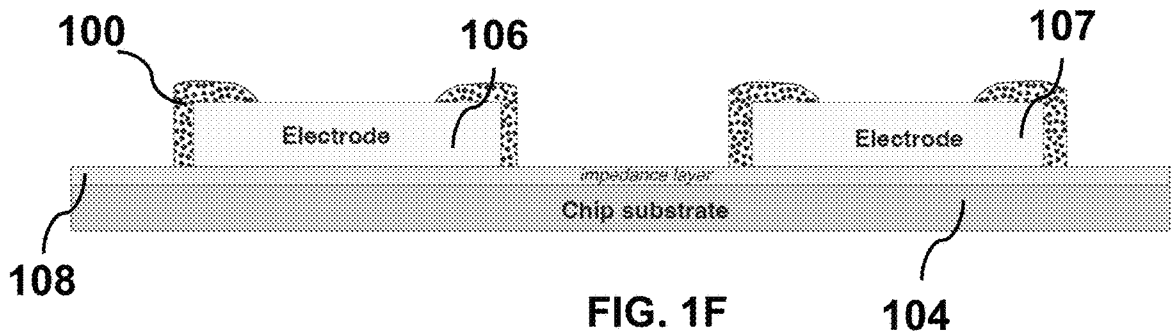
Figure 1G:
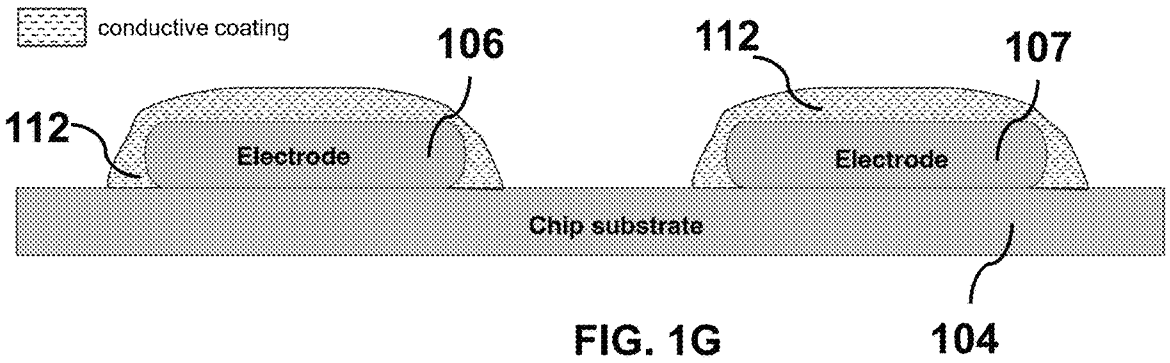
Figure 1H:
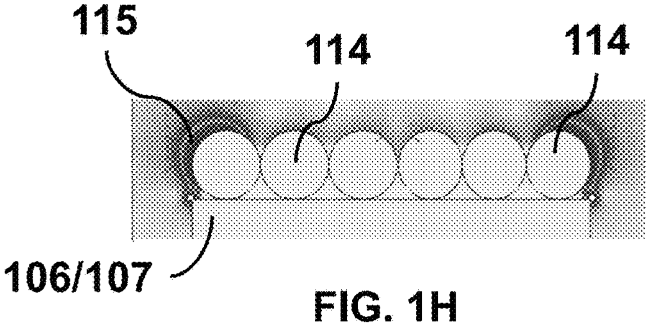
Figure 1I:
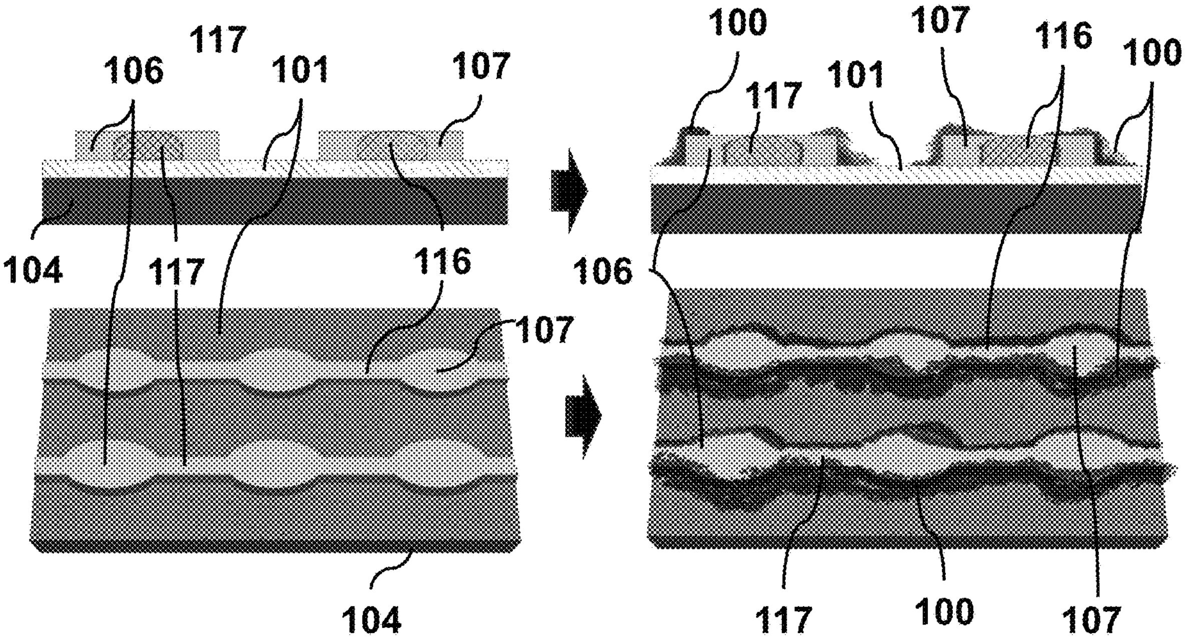

In some embodiments, the semiconductor device may comprise a chip 104 coupled to at least one electrode (106,107, 116, 117), an upper layer of the substrate and/or chip 101 (e.g., an impedance layer 108), and a dielectric coating 100 (described elsewhere herein), as shown in FIGS. 1E and 1I. In some cases, the dielectric coating 100 may coat one or more surfaces of the at least one electrode (106,107, 116, 117) and a surface of the upper layer of the substrate and/or chip 101 e.g., the impedance layer 108. In some cases, the dielectric coating 100 may form a curved surface, contour, and/or edge between one or more surfaces of the at least one electrode and a surface of the impedance layer 108. In some cases, the dielectric coating may coat one or more surfaces of a circular feature (106,107) and/or one or more electrical connectors (116, 117). In some cases, the dielectric coating may partially coat one or more surfaces of a circular feature (106,107) and/or one or more electrical connectors (116, 117). In some embodiments, the dielectric coating 100 may be etched away by a light source (e.g., a laser) to generate one or more planar and/or curved surfaces of the dielectric coating 100, as shown in FIG. 1F. In some cases, the dielectric coating forming a curved surface, contour, and/or edge increases an area and/or surface area capture of particles on the at least one electrode by at least about 5%.

In some embodiments, the semiconductor device may comprise a chip 104 coupled to at least one electrode (106, 107) and a conductive coating 112, as shown in FIG. 1G. In some cases, the conductive coating, as described elsewhere herein, may form a curved surface, contour, and/or edge between one or more surfaces of the least one electrode and a surface of the chip 104.

In some cases, the at least one electrode (106,107), as described elsewhere herein, may comprise a coating one or more particles (as described elsewhere herein), as shown in FIG. 1H. In some instances, the one or more particles 114 may comprise one or more conductive and/or dielectric particles, described elsewhere herein. In some cases, the one or more particles 114 e.g., one or more nanospheres increase an area and/or surface area capture of particles 115 on the at least one electrode by at 5%.

In some embodiments, the screen-printed devices, as shown in FIGS. 2A-2D, may comprise a chip 206, an electrical conduction layer 208, passivation layer 200, at least one electrode (204, 205), a coating 202, or any combination thereof. The screen-printed devices may be manufactured for a cost less than the cost of the semiconductor devices, described elsewhere herein. The lower cost of screen-printed devices generates utility of the devices, described elsewhere herein, for wide scale use, accessibility, and/or adoption into highly multiplexed assays and/or point of care diagnostics. Moreover, the screen-printed devices may comprise a lower z-axis resolution compared to the z-axis resolution of the semiconductor devices. The lower z-axis resolution provided by the screen-printed device manufacturing methods may generate a porous and/or coarse surface of the devices, described elsewhere herein. The porous and/or coarse surface may increase capture of the device by at least 5%, at least 10%, at least 15%, at least 20%, or at least 25% of a capture area of a surface of the device where one or more particles of a fluid sample are isolated relative to a similar device under similar conditions without the porous and/or coarse surface when the fluid sample is transported across the surface. In some instances, the electrical conduction layer 208 may comprise gold, silver, copper, aluminum, zinc, lithium, brass, nickel, palladium, platinum, tungsten, tin, titanium, or any combination thereof materials. In some cases, a first surface of the electrical conduction layer may be coupled to a surface of the chip 206, passivation layer 200, at least one electrode (204, 205), coating 202, or any combination thereof. In some instances, the coating 202 of the at least one electrode (204, 205) may provide an increase of at least 5%, at least 10%, at least 15%, at least 20%, or at least 25% of a capture area of a surface of the device where one or more particles of a fluid sample are isolated relative to a similar electrode under similar conditions without the coating when the fluid sample is transported across the surface.

Figure 2A:
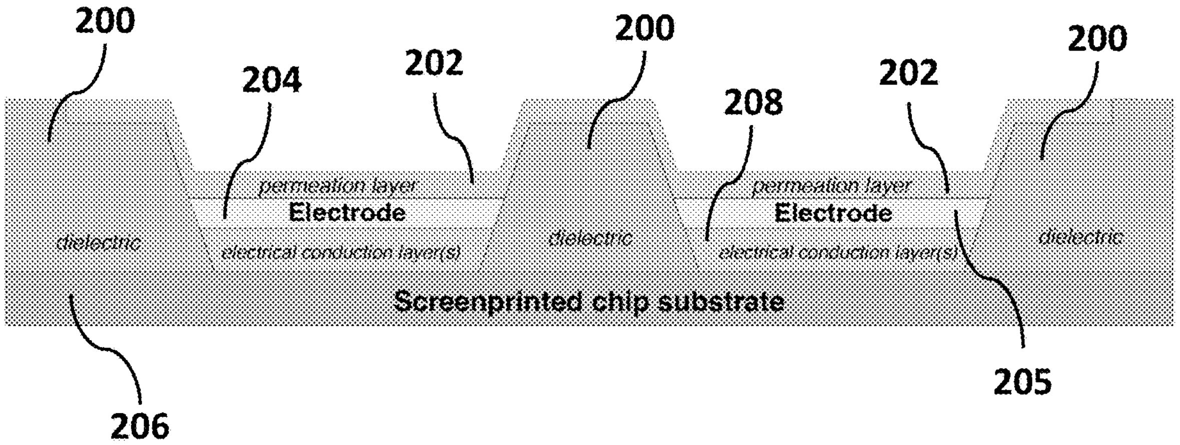
FIGS. 2A-2F show example device cross-sectional diagrams for a device constructed by screen printing-based fabrication, as described in some embodiments herein.
Figure 2B:
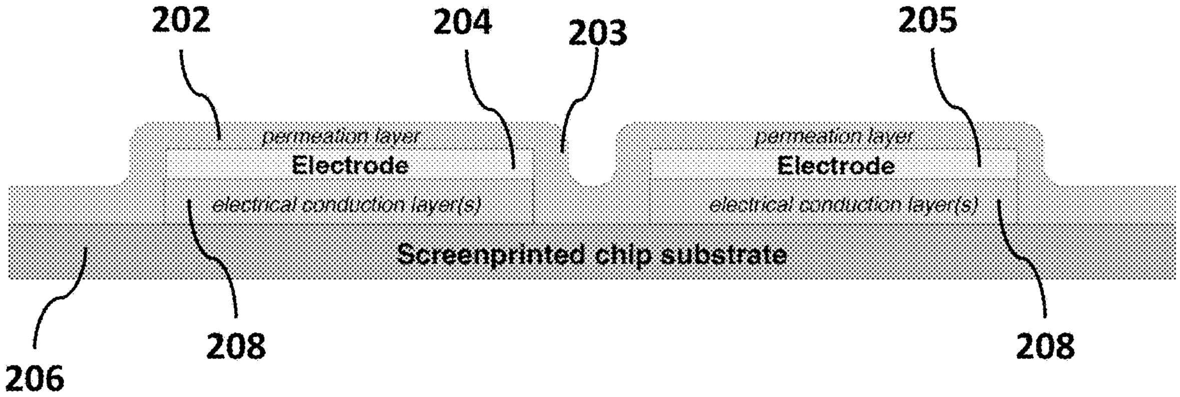

In some cases, screen-printed devices may comprise a chip 206, an electrical conduction layer 208, at least one electrode (204, 205), and a coating 202, as shown in FIG. 2B. The coating 202 may comprise a curved edge portion 203. In some cases, the curved edge portion may provide an increase of at least 5%, at least 10%, at least 15%, at least 20%, or at least 25% of a capture area of a surface of the device where one or more particles of a fluid sample are isolated, concentrated, and/or captured relative to a similar electrode under similar conditions without the coating when the fluid sample is transported across the surface. In some cases, the device comprises a curved edge portion and a non-curved edge portion. In some cases, the ratio of a length of the curved edge portion and the non-curved edge portion is about 1 to 10 or 10 to 1.

Figure 2C:
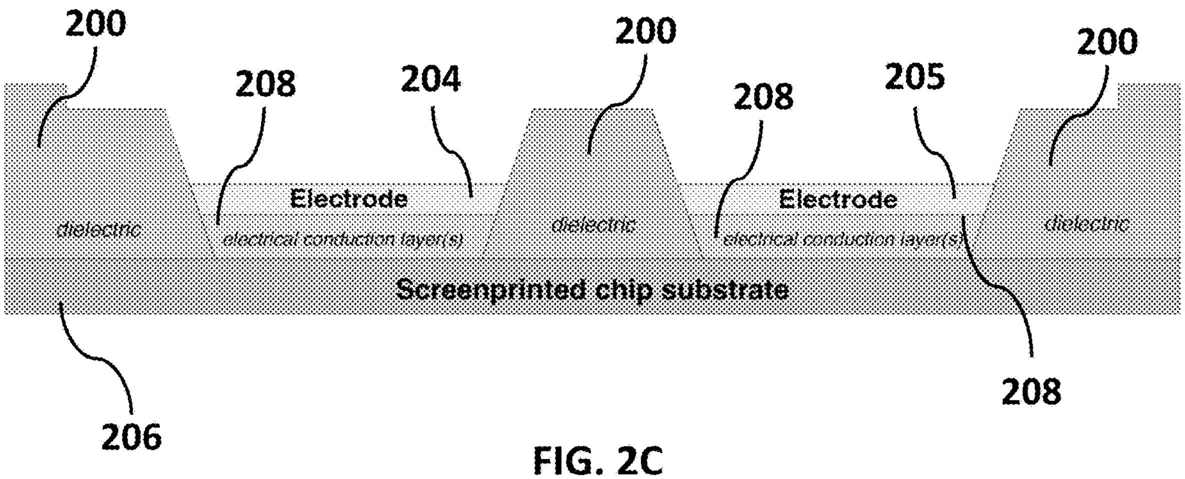

In some embodiments, the screen-printed devices, as shown in FIG. 2C, may comprise a chip 206, an electrical conduction layer 208, passivation layer 200, at least one electrode (204, 205), or any combination thereof. In some cases, the passivation layer 200 may comprise a curved edge portion. In some instances, the curved edge portion of the passivation layer 200 may provide an increase of at least 5%, at least 10%, at least 15%, at least 20%, or at least 25% of a capture area of a surface of the device where one or more particles of a fluid sample are isolated relative to a similar electrode under similar conditions without the coating when the fluid sample is transported across the surface. In some instances, the electrical conduction layer 208 may comprise gold, silver, copper, aluminum, zinc, lithium, brass, nickel, palladium, platinum, tungsten, tin, titanium, or any combination thereof materials. In some cases, a first surface of the electrical conduction layer may be coupled to a surface of the chip 206, passivation layer 200, at least one electrode (204, 205), coating 202, or any combination thereof. In some cases, the device comprises a curved edge portion and a non-curved edge portion. In some cases, the ratio of a length of the curved edge portion and the non-curved edge portion is about 1 to 10 or 10 to 1.

Figure 2D:
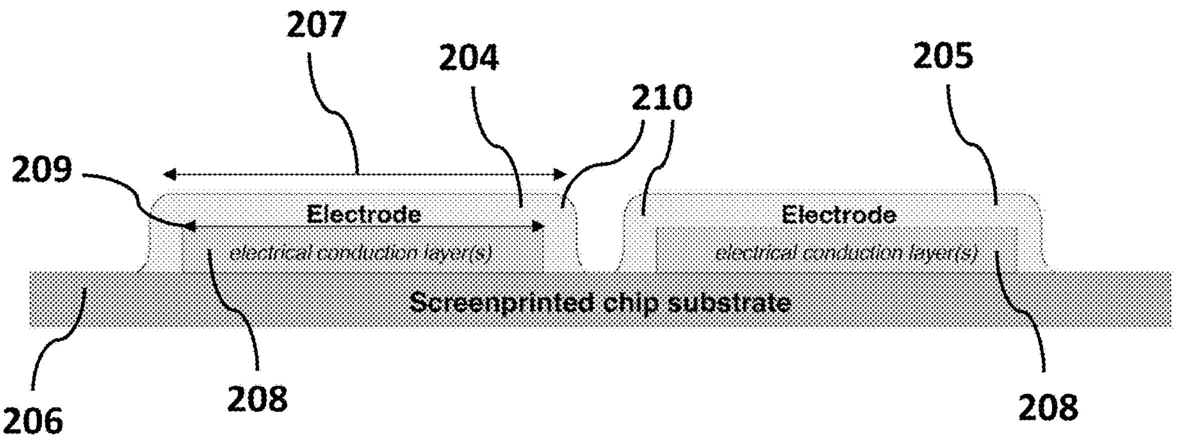
Figure 2E:
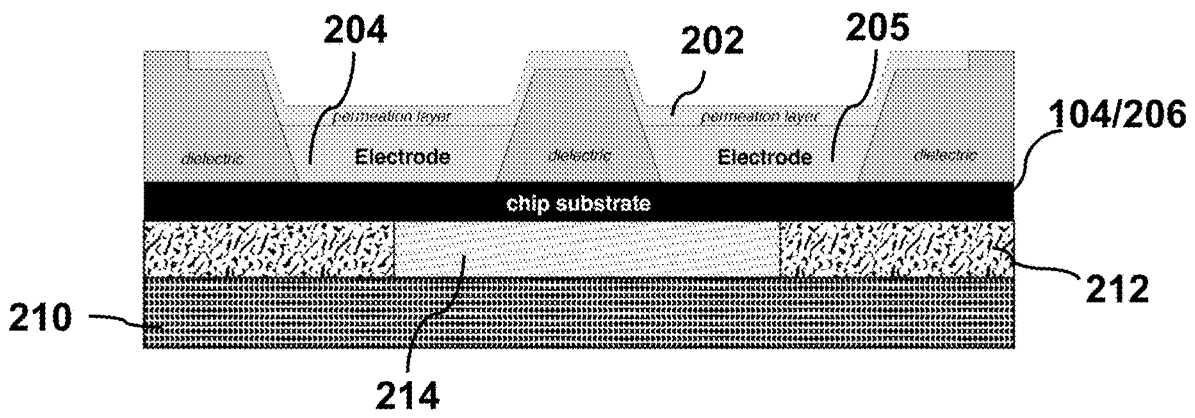
Figure 2F:
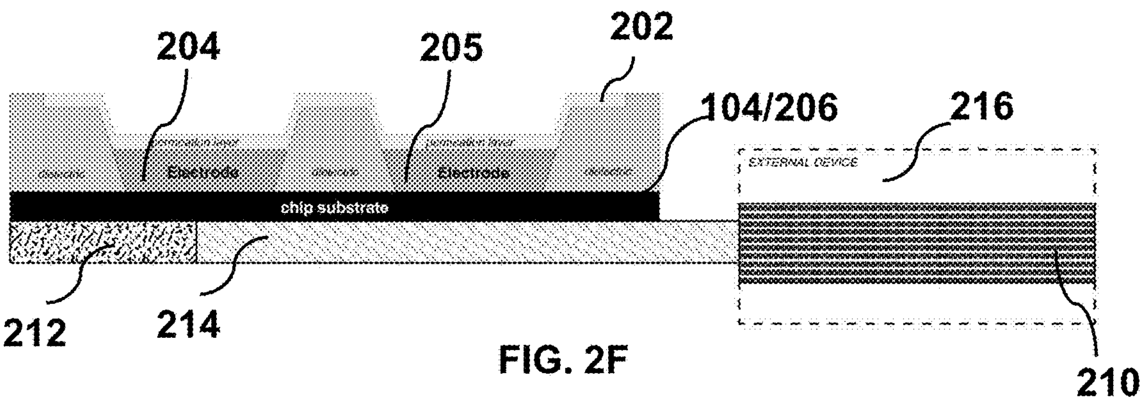

In some embodiments, the screen-printed devices, as shown in FIG. 2D, may comprise a chip 206, an electrical conduction layer 208, at least one electrode (204,205), or any combination thereof as described elsewhere herein. In some cases, the electrical conduction layer 208 may comprise a first surface coupled to a surface of the chip 206. In some instances, the electrical conduction layer 208 may comprise a second surface coupled to a surface of the at least one electrode (204, 205). In some cases, the electrical conduction layer may comprise a width 209 that is shorter than a width of the electrode 207, as shown in FIG. 2D, causing the electrode to extend and generate a curved edge portion 210 across the width of the device. The curved edge portion may provide an increase of at least 5%, at least 10%, at least 15%, at least 20%, or at least 25% of a capture area of a surface of the device where one or more particles of a fluid sample are isolated relative to a similar electrode under similar conditions without the coating when the fluid sample is transported across the surface.

Figure 6A:
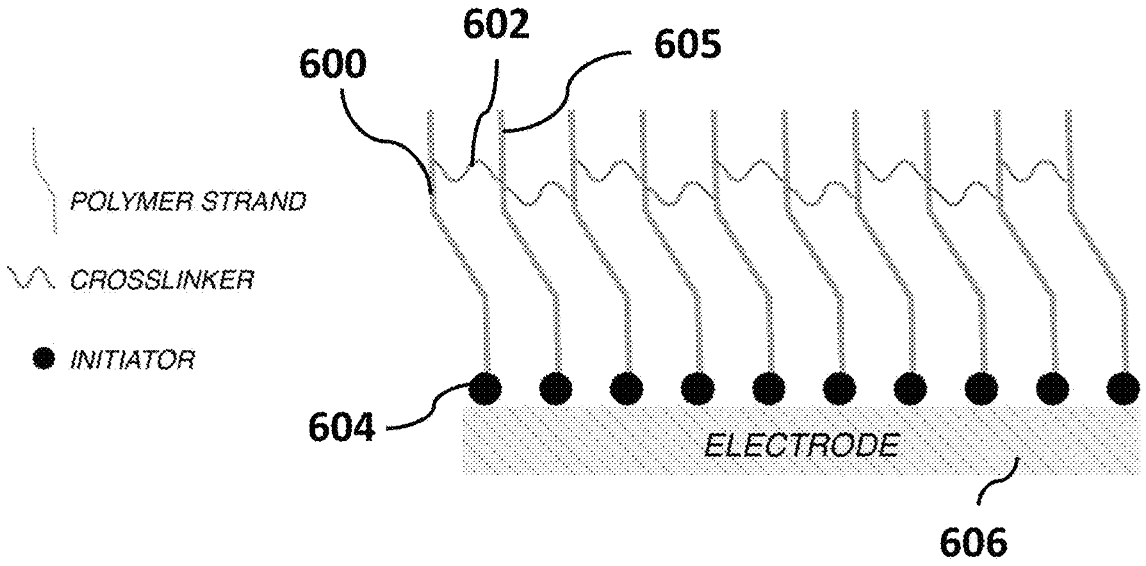

In some embodiments, the coating (102, 202, 609), as described elsewhere herein, e.g., FIGS. 1A-1B, 2A-2B, 6B-6E may comprise a material of agarose, polyacrylamide, acrylamides, N-substituted acrylamides, N-substituted methacrylamides, methacrylamide chitosan, alginate, collagen, cellulose acetate, cellulose acetate butyrate, cellulose acetate phthalate, sol-gels, aerogels, xerogels, xylogels, cryogels, carbogels, subgels, silicone hydrogels, conjugated polymers, polypyrrole (Ppy), polyethylene, polyaniline, polythiophene derivatives, poly(3,4-ethylenedioxythiophene) doped with poly(styrene sulfonate) (PEDOT:PSS), acrylamide based polymer, polythiophene based polymer, vinyl based polymer, any derivatives thereof, or any combination thereof. In some cases, the sol-gels may comprise metal oxides e.g., aluminum oxides and/or silicon oxides. In some instances, the sol-gels may comprise metal alkoxides e.g., TEOS, TMES, and/or TMOS. In some cases, the sol-gels may comprise metal chlorides e.g., Hexachlorotungsten and/or silicon chlorides. In some cases, the sol-gels may comprise organic (e.g., resorcinol-formaldehyde and/or melamine-formaldehyde) nanoparticles, and/or ceramic nanoparticles. In some instances, the coating may comprise a hydrophilic, biocompatible, non-biofouling or any combination thereof surface. The surface may be configured to protect both fluid composition and one or more particles of fluid composition from the effects of chemistry on the at least one electrode surface (e.g., acid and/or base creation and damage to the particles and/or other fluid composition constituents from the by-product reactions). In some cases, the coating provides a reversible mechanical protection (i.e., gel cushioning) to the one or more particles isolated, captured, and/or concentrated on the surface of the device prior to releasing them to elute the one or more particles, as described elsewhere herein. In some instances, the coating may comprise a gel, hydrogel, or a combination thereof. In some instances, the coating may be grown on a surface (e.g., a surface of an electrode). The coating may be grown by disposing a polymer initiator 604 onto a surface of the electrode 606 and growing a polymer strand (600, 605) from the polymer initiator 604, as shown in FIG. 6A. In some cases, the initiator 604 may comprise a thermal radical, thermal cationic, photopolymerizing, water soluble emulsion polymerization, silane, siloxane, organic solvent, or any combination thereof initiator. In some cases, the thermal radial initiators may comprise AZO, TBHP, BPO, APS, or any combination thereof. In some instances, the thermal cationic initiators may comprise dicyandiamide, cyclohexyl tosylate, triphenyl sulphonium, nonaflate, or any combination thereof. In some cases, the photopolymerizing initiators may comprise photo radicals, photo-cationic, photo-anionic or any combination thereof photopolymerizing initiators. Photo radical photopolymerizing initiators may comprise acetophenone, camphor quinone, benzophenone, 4'-hydroxyacetophenone, 4-henzoylbenzoic acid, p-anisil, ferrocene, or any combination thereof. In some instances, the photo-cationic photopolymerizing initiators may comprise diphenyl iodonium hexafluoro arsenate, triphenyl sulfonium bromide, or any combination thereof. In some cases, the photo-anionic photopolymerizing initiators may comprise acetophenone O-benzoyl oxime, nifedipine, or a combination thereof. The water-soluble emulsion polymerization initiators may comprise potassium persulfate, organic water-soluble initiator 4,4'-axobis (4-cyanovaleric acid), or any combination thereof. The silane and siloxane initiators may comprise methoxy silanes, mono chlorosilanes, tri chlorosilanes, or any combination thereof. In some cases, the organic solvent initiators may comprise 2,2'-axobis (2-methylpropionitrile), benzoyl peroxide, or any combination thereof. In some cases, standard polymerization methods may be used when growing the coating on the surface of the electrode e.g., thermal activation, photoactivation, or by initiators for continuous activator regeneration (ICAR). In some cases, the methods of growing the coating on the surface may comprise Nitroxide-Mediated Radical Polymerization (NMP), Atom-transfer radical-polymerization (ATRP), reversible addition-fragmentation chain-transfer (RAFT), Activators ReGenerated by Electron Transfer-polymerization (ARGET), or any combination thereof methods.

In some instances, the method of growing the coating may comprise polymerizing the polymer strand and disposing a cross-linker 602 configured to couple to at least a first polymer strand 600 and a second polymer strand 605. The cross-linker may bind to a plurality of polymer strands. The cross-linker may alter porosity, thickness, hydrophilicity, or any combination thereof properties of the coating. In some cases, the cross-linker 602 may comprise UV-activated cross-linkers with photo initiators. In some cases, the UV-active cross-linkers with photo initiators may comprise N,N'-methylenebis(acrylamide) (MBA, cross-linker), 1-hydroxycyclohexyl phenyl ketone (photo initiator 184), sodium borate, sodium boric acid, Glyoxal, Silane, Oxidized dextrins, Glutaraldehyde, Epichlorohydrin, Endogen polyamine spermidine, Oxidized alginate, Zinc, Borax, Ethylene glycol dimethacrylate (EGDMA), or any combination thereof. In some instances, the cross-linker 602 may be included in a polymerization solution provided to the grown polymer prior to polymerizing, as described elsewhere herein. The cross-linker may be photoactivated or chemically activated to crosslink. The amounts and timing of polymerization may determine porosity, coating integrity, flexibility, thickness, or any combination thereof.

In some cases, the coating (102, 202, 609), may be generated by spin coating, dip coating, mold-stamping, bar coating, printing, vapor-phase deposition, thin film deposition, screen-printing, 3D printing, electroplating, spray coating, flow coating, capillary coating, the climbing cover process, or any combination thereof.

Figure 6B:
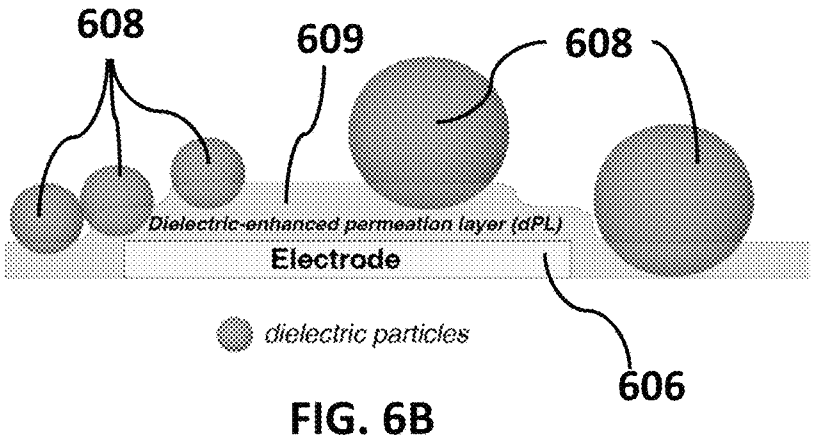
Figure 6C:
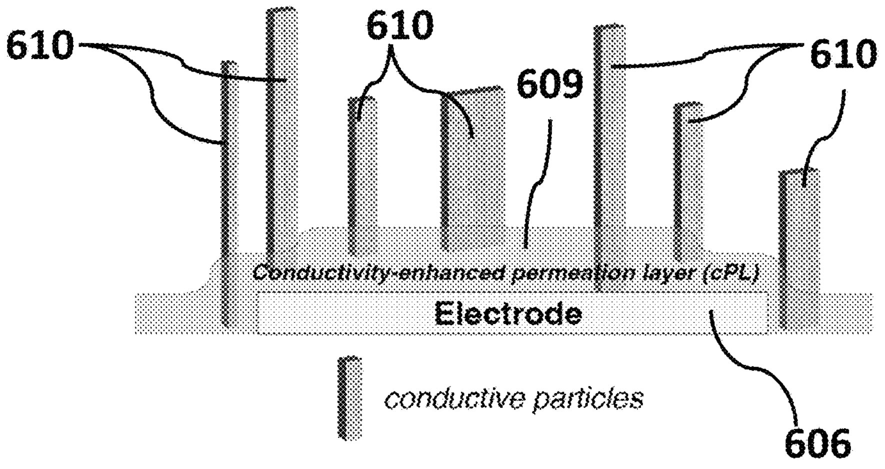
Figure 6D:
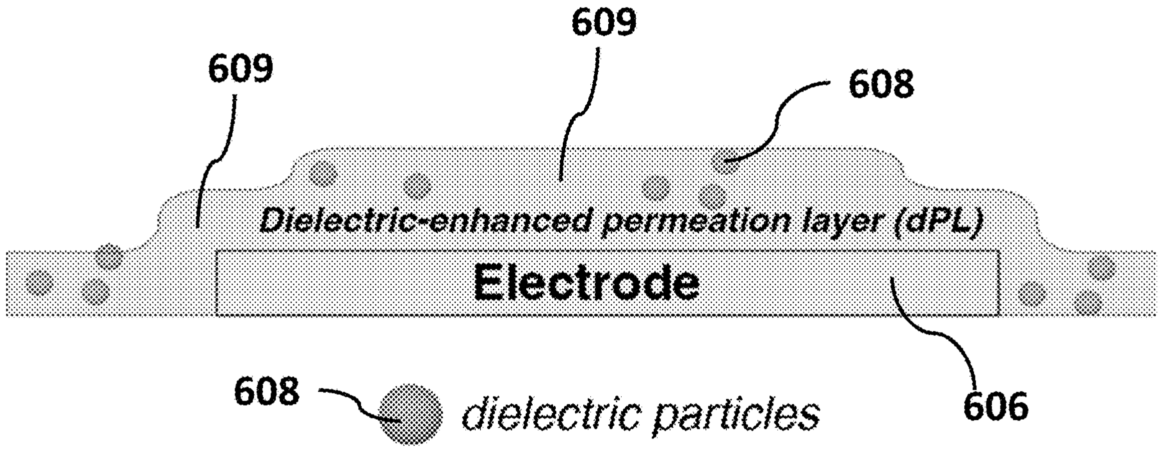
Figure 6E:
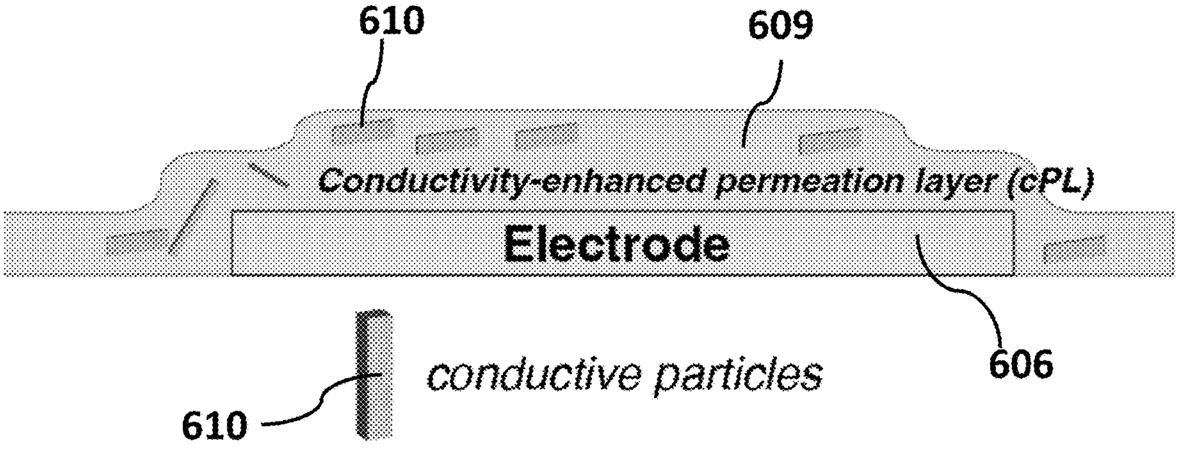

In some instances, the electrode(s) (106,107, 204, 205, 606) coating (102, 202, 609) may comprise one or more particles. In some cases, the one or more particles may be provided on top surface of the coating, within the coating, in contact with a surface of the electrode(s) (106,107, 204, 205, 606), or a combination thereof configurations. In some cases, the coating (102, 202, 609) may comprise a thickness up to about ⅓ a distance between a first electrode (106, 204) and a second electrode (107, 205), described elsewhere herein. In some instances, the one or more particles are provided to a first area of the electrode(s) (106,107, 204, 205, 606) or a second area of the electrodes. In some cases, the first area and the second area partially overlap or do not overlap. In some cases, the one or more particles may comprise dielectric particles 608, conductive particles 610, or a combination thereof, as seen in FIGS. 6B-6E. In some cases, the one or more dielectric particles 608 may be disposed and/or placed within the coating 609, where the one or more dielectric particles may comprise a first surface that is in contact with a surrounding atmosphere and/or environment external to the coating and a second surface that is in contact with the coating, as shown in FIG. 6B. In some cases, the one or more dielectric particles 608 may be encapsulated within and/or surrounded by the coating 609, as shown in FIG. 6D. In some cases, the one or more conductive particles 610 may be disposed and/or placed within the coating 609, where the one or more conductive particles may comprise a first surface that is in contact with a surrounding atmosphere and/or environment external to the coating and a second surface that is in contact with the coating, as shown in FIG. 6C. In some cases, the one or more conductive particles 610 may be encapsulated within and/or surrounded by the coating 609, as shown in FIG. 6E. In some cases, the conductive particles may increase an electric field emitted by the at least one electrode of the devices, described elsewhere herein, by at least about 5%, at least about 10%, at least about 15%, at least about 20%, or at least about 25%. In some cases, the conductive particles may comprise a material of liquid metals, charged polymer R groups, graphene, gold, silver, copper, aluminum, platinum, metallic nanoparticles, polyacrylic acid, silicone hydrogels, conjugated polyelectrolytes, PEDOT-S, PTHS, p(g2T-TT), p(gNDI-g2T), NIPAM, PEDOT:PSS/guar slime (PPGS), ethylene glycol, polyethylene glycol (PEG), any derivative thereof, or any combination thereof. In some cases, liquid metals may comprise gallium, rubidium, or a combination thereof.

In some cases, the dielectric particles may comprise a material of poly 2-hydroxyethylmeth acrylate, (pHEMA), Polystyrene, polypropylene, conjugated polymer PVDF, polymers/copolymers—P(VDF-CTFE), P(VDF-TrFE), P(VDF-TrFE-CTFE), P(TFE-HFP), (PVDF-g-HEMA)], PARQ copolymers, cuPc, FePc, PTTEMA/PS, Polythiourea blends, PNIPam, polymer and ceramic particle blends, polymer and metal particle blends, ceramics, metal oxide, graphene oxide, silica beads, silicon dioxide, borosilicate, natural rubber beads, silicone rubber beads, 4-acryloylmorpholine (ACMO), 2-ethylhexyl acrylate (2-EHA), any derivates thereof, or any combination thereof. In some instances, the dielectric particles may increase a surface area where the one or more particles of a fluid sample are isolate, concentrated, and/or captured by at least about 5%, at least about 10%, at least about 15%, at least about 20%, or at least about 25% compared to a device without the coating with the dielectric particles.

In some cases, the one or more particles may comprise a diameter of about 1 nanometer (nm) to about 5,000,000 nm. In some cases, the one or more particles may comprise a diameter of about 1 nm to about 100 nm, about 1 nm to about 500 nm, about 1 nm to about 1,000 nm, about 1 nm to about 10,000 nm, about 1 nm to about 100,000 nm, about 1 nm to about 1,000,000 nm, about 1 nm to about 2,000,000 nm, about 1 nm to about 3,000,000 nm, about 1 nm to about 4,000,000 nm, about 1 nm to about 5,000,000 nm, about 100 nm to about 500 nm, about 100 nm to about 1,000 nm, about 100 nm to about 10,000 nm, about 100 nm to about 100,000 nm, about 100 nm to about 1,000,000 nm, about 100 nm to about 2,000,000 nm, about 100 nm to about 3,000,000 nm, about 100 nm to about 4,000,000 nm, about 100 nm to about 5,000,000 nm, about 500 nm to about 1,000 nm, about 500 nm to about 10,000 nm, about 500 nm to about 100,000 nm, about 500 nm to about 1,000,000 nm, about 500 nm to about 2,000,000 nm, about 500 nm to about 3,000,000 nm, about 500 nm to about 4,000,000 nm, about 500 nm to about 5,000,000 nm, about 1,000 nm to about 10,000 nm, about 1,000 nm to about 100,000 nm, about 1,000 nm to about 1,000,000 nm, about 1,000 nm to about 2,000,000 nm, about 1,000 nm to about 3,000,000 nm, about 1,000 nm to about 4,000,000 nm, about 1,000 nm to about 5,000,000 nm, about 10,000 nm to about 100,000 nm, about 10,000 nm to about 1,000,000 nm, about 10,000 nm to about 2,000,000 nm, about 10,000 nm to about 3,000,000 nm, about 10,000 nm to about 4,000,000 nm, about 10,000 nm to about 5,000,000 nm, about 100,000 nm to about 1,000,000 nm, about 100,000 nm to about 2,000,000 nm, about 100,000 nm to about 3,000,000 nm, about 100,000 nm to about 4,000,000 nm, about 100,000 nm to about 5,000,000 nm, about 1,000,000 nm to about 2,000,000 nm, about 1,000,000 nm to about 3,000,000 nm, about 1,000,000 nm to about 4,000,000 nm, about 1,000,000 nm to about 5,000,000 nm, about 2,000,000 nm to about 3,000,000 nm, about 2,000,000 nm to about 4,000,000 nm, about 2,000,000 nm to about 5,000,000 nm, about 3,000,000 nm to about 4,000,000 nm, about 3,000,000 nm to about 5,000,000 nm, or about 4,000,000 nm to about 5,000,000 nm. In some cases, the one or more particles may comprise a diameter of about 1 nm, about 100 nm, about 500 nm, about 1,000 nm, about 10,000 nm, about 100,000 nm, about 1,000,000 nm, about 2,000,000 nm, about 3,000,000 nm, about 4,000,000 nm, or about 5,000,000 nm. In some cases, the one or more particles may comprise a diameter of at least about 1 nm, about 100 nm, about 500 nm, about 1,000 nm, about 10,000 nm, about 100,000 nm, about 1,000,000 nm, about 2,000,000 nm, about 3,000,000 nm, or about 4,000,000 nm. In some cases, the one or more particles may comprise a diameter of at most about 100 nm, about 500 nm, about 1,000 nm, about 10,000 nm, about 100,000 nm, about 1,000,000 nm, about 2,000,000 nm, about 3,000,000 nm, about 4,000,000 nm, or about 5,000,000 nm.

In some cases, the one or more particles may comprise a diameter of about 0.5 mm to about 5 mm. In some cases, the one or more particles may comprise a diameter of about 0.5 mm to about 0.6 mm, about 0.5 mm to about 0.7 mm, about 0.5 mm to about 0.8 mm, about 0.5 mm to about 1 mm, about 0.5 mm to about 1.5 mm, about 0.5 mm to about 2 mm, about 0.5 mm to about 2.5 mm, about 0.5 mm to about 3 mm, about 0.5 mm to about 3.5 mm, about 0.5 mm to about 4 mm, about 0.5 mm to about 5 mm, about 0.6 mm to about 0.7 mm, about 0.6 mm to about 0.8 mm, about 0.6 mm to about 1 mm, about 0.6 mm to about 1.5 mm, about 0.6 mm to about 2 mm, about 0.6 mm to about 2.5 mm, about 0.6 mm to about 3 mm, about 0.6 mm to about 3.5 mm, about 0.6 mm to about 4 mm, about 0.6 mm to about 5 mm, about 0.7 mm to about 0.8 mm, about 0.7 mm to about 1 mm, about 0.7 mm to about 1.5 mm, about 0.7 mm to about 2 mm, about 0.7 mm to about 2.5 mm, about 0.7 mm to about 3 mm, about 0.7 mm to about 3.5 mm, about 0.7 mm to about 4 mm, about 0.7 mm to about 5 mm, about 0.8 mm to about 1 mm, about 0.8 mm to about 1.5 mm, about 0.8 mm to about 2 mm, about 0.8 mm to about 2.5 mm, about 0.8 mm to about 3 mm, about 0.8 mm to about 3.5 mm, about 0.8 mm to about 4 mm, about 0.8 mm to about 5 mm, about 1 mm to about 1.5 mm, about 1 mm to about 2 mm, about 1 mm to about 2.5 mm, about 1 mm to about 3 mm, about 1 mm to about 3.5 mm, about 1 mm to about 4 mm, about 1 mm to about 5 mm, about 1.5 mm to about 2 mm, about 1.5 mm to about 2.5 mm, about 1.5 mm to about 3 mm, about 1.5 mm to about 3.5 mm, about 1.5 mm to about 4 mm, about 1.5 mm to about 5 mm, about 2 mm to about 2.5 mm, about 2 mm to about 3 mm, about 2 mm to about 3.5 mm, about 2 mm to about 4 mm, about 2 mm to about 5 mm, about 2.5 mm to about 3 mm, about 2.5 mm to about 3.5 mm, about 2.5 mm to about 4 mm, about 2.5 mm to about 5 mm, about 3 mm to about 3.5 mm, about 3 mm to about 4 mm, about 3 mm to about 5 mm, about 3.5 mm to about 4 mm, about 3.5 mm to about 5 mm, or about 4 mm to about 5 mm. In some cases, the one or more particles may comprise a diameter of about 0.5 mm, about 0.6 mm, about 0.7 mm, about 0.8 mm, about 1 mm, about 1.5 mm, about 2 mm, about 2.5 mm, about 3 mm, about 3.5 mm, about 4 mm, or about 5 mm. In some cases, the one or more particles may comprise a diameter of at least about 0.5 mm, about 0.6 mm, about 0.7 mm, about 0.8 mm, about 1 mm, about 1.5 mm, about 2 mm, about 2.5 mm, about 3 mm, about 3.5 mm, or about 4 mm. In some cases, the one or more particles may comprise a diameter of at most about 0.6 mm, about 0.7 mm, about 0.8 mm, about 1 mm, about 1.5 mm, about 2 mm, about 2.5 mm, about 3 mm, about 3.5 mm, about 4 mm, or about 5 mm.

In some cases, the one or more particles may comprise a relative permittivity of about 100 to about 500,000,000 when measured at 1 kHz using conventional measuring methods. In some cases, the one or more particles may comprise a relative permittivity of about 100 to about 10,000, about 100 to about 50,000, about 100 to about 100,000, about 100 to about 250,000, about 100 to about 500,000, about 100 to about 1,000,000, about 100 to about 10,000,000, about 100 to about 50,000,000, about 100 to about 100,000,000, about 100 to about 250,000,000, about 100 to about 500,000,000, about 1000 to about 10,000, about 1000 to about 50,000, about 1,000 to about 100,000, about 1,000 to about 250,000, about 1,000 to about 500,000, about 1,000 to about 1,000,000, about 1,000 to about 10,000,000, about 1,000 to about 50,000,000, about 1,000 to about 100,000,000, about 1,000 to about 250,000,000, about 1,000 to about 500,000,000, about 10,000 to about 50,000, about 10,000 to about 100,000, about 10,000 to about 250,000, about 10,000 to about 500,000, about 10,000 to about 1,000,000, about 10,000 to about 10,000,000, about 10,000 to about 50,000,000, about 10,000 to about 100,000,000, about 10,000 to about 250,000,000, about 10,000 to about 500,000,000, about 50,000 to about 100,000, about 50,000 to about 250,000, about 50,000 to about 500,000, about 50,000 to about 1,000,000, about 50,000 to about 10,000,000, about 50,000 to about 50,000,000, about 50,000 to about 100,000,000, about 50,000 to about 250,000,000, about 50,000 to about 500,000,000, about 100,000 to about 250,000, about 100,000 to about 500,000, about 100,000 to about 1,000,000, about 100,000 to about 10,000,000, about 100,000 to about 50,000,000, about 100,000 to about 100,000,000, about 100,000 to about 250,000,000, about 100,000 to about 500,000,000, about 250,000 to about 500,000, about 250,000 to about 1,000,000, about 250,000 to about 10,000,000, about 250,000 to about 50,000,000, about 250,000 to about 100,000,000, about 250,000 to about 250,000,000, about 250,000 to about 500,000,000, about 500,000 to about 1,000,000, about 500,000 to about 10,000,000, about 500,000 to about 50,000,000, about 500,000 to about 100,000,000, about 500,000 to about 250,000,000, about 500,000 to about 500,000,000, about 1,000,000 to about 10,000,000, about 1,000,000 to about 50,000,000, about 1,000,000 to about 100,000,000, about 1,000,000 to about 250,000,000, about 1,000,000 to about 500,000,000, about 10,000,000 to about 50,000,000, about 10,000,000 to about 100,000,000, about 10,000,000 to about 250,000,000, about 10,000,000 to about 500,000,000, about 50,000,000 to about 100,000,000, about 50,000,000 to about 250,000,000, about 50,000,000 to about 500,000,000, about 100,000,000 to about 250,000,000, about 100,000,000 to about 500,000,000, or about 250,000,000 to about 500,000,000 when measured at 1 kHz using conventional measuring methods. In some cases, the one or more particles may comprise a relative permittivity of about 100, about 1,000, about 10,000, about 50,000, about 100,000, about 250,000, about 500,000, about 1,000,000, about 10,000,000, about 50,000,000, about 100,000,000, about 250,000,000, or about 500, 000,000 when measured at 1 kHz using conventional measuring methods. In some cases, the one or more particles may comprise a relative permittivity of at least about 100, about 1,000, about 10,000, about 50,000, about 100,000, about 250,000, about 500,000, about 1,000,000, about 10,000,000, about 50,000,000, about 100,000,000, or about 250,000,000 when measured at 1 kHz using conventional measuring methods. In some cases, the one or more particles may comprise a relative permittivity of at most about 100, about 1,000, about 10,000, about 50,000, about 100,000, about 250,000, about 500,000, about 1,000,000, about 10,000,000, about 50,000,000, about 100,000,000, about 250,000,000, or about 500,000,000 when measured at 1 kHz using conventional measuring methods. In some cases, a surface, an interior, or a combination thereof region of the coating may comprise one or more moieties configured to bind to nucleic acid molecules associated with membrane bound particles. In some cases, the one or more moieties may comprise antibodies, proteins, aptamers, DNA, RNA, or any combination thereof. In some instances, the one or more moieties may be configured to couple to one or more extracellular vesicles with attached or surface-level proteins, free-floating proteins, aptamers, DNA, RNA, enzymes, phospholipids, any naturally occurring (e.g., biological) or biosynthetic polymers and/or particles, synthetic polymers and/or particles, or any combination thereof.

Electrode Geometry

In some embodiments, the devices and system described elsewhere herein may comprise a chip electrically coupled with at least one electrode (302, 304, 306, 308, 310, 316, 318, 322, 326, 328, 334, 336, 338, 340, 344, 350, 352, 354, 356) to a surface 300 of the chip, as described elsewhere herein, where the at least one electrode comprising a curved edge portion, as seen in FIGS. 3A-3H. In some cases, the at least one electrode curved edge portion may be coated, as described elsewhere herein. In some cases, the curved edge portion may comprise a tangential angle greater than 45 degrees for at least 25% of the curved edge portion. In some instances, the curved edge portion may comprise an average tangential angle greater than 45 degrees along the curved edge portion. In some cases, the curved edge portion of the electrode may provide an increase of at least about 5%, at least about 10%, at least about 15%, at least about 20%, or at least about 25% of a capture area of a surface of a device where one or more particles of a fluid sample are isolated relative to a similar electrode under similar conditions without the curved edge portion when the fluid sample is transported across the surface. In some cases, the at least one electrode (302, 304, 306, 308, 310, 316, 318, 322, 326, 328, 334, 336, 338, 340, 344, 350, 352, 354, 356) may comprise a first electrode (302, 306, 310, 318, 326, 334, 338, 344, 352, 356) (e.g., a cathode) and a second electrode (304, 308, 314, 322, 336, 340, 350, 354) (e.g., an anode). In some cases, the first electrode may be centered a distance from the nadir of a curved edge portion of the second electrode, as seen in FIGS. 3A-3D, and 3F. In some cases, the curved edge portion of the at least one electrode (302, 304, 306, 308, 310, 316, 318, 322, 326, 328, 334, 336) may comprise a varying frequency and amplitude as a function of a long axis and/or length 303 of the device as seen between FIGS. 3A-3B, and 3F. In some cases, the frequency and/or amplitude of the at least one electrode (334, 336, 334) may vary based on the location and/or region (e.g., a first location and/or region 332 and/or a second location and/or region 330) of the at least one electrode on the device surface 300.

In some cases, the first electrode (302, 306, 310, 318, 326, 334, 338, 344, 352, 356) may comprise a curved edge portion, and a second electrode (304, 308, 314, 322, 336, 340, 350, 354) may comprise a curved edge portion. In some cases, the first curved edge portion (352, 356) may be shifted or moved (360, 358, 356) a distance with respect to a position of a second curved edge portion (350,354), where the distance is along the short axis and/or length of the device 362, as seen in FIG. 3H. In some cases, the first electrode curved edge portion may be at least about 5 micrometers (μm) distance from the second electrode curved edge portion, where the distance is along the short axis and/or length of the device 362. In some instances, the first electrode curved edge portion (338, 344) and/or a second curved edge portion 340 may be shifted (342, 346) along the long axis and/or the length of the device 303, as shown in FIG. 3G. In some cases, the short axis and/or length of the device 362 and the long axis and/or the length of the device 303 may comprise the same length (i.e., a square geometry). In some cases, the device may comprise a circular geometry. In some cases, the first electrode curved edge portion (338, 344) may comprise up to about 20 degrees phase shift from the second electrode curved edge portion 340, where the phase shift is along a long axis and/or the length of the device 303. In some cases, the first electrode (302, 306, 310, 318, 326, 334, 338, 344, 352, 356) may comprise an angle of orientation of up to about 20 degrees from the second electrode (304, 308, 314, 322, 336, 340, 350, 354).

In some cases, the at least one electrode may comprise a non-curved edge portion, where the non-curved edge portion may comprise a tangential angle of less than 5 degrees along the non-curved edge portion. In some cases, the at least one electrode may comprise a ratio of 1 to 10 or 10 to 1 of curved edge portion to non-curved edge portion. In some cases, the curved edge portion may comprise a non-zero derivative along a length of the curved edge portion.

Figure 3A:
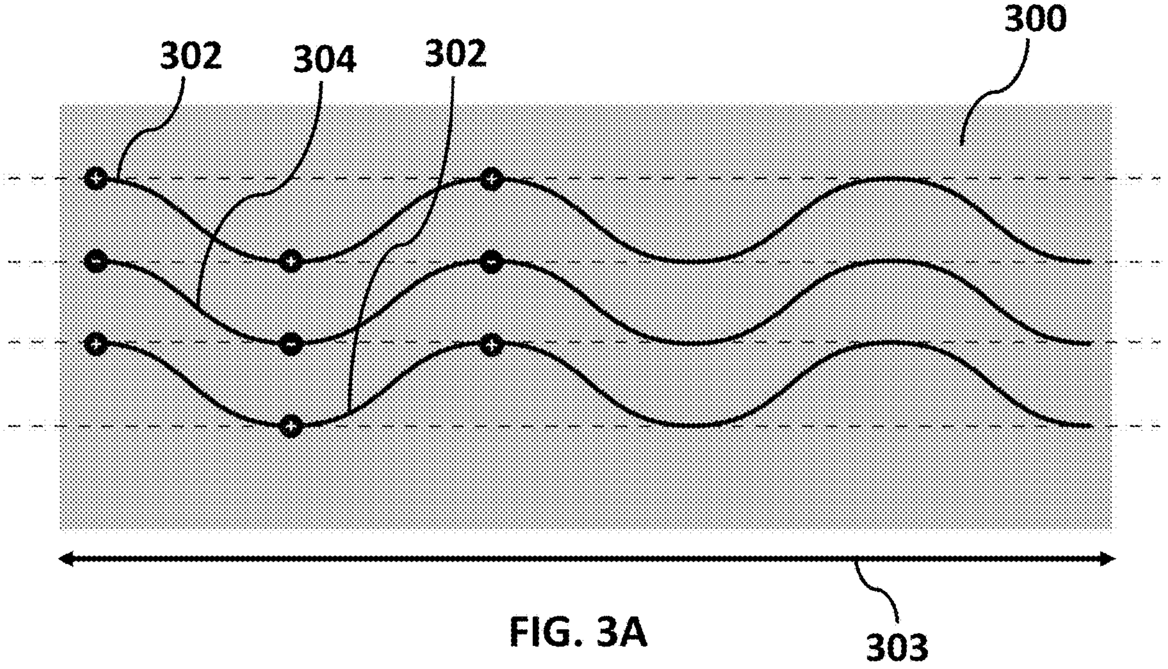
FIGS. 3A-3H show example device electrode configurations, as described in some embodiments herein.
Figure 3B:
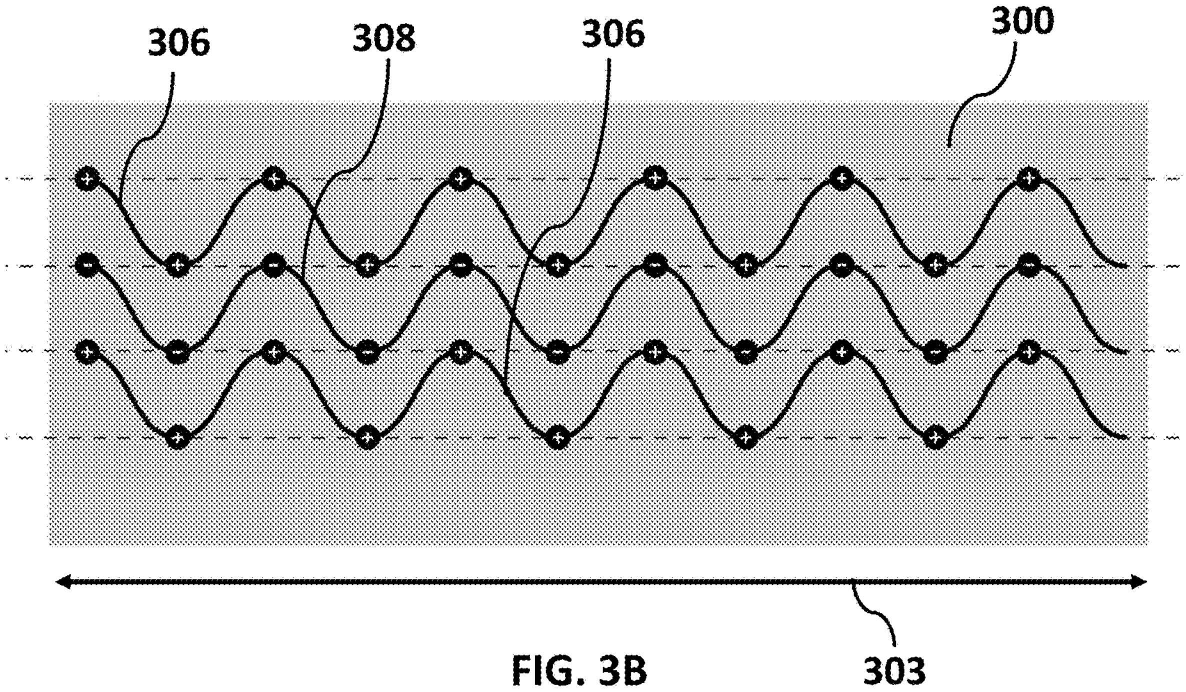
Figure 3C:
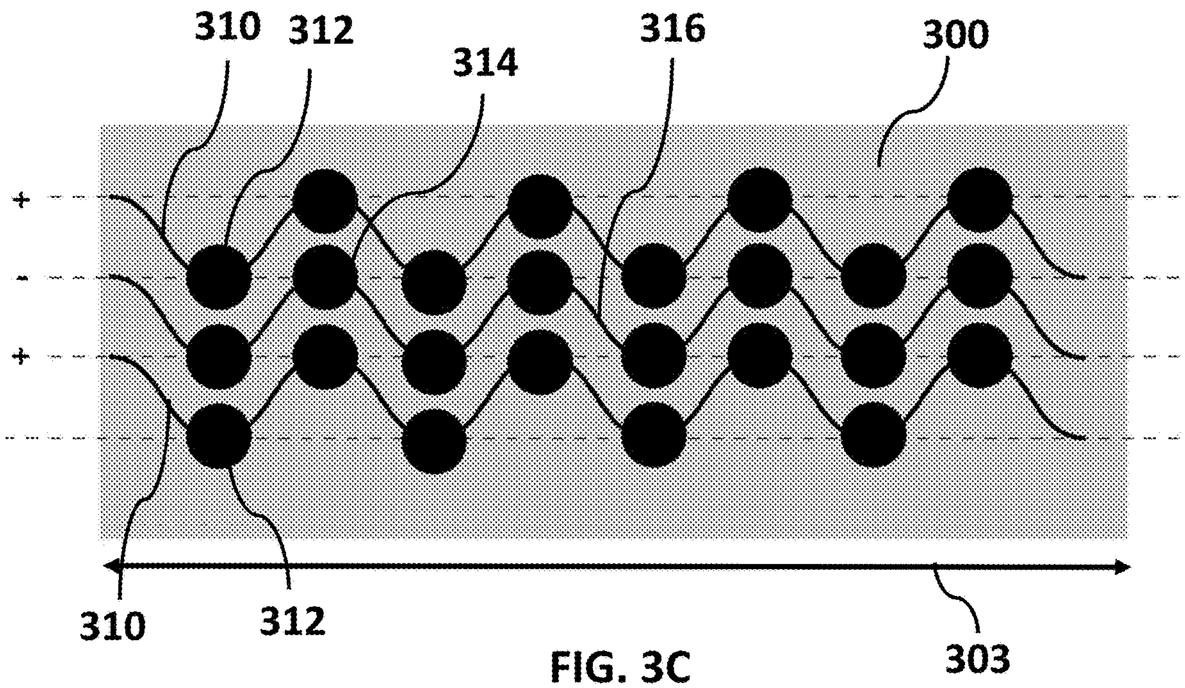
Figure 3D:
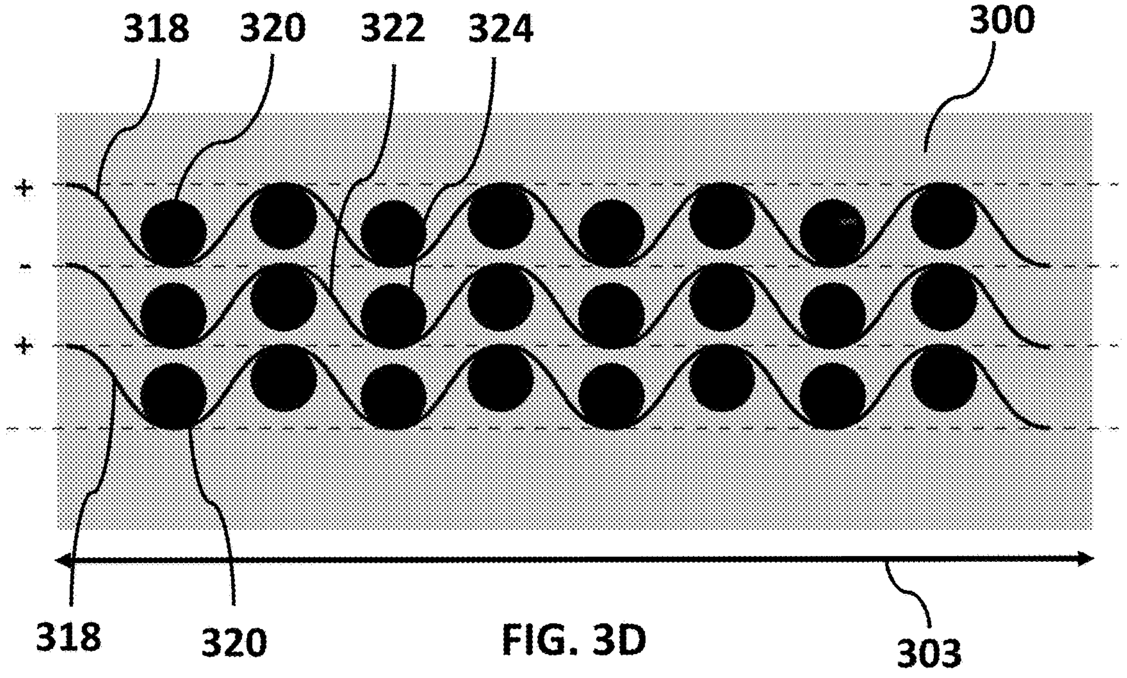

In some instances, the at least one electrode may comprise one or more circular features (312, 314, 320, 324) disposed along a length of the curved edge portion of the at least one electrode, as seen in FIGS. 3C and 3D. In some instances, the one or more circular features (312, 314) may be disposed centered at a peak and/or a trough of a curve edge portion of the at least one electrode, as seen in FIG. 3C. In some cases, the one or more circular features (320, 324) may comprise a curved edged coaxial with the curved edge portion of the at least one electrode (318, 322), as seen in FIG. 3D.

Figure 3E:
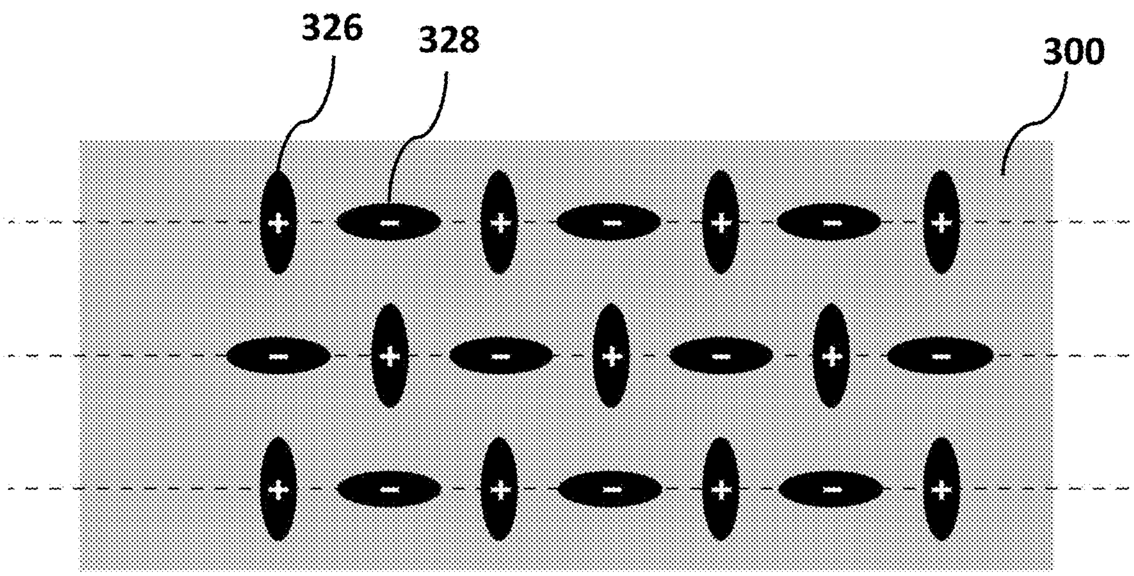
Figure 3F:
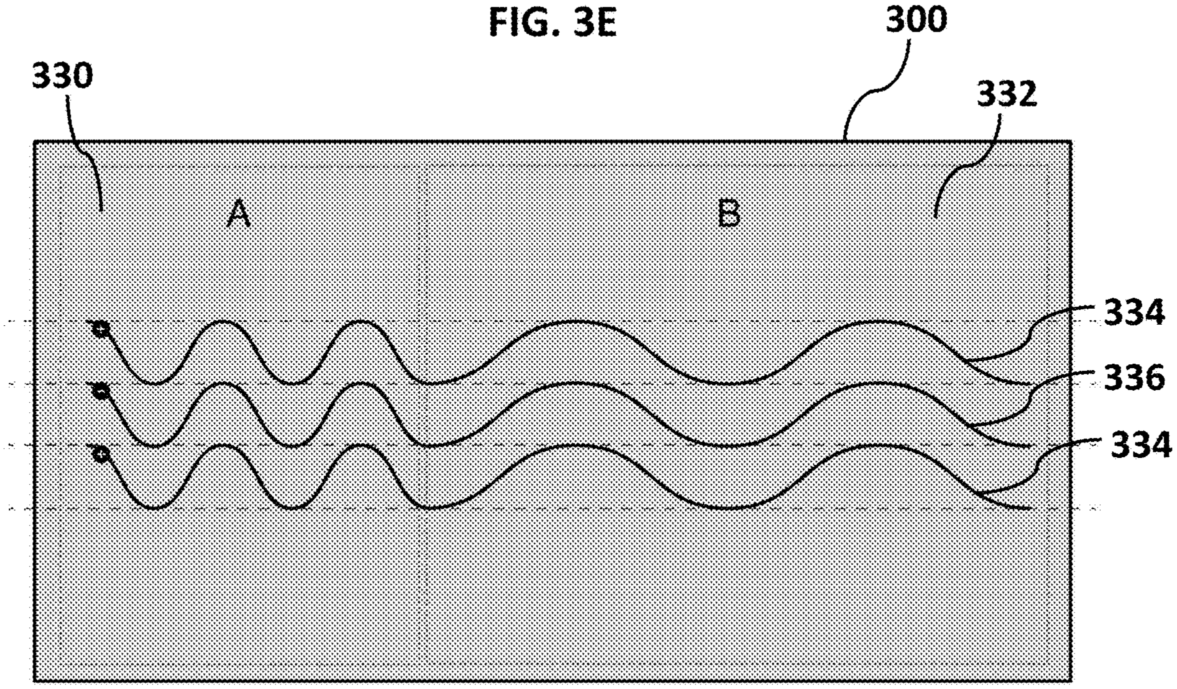
Figure 3G:
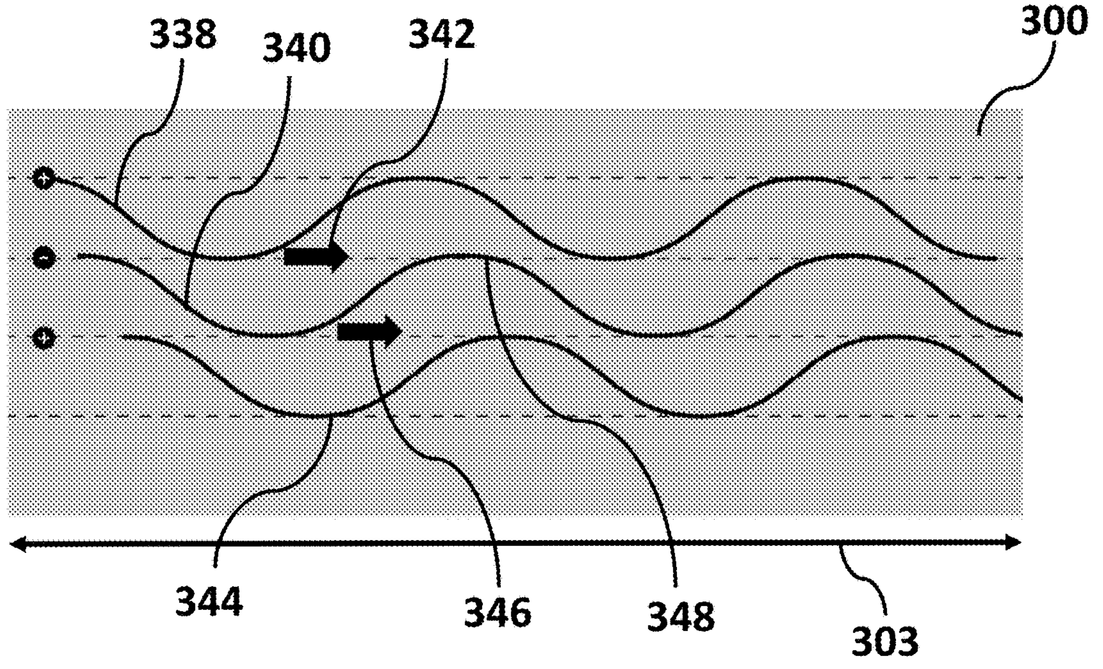
Figure 3H:
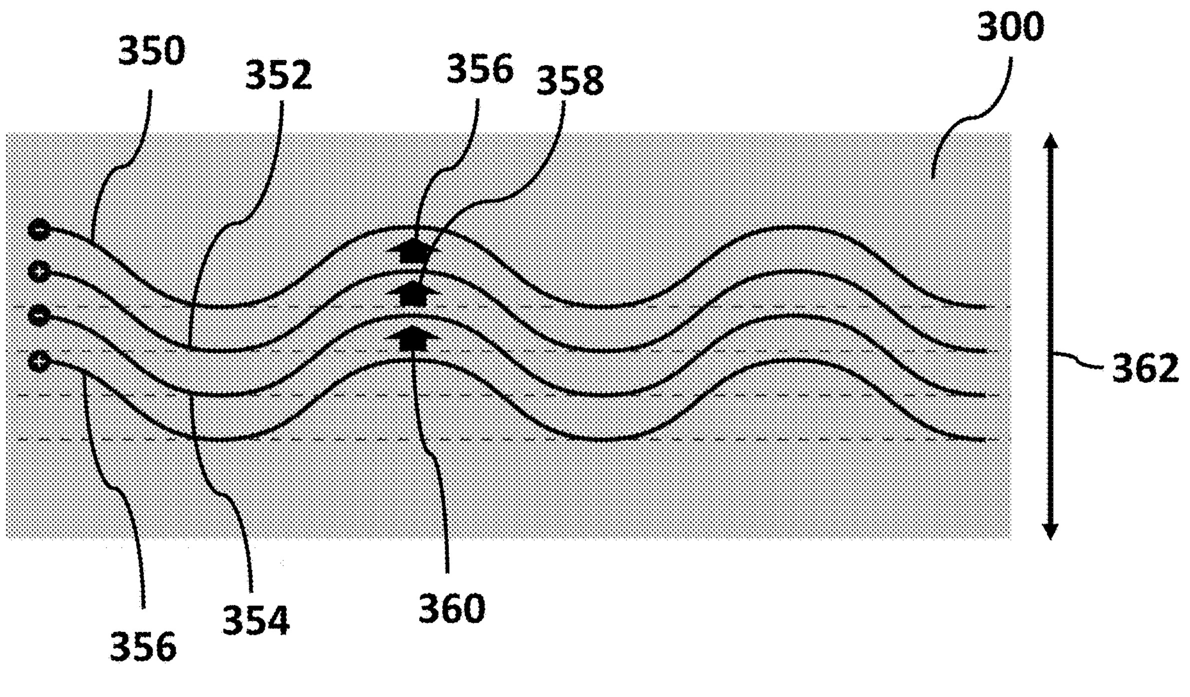

In some instances, the at least one electrode may comprise one or more ellipsoid shaped electrodes (326, 328), as shown in FIG. 3E. In some cases, the ellipsoid shaped electrodes may comprise a minor axis of about 5 μm to about 1 millimeter (mm) and a major axis of about 10 μm to about 2 mm.

Methods

Figure 4A:
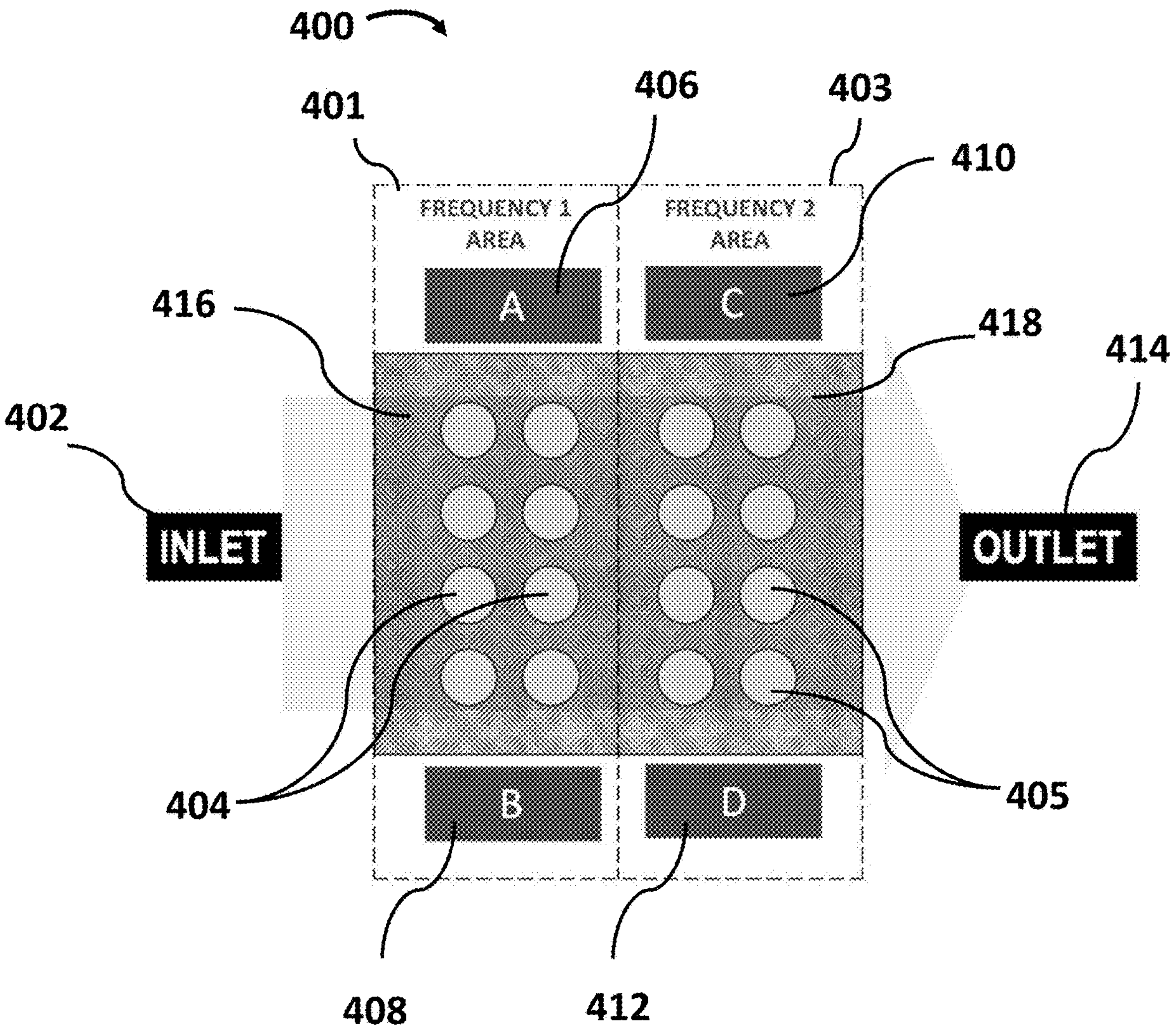
FIGS. 4A-4B show an example diagram configuration with and without connected isolating regions of a device or system for isolating at least two types of particles from a liquid sample, as described in some embodiments herein.
Figure 4B:
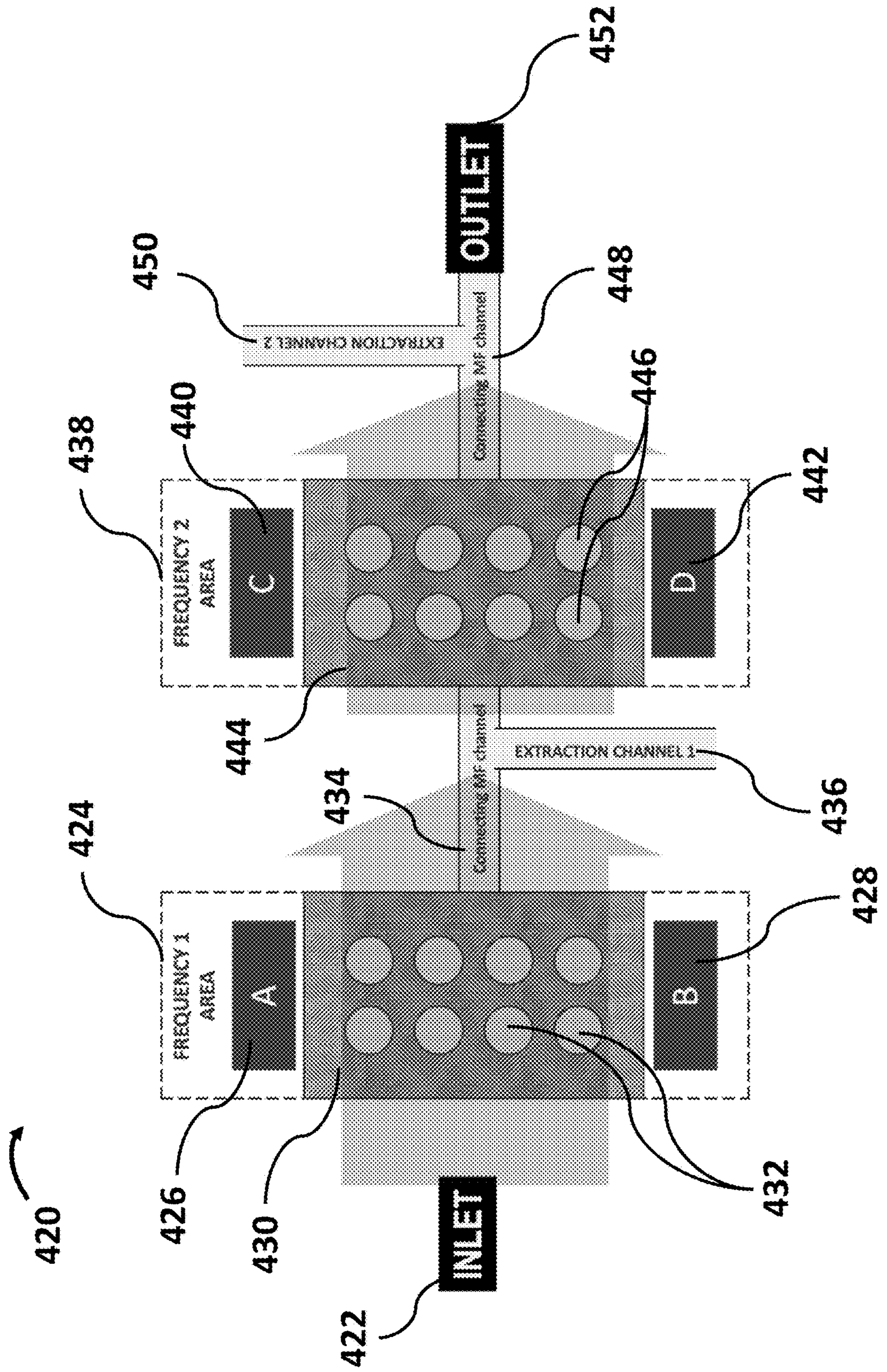

In some embodiments, the device and/or systems (400, 420) described herein may implement methods to isolate particles across one or more spatially non-overlapping regions and/or temporally, as shown in FIG. 4A and FIG. 4B. Turning, to device and/or system (400 and 420) as shown in FIG. 4A and FIG. 4B, in some cases, a first particle or a first plurality of particles (404, 432) may be isolated at a first spatial position (416, 430), and a second particle or a second plurality of particles (405, 446) may be isolated at a second spatial position (418, 444), where the first spatial position and the second spatial position do not spatially overlap with one another. In some cases, the first spatial position may be within a first isolation area (401, 424) and the second spatial position may be within a second isolation area (438, 403). In some cases, the first spatial position (416, 430) may comprise a first spatial area and the second spatial position (418, 444) may comprise a second spatial area where the first and second particle or first and second plurality of particles are isolated. In some cases, a first spatial position (416, 430) and second spatial position (418, 444) may be generated between at least two electrodes of the first spatial position (406 and 408; 426 and 428) and of the second position (410 and 412; 440 and 442). In some cases, the at least two electrodes may comprise a signal electrode i.e., cathode (406, 410, 426, 440) and a sink electrode i.e., anode (408, 412, 428, 442), described elsewhere herein. In some instances, the signal electrode (406, 410, 426, 440) may be configured to emit one or more alternating current (AC) electrical signals with one or more frequencies, frequency ranges or any combination thereof signals. The emitted AC signal from the signal electrode (406, 410, 426, 440) may travel in the direction of the sink electrodes (408, 412) 428, 442) thereby establishing an AC electric field in the first spatial position (416, 430) and second spatial position (418, 444) configured to attract and/or isolate the first particle or first plurality of particles (404, 432) and/or the second particle or second plurality of particles (405, 446). One or more particles may be isolated in regions of electrodes providing a corresponding one or more frequencies or frequency ranges configured to attract the size of the particles.

The signal and sink electrodes may be adjacent to a surface and/or embedded into a chip. The chip may comprise a substrate, where the substrate may comprise one or more electrical paths electrically coupled to the sink and/or signal electrodes and other computer systems, described elsewhere herein. The chip may comprise one or more electrical paths that are not electrically coupled to sink and/or signal electrodes, as described elsewhere herein, and other computer systems (i.e., floating electrodes). When located in close proximity to the electrical path of AC signal delivered to the one or more electrodes that are coupled to the source, sink, and/or signal electrodes, floating electrodes may become electrically active and may capture particles. The coupled electrical paths may transmit one or more frequencies and/or one or more frequency ranges to the signal and sink electrodes to isolate one or more particles and/or one or more plurality of particles. In some cases, the chip may be configured to conducted on-chip analysis of the isolated one or more particles and/or one or more plurality of particles once isolated.

In some embodiments, the device and/or systems (400, 420) described herein may comprise one or more sensors configured to measure a parameter of a particle and/or a plurality of particles of a fluid sample. In some cases, the one or more sensors may comprise a sensor configured to measure capacitance or a size (e.g., diameter) of a particle or a plurality of particles. In some instances, the one or more sensors my comprise light-based sensors and/or a camera configured to collect one or more images and/or video of the particles to determine a particle size (e.g., diameter). The measured size may be used by algorithms and/or predictive models, described elsewhere herein, to determine a frequency or a range of frequencies to apply to one or more electrodes to isolate the particle or plurality of particles.

In some embodiments, a first particle or first plurality of particles and a second particle or second plurality of particles may both be isolated in a first spatial position or a second spatial position but at varying times (i.e., temporally). For example, the first particle or first plurality of particles may be isolated at the first spatial position (416, 430) at a first time, and the second particle or second plurality of particles may be isolated at the first spatial position (416, 430) at a second time, where the second time follows the first time. In some cases, the temporal isolation method may comprise: (a) providing a fluid composition comprising a first particle or first plurality of particles and a second particle or second plurality of particles to a system and/or device (400, 420); (b) applying a first frequency at a first region (416, 430) to isolate the first particle (404, 432); (c) and applying a second frequency at the first region (416, 430) to isolate a second particle. In some cases, the device and/or systems (400, 420) may comprise an inlet (402, 422) configured to receive the fluid composition and direct the fluid composition to the first region (416, 430). In some cases, the method may comprise providing a first eluting or washing solution step between step (b) and (c) to elute or extract the non-isolated and/or free floating second particle or second plurality of particles and/or contaminates prior to eluting and/or extracting the isolated first particle or first plurality of particles. In some instances, the method may further comprise removing the first frequency and/or frequency range and providing a second eluting or washing solution after step (b) to elute or extract the first particle or first plurality of particles. In some cases, the method may further comprise removing the second frequency and/or frequency range and providing a third eluting or washing solution after step (c) to elute and/or extract the second particle or second plurality of particles. In some cases, the first frequency may comprise a first frequency range and the second frequency may comprise a second frequency range, described elsewhere herein.

In some cases, both spatial and temporal isolation may be combined. In some instances, the device and/or systems (400, 420), described elsewhere herein, may temporally isolate particles at spatially non-overlapping regions. For example, the devices and/or systems described herein may temporally isolate a first set of particles with a first range of frequencies at a first region and temporally isolate a second set of particles with a second range of frequencies at a second region, where the first region and the second region do not overlap, and where the first range of frequencies and the second range of frequencies differ.

In some instances, the one or more frequencies and/or frequency ranges may comprise a frequency of about 1 kHz to about 100 kHz. In some instances, the one or more frequencies and/or frequency ranges may comprise a frequency of about 1 kHz to about 10 kHz, about 1 kHz to about 15 kHz, about 1 kHz to about 20 kHz, about 1 kHz to about 30 kHz, about 1 kHz to about 40 kHz, about 1 kHz to about 50 kHz, about 1 kHz to about 60 kHz, about 1 kHz to about 70 kHz, about 1 kHz to about 80 kHz, about 1 kHz to about 90 kHz, about 1 kHz to about 100 kHz, about 10 kHz to about 15 kHz, about 10 kHz to about 20 kHz, about 10 kHz to about 30 kHz, about 10 kHz to about 40 kHz, about 10 kHz to about 50 kHz, about 10 kHz to about 60 kHz, about 10 kHz to about 70 kHz, about 10 kHz to about 80 kHz, about 10 kHz to about 90 kHz, about 10 kHz to about 100 kHz, about 15 kHz to about 20 kHz, about 15 kHz to about 30 kHz, about 15 kHz to about 40 kHz, about 15 kHz to about 50 kHz, about 15 kHz to about 60 kHz, about 15 kHz to about 70 kHz, about 15 kHz to about 80 kHz, about 15 kHz to about 90 kHz, about 15 kHz to about 100 kHz, about 20 kHz to about 30 kHz, about 20 kHz to about 40 kHz, about 20 kHz to about 50 kHz, about 20 kHz to about 60 kHz, about 20 kHz to about 70 kHz, about 20 kHz to about 80 kHz, about 20 kHz to about 90 kHz, about 20 kHz to about 100 kHz, about 30 kHz to about 40 kHz, about 30 kHz to about 50 kHz, about 30 kHz to about 60 kHz, about 30 kHz to about 70 kHz, about 30 kHz to about 80 kHz, about 30 kHz to about 90 kHz, about 30 kHz to about 100 kHz, about 40 kHz to about 50 kHz, about 40 kHz to about 60 kHz, about 40 kHz to about 70 kHz, about 40 kHz to about 80 kHz, about 40 kHz to about 90 kHz, about 40 kHz to about 100 kHz, about 50 kHz to about 60 kHz, about 50 kHz to about 70 kHz, about 50 kHz to about 80 kHz, about 50 kHz to about 90 kHz, about 50 kHz to about 100 kHz, about 60 kHz to about 70 kHz, about 60 kHz to about 80 kHz, about 60 kHz to about 90 kHz, about 60 kHz to about 100 kHz, about 70 kHz to about 80 kHz, about 70 kHz to about 90 kHz, about 70 kHz to about 100 kHz, about 80 kHz to about 90 kHz, about 80 kHz to about 100 kHz, or about 90 kHz to about 100 kHz. In some instances, the one or more frequencies and/or frequency ranges may comprise a frequency of about 1 kHz, about 10 kHz, about 15 kHz, about 20 kHz, about 30 kHz, about 40 kHz, about 50 kHz, about 60 kHz, about 70 kHz, about 80 kHz, about 90 kHz, or about 100 kHz. In some instances, the one or more frequencies and/or frequency ranges may comprise a frequency of at least about 1 kHz, about 10 kHz, about 15 kHz, about 20 kHz, about 30 kHz, about 40 kHz, about 50 kHz, about 60 kHz, about 70 kHz, about 80 kHz, or about 90 kHz. In some instances, the one or more frequencies and/or frequency ranges may comprise a frequency of at most about 10 kHz, about 15 kHz, about 20 kHz, about 30 kHz, about 40 kHz, about 50 kHz, about 60 kHz, about 70 kHz, about 80 kHz, about 90 kHz, or about 100 kHz.

In some embodiments, the first isolation area (401, 424) and the second isolation area (403, 438) may be in fluid communication, as shown in FIG. 4A and FIG. 4B. In some instances, the first isolation area 401 and the second isolation area 403 may be adjacent as shown in FIG. 4A. In some cases, the first isolation area 424 and the second isolation area 438 may be separated by a distance and connected in fluid communication with one or more channels (434, 436, 448, 450). In some instances, the one or more channels may comprise a fluid channel, configured to be in fluid communication with one or more of the first isolation area and/or the second isolation area. In some cases, the one or more channels (434, 448) may comprise a channel in fluid communication with one or more extraction and/or elution channel (436, 450), inlet (422), and/or outlet (452) of the device and/or system. In some cases, the extraction and/or elution channels may be configured to collect or obtain isolated particles and/or waste solution containing contaminate particles that are not isolated.

In some embodiments, the device and/or system (400, 420) as described in FIG. 4A and/or FIG. 4B may implement a method of isolating a first and second particle in spatially non-overlapping regions. In some instances, the method may comprise: (a) providing a fluid composition to a system and/or device (400, 420) where the fluid composition comprises a first particle and a second particle; and (b) applying a first frequency at a first region (416, 430) to isolate the first particle (404, 432); (c) and applying a second frequency at a second region (418, 444) to isolate a second particle (405, 446). In some cases, the device and/or systems (400, 420) may comprise an inlet (402, 422) configured to receive the fluid composition and direct the fluid composition to the first region (416, 430), and the second region (418, 444). In some instances, the first particle may comprise a first plurality of particles, and the second particle may comprise a second plurality of particles, described elsewhere herein. In some cases, steps (b) and (c) may be completed in any order. In some instances, the method may further comprise providing a washing buffer and/or washing solution to the system and/or device after step (c) to wash away a remaining fraction of the fluid composition not isolated in the first region and the second region. In some cases, the device and/or system (400, 420), may comprise an outlet (414, 452), configured to elute and/or output the isolated first particle and/or second particle. In some instances, the method may further comprise removing the first frequency at the first region (416, 430) to elute and/or output the first particle. The method may further comprise removing a second frequency at the second region (418, 444) to elute and/or output the second particle. In some cases, removing the first frequency and removing the second frequency may occur in any order. The method may further comprise providing an eluant, buffer, and/or solution to elute the first particle and/or second particle after removing the first and/or second frequency. In some instances, the eluant, buffer and/or solution to elute the first particle and/or the second particle may be collected through connecting one or more fluid channels (434, 448) and/or one or more extraction and/or elution channels (436, 450).

Predictive Models & Machine Learning

The devices and/or systems of the present disclosure may utilize or access external capabilities of artificial intelligence, predictive models, and/or machine learning techniques to identify one or more frequencies and/or one or more frequency ranges to isolate one or more particles or one or more plurality of particles of a fluid sample. In some cases, the artificial intelligence and/or predictive models techniques may identify features of the one or more particles from sensor data collected by the one or more sensors, described elsewhere herein, to apply one or more frequencies and/or one or more frequency ranges to isolate or attract the one or more particles and/or one or more plurality of particles towards one or more electrodes, described elsewhere herein. In some cases, the sample media characteristics (e.g., ionic strength, type) may be used as features. In some cases, the features may be used to train one or more predictive models and/or machine learning algorithms, described elsewhere herein. In some instances, data may be used to initially train one or more predictive models and/or machine learning algorithms that may then be improved (e.g., increase in accuracy of the model) over time when new data is collected and provided for training. These features may be used to isolate one or more particles and/or one or more plurality of particles from a fluid composition with minimal to no contamination. Using such a predictive model and/or artificial intelligence, it may not be necessary to have a priori knowledge of the particle size or range of particles sizes to isolate the one or more particles and/or one or more plurality of particles of the fluid composition with minimal artifact or contamination.

The methods and systems of the present disclosure may analyze sensor data and fluid media ionic strength to determine one or more frequencies and/or one or more frequency ranges to isolate one or more particles and/or one or more plurality of particles. In some cases, the methods, and systems, described elsewhere herein, may train a predictive model with one or more particles' size, media ionic strength, with a corresponding training label of particle sizes eluted and/or extracted. In some cases, the trained predictive model may be used to generate a likelihood (e.g., a prediction) of the one or more frequencies to be applied to isolate one or more particles and/or one or more plurality of particles based on an input of the detected particle size by the one or more sensors, described elsewhere herein.

The trained predictive model may comprise an artificial intelligence-based model, such as a machine learning based classifier, configured to process the measured size of the one or more particles and/or the one or more plurality of particles (provided by the one or more sensors) to generate one or more particle isolation frequencies and/or one or more ranges of particle isolation frequencies.

The model may comprise one or more predictive models. The model may comprise one or more machine learning algorithms. Examples of machine learning algorithms may include a support vector machine (SVM), a naïve Bayes classification, a random forest, a neural network (such as a deep neural network (DNN), a recurrent neural network (RNN), a deep RNN, a long short-term memory (LSTM) recurrent neural network (RNN), a gated recurrent unit (GRU), a gradient boosting machine, a random forest, or other supervised learning algorithm or unsupervised machine learning, statistical, linear regression, k-nearest neighbors, k-means, decision tree, logistic regression, or any combination thereof. The model may be used for classification or regression. The model may likewise involve the estimation of ensemble models, comprised of multiple predictive models, and utilize techniques such as gradient boosting, for example in the construction of gradient-boosting decision trees. The model may be trained using frequency applied to isolate the one or more particles and/or plurality of particles, sensor particle size measurement, particle media ionic strength, particle sizes eluted and/or extracted after isolation, or a combination thereof.

The model may comprise one or more neural networks, such as a neural network, a convolutional neural network (CNN), a deep neural network (DNN), a recurrent neural network (RNN), or a deep RNN. The recurrent neural network may comprise units which can be long short-term memory (LSTM) units or gated recurrent units (GRU). Neural network techniques, such as dropout or regularization, may be used during training the model to prevent overfitting. The neural network may comprise a plurality of sub-networks, each of which is configured to generate a classification or prediction of a different type of output information (e.g., which may be combined to form an overall output of the neural network). The machine learning model may alternatively utilize statistical or related algorithms including random forest, classification and regression trees, support vector machines, discriminant analyses, regression techniques, as well as ensemble and gradient-boosted variations thereof.

Input training features may be structured by aggregating the data into bins or alternatively using a one-hot encoding. Inputs may also include feature values or vectors derived from the previously mentioned inputs, such as cross-correlations.

The model may process the input features to generate output values comprising the one or more frequencies and/or frequency ranges to be applied to the one or more electrodes to isolate one or more particles and/or one or more plurality of particles of a fluid composition.

Various machine learning techniques may be cascaded such that the output of a machine learning technique may also be used as input features to subsequent layers or subsections of the model.

In order to train the model (e.g., by determining weights and correlations of the model) to generate real-time classifications or predictions, the model can be trained using datasets, described elsewhere herein. Such datasets may be sufficiently large to generate statistically significant classifications or predictions.

Datasets may be split into subsets of datasets, such as a training dataset, a development dataset, and a test dataset. For example, a dataset may be split into a training dataset comprising 80% of the dataset, a development dataset comprising 10% of the dataset, and a test dataset comprising 10% of the dataset. The training dataset may comprise about 10%, about 20%, about 30%, about 40%, about 50%, about 60%, about 70%, about 80%, or about 90% of the dataset. The development dataset may comprise about 10%, about 20%, about 30%, about 40%, about 50%, about 60%, about 70%, about 80%, or about 90% of the dataset. The test dataset may comprise about 10%, about 20%, about 30%, about 40%, about 50%, about 60%, about 70%, about 80%, or about 90% of the dataset. In some embodiments, leave one out cross validation may be employed.

To improve the accuracy of model predictions and reduce overfitting of the model, the datasets may be augmented to increase the number of samples within the training set. For example, data augmentation may comprise rearranging the order of observations in a training record. To accommodate datasets having missing observations, methods to impute missing data may be used, such as forward-filling, back-filling, linear interpolation, and multi-task Gaussian processes. Datasets may be filtered or batch corrected to remove or mitigate confounding factors.

When the model generates a classification or a prediction of the one or more frequencies and/or one or more frequency ranges to isolate one or more particles and/or one or more plurality of particles, a notification (e.g., alert or alarm) may be generated and transmitted to an operator, on the device and/or system user interface, described elsewhere herein. Notifications may be transmitted via an automated phone call, a short message service (SMS) or multimedia message service (MMS) message, an e-mail, or an alert within a dashboard. The notification may comprise output information such as particle size distribution and recommended and/or predicted frequency to apply to isolate the particles.

To validate the performance of the model, different performance metrics may be generated. For example, an area under the receiver-operating characteristic curve (AUROC) may be used to determine the diagnostic capability of the model. For example, the model may use classification thresholds which are adjustable, such that specificity and sensitivity are tunable, and the receiver-operating characteristic curve (ROC) can be used to identify the different operating points corresponding to different values of specificity and sensitivity.

In some cases, such as when datasets are not sufficiently large, cross-validation may be performed to assess the robustness of a model across different training and testing datasets.

To calculate performance metrics such as sensitivity, specificity, accuracy, positive predictive value (PPV), negative predictive value (NPV), area under the precision-recall curve (AUPR), AUROC, or similar, the following definitions may be used. A “false positive” may refer to an outcome in which a positive outcome or result has been incorrectly or prematurely generated (e.g., predicting that a particle of a type and/or a size is present in a fluid sample but there is no presence of the particle in the fluid sample). A “true positive” may refer to an outcome in which positive outcome or result has been correctly generated (e.g., a particle of a type and/or size determine to be present in a fluid sample is indeed isolated and present in the fluid sample). A “false negative” may refer to an outcome in which a negative determination of the presence of a particle type and/or size is made where the one or more particle and/or plurality of particles with the type or size are present in the fluid sample. A "true negative" may refer to an outcome in which a negative outcome or result has been generated (e.g., the lack of the presence of one or more particles and/or one or more plurality of particles of a type, size and/or size range).

The model may be trained until certain pre-determined conditions for accuracy or performance are satisfied, such as having minimum desired contamination of isolated particles and/or highest isolation of one or more particles and/or one or more plurality of particles. Examples of predictive accuracy and target one or more particle and/or target one or more plurality of particle isolation may include sensitivity, specificity, positive predictive value (PPV), negative predictive value (NPV), accuracy, AUPR, and AUROC.

The sensitivity of predicting the one or more frequencies and/or one or more ranges of frequencies to isolate one or more particles and/or one or more plurality of particles may comprise a value of, for example, at least about 50%, at least about 55%, at least about 60%, at least about 65%, at least about 70%, at least about 75%, at least about 80%, at least about 85%, at least about 90%, at least about 95%, at least about 96%, at least about 97%, at least about 98%, or at least about 99%.

The specificity of predicting the one or more frequencies and/or one or more ranges of frequencies to isolate one or more particles and/or one or more plurality of particles may comprise a value of, for example, at least about 50%, at least about 55%, at least about 60%, at least about 65%, at least about 70%, at least about 75%, at least about 80%, at least about 85%, at least about 90%, at least about 95%, at least about 96%, at least about 97%, at least about 98%, or at least about 99%.

The positive predictive value (PPV) of predicting the one or more frequencies and/or one or more ranges of frequencies to isolate one or more particles and/or one or more plurality of particles may comprises a value of, for example, at least about 50%, at least about 55%, at least about 60%, at least about 65%, at least about 70%, at least about 75%, at least about 80%, at least about 85%, at least about 90%, at least about 95%, at least about 96%, at least about 97%, at least about 98%, or at least about 99%.

The negative predictive value (NPV) of predicting the one or more frequencies and/or one or more ranges of frequencies to isolate one or more particles and/or one or more plurality of particles may comprises a value of, for example, at least about 50%, at least about 55%, at least about 60%, at least about 65%, at least about 70%, at least about 75%, at least about 80%, at least about 85%, at least about 90%, at least about 95%, at least about 96%, at least about 97%, at least about 98%, or at least about 99%.

The area under the curve (AUC) of a Receiver Operating Characteristic (ROC) curve (AUROC) of predicting the one or more frequencies and/or one or more ranges of frequencies to isolate one or more particles and/or one or more plurality of particles may comprise a value of at least about 0.50, at least about 0.55, at least about 0.60, at least about 0.65, at least about 0.70, at least about 0.75, at least about 0.80, at least about 0.85, at least about 0.90, at least about 0.95, at least about 0.96, at least about 0.97, at least about 0.98, or at least about 0.99.

The area under the precision-recall curve (AUPR) of predicting the one or more frequencies and/or one or more ranges of frequencies to isolate one or more particles and/or one or more plurality of particles may comprises a value of at least about 0.10, at least about 0.15, at least about 0.20, at least about 0.25, at least about 0.30, at least about 0.35, at least about 0.40, at least about 0.45, at least about 0.50, at least about 0.55, at least about 0.60, at least about 0.65, at least about 0.70, at least about 0.75, at least about 0.80, at least about 0.85, at least about 0.90, at least about 0.95, at least about 0.96, at least about 0.97, at least about 0.98, or at least about 0.99.

In some embodiments, the trained model may be trained or configured to predict the one or more frequencies and/or one or more ranges of frequencies to isolate one or more particles and/or one or more plurality of particles with a sensitivity of at least about 50%, at least about 55%, at least about 60%, at least about 65%, at least about 70%, at least about 75%, at least about 80%, at least about 85%, at least about 90%, at least about 95%, at least about 96%, at least about 97%, at least about 98%, or at least about 99%.

In some embodiments, the trained model may be trained or configured to predict the one or more frequencies and/or one or more ranges of frequencies to isolate one or more particles and/or one or more plurality of particles with a specificity of at least about 50%, at least about 55%, at least about 60%, at least about 65%, at least about 70%, at least about 75%, at least about 80%, at least about 85%, at least about 90%, at least about 95%, at least about 96%, at least about 97%, at least about 98%, or at least about 99%.

In some embodiments, the trained model may be trained or configured to predict the one or more frequencies and/or one or more ranges of frequencies to isolate one or more particles and/or one or more plurality of particles with a positive predictive value (PPV) of at least about 50%, at least about 55%, at least about 60%, at least about 65%, at least about 70%, at least about 75%, at least about 80%, at least about 85%, at least about 90%, at least about 95%, at least about 96%, at least about 97%, at least about 98%, or at least about 99%.

In some embodiments, the trained model may be trained or configured to predict the one or more frequencies and/or one or more ranges of frequencies to isolate one or more particles and/or one or more plurality of particles with a negative predictive value (NPV) of at least about 50%, at least about 55%, at least about 60%, at least about 65%, at least about 70%, at least about 75%, at least about 80%, at least about 85%, at least about 90%, at least about 95%, at least about 96%, at least about 97%, at least about 98%, or at least about 99%.

In some embodiments, the trained model may be trained or configured to predict the one or more frequencies and/or one or more ranges of frequencies to isolate one or more particles and/or one or more plurality of particles with an area under the curve (AUC) of a Receiver Operating Characteristic (ROC) curve (AUROC) of at least about 0.50, at least about 0.55, at least about 0.60, at least about 0.65, at least about 0.70, at least about 0.75, at least about 0.80, at least about 0.85, at least about 0.90, at least about 0.95, at least about 0.96, at least about 0.97, at least about 0.98, or at least about 0.99.

In some embodiments, the trained model may be trained or configured to predict the one or more frequencies and/or one or more ranges of frequencies to isolate one or more particles and/or one or more plurality of particles with an area under the precision-recall curve (AUPR) of at least about 0.10, at least about 0.15, at least about 0.20, at least about 0.25, at least about 0.30, at least about 0.35, at least about 0.40, at least about 0.45, at least about 0.50, at least about 0.55, at least about 0.60, at least about 0.65, at least about 0.70, at least about 0.75, at least about 0.80, at least about 0.85, at least about 0.90, at least about 0.95, at least about 0.96, at least about 0.97, at least about 0.98, or at least about 0.99.

Computer Systems

The present disclosure provides computer systems that are programmed to implement methods of the disclosure. FIG. 7 shows a computer system 700 that is programmed or otherwise configured to isolate one or more particles, described elsewhere herein. The computer system 700 can regulate various aspects of the frequency of the one or more electrodes, described elsewhere herein to isolate particles of various sizes of the present disclosure. In some instances, the computer systems may sense and/or detect a particle size (e.g., diameter) by one or more sensors and determine one or more frequencies to apply to isolate one or more particles on one or more electrodes. In some cases, the computer system may use a look up table of prior established frequencies configured to isolate or draw one or more particles to the one or more electrodes of the devices and/or systems described herein. In some cases, the computer systems may implement a predictive model, described elsewhere herein, configured to determine the appropriate one or more frequencies or frequency ranges to apply to the one or more electrodes. The computer system 700 can be an electronic device of a user or a computer system that is remotely located with respect to the electronic device. The electronic device can be a mobile electronic device.

The computer system 700 may comprises a central processing unit (CPU, also "processor" and "computer processor" herein) 702, which can be a single core or multi core processor, or a plurality of processors for parallel processing. The computer system 700 may comprise memory or memory location 708 (e.g., random-access memory, read-only memory, flash memory), electronic storage unit 704 (e.g., hard disk), communication interface 710 (e.g., network adapter) for communicating with one or more other systems, and peripheral devices 706, such as cache, other memory, data storage and/or electronic display adapters. The memory 708, storage unit 704, interface 710 and peripheral devices 706 are in communication with the CPU 702 through a communication bus (solid lines), such as a motherboard. The storage unit 704 can be a data storage unit (or data repository) for storing data. The computer system 700 can be operatively coupled to a computer network ("network") 712 with the aid of the communication interface 710. The network 712 can be the Internet, an internet and/or extranet, or an intranet and/or extranet that is in communication with the Internet. The network 712 in some cases is a telecommunication and/or data network. The network 712 can include one or more computer servers, which can enable distributed computing, such as cloud computing. The network 712, in some cases with the aid of the computer system 700, can implement a peer-to-peer network, which may enable devices coupled to the computer system 700 to behave as a client or a server.

The CPU 702 can execute a sequence of machine-readable instructions, which can be embodied in a program or software. The instructions may be stored in a memory location, such as the memory 708. The instructions can be directed to the CPU 702, which can subsequently program or otherwise configure the CPU 702 to implement methods of the present disclosure. Examples of operations performed by the CPU 702 can include fetch, decode, execute, and writeback.

The CPU 702 can be part of a circuit, such as an integrated circuit. One or more other components of the system 700 can be included in the circuit (e.g., the chip of the systems and/or devices, described elsewhere herein). In some cases, the circuit is an application specific integrated circuit (ASIC).

The storage unit 704 can store files, such as drivers, libraries, and saved programs. The storage unit 704 can store user data, e.g., user preferences and user programs. The computer system 700 in some cases can include one or more additional data storage units that are external to the computer system 700, such as located on a remote server that is in communication with the computer system 700 through an intranet or the Internet.

The computer system 700 can communicate with one or more remote computer systems through the network 712. For instance, the computer system 700 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 700 via the network 712.

Methods as described herein can be implemented by way of machine (e.g., computer processor) executable code stored on an electronic storage location of the computer system 700, such as, for example, on the memory 708 or electronic storage unit 704. The machine executable or machine-readable code can be provided in the form of software. During use, the code can be executed by the processor 702. In some cases, the code can be retrieved from the storage unit 704 and stored on the memory 708 for ready access by the processor 702. In some situations, the electronic storage unit 704 can be precluded, and machine-executable instructions are stored on memory 708.

The code can be pre-compiled and configured for use with a machine having a processer adapted to execute the code or can be compiled during runtime. The code can be supplied in a programming language that can be selected to enable the code to execute in a pre-compiled or as-compiled fashion.

Aspects of the systems and methods provided herein, such as the computer system 700, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements comprise optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 700 can include or be in communication with an electronic display 716 that comprises a user interface (UI) 714 for providing, for example, user views to select the type of sample provided to the device and/or systems described here, live video and/or still images taken of the isolation of the particles on the device, device operating characteristics (e.g., pressure within the device, sensor values, frequency emitted, etc.), the measured outcome of the particles isolated, or any combination thereof. Examples of UI's include, without limitation, a graphical user interface (GUI) and web-based user interface.

In some cases, the systems provided herein comprise an electro-fluidic system. In some instances, the electro-fluidic system may comprise: (a) a chip, electrically coupled with at least one electrode, described elsewhere herein, where at the at least one electrode is coated, and where the coating provides an increase of at least 5% of a surface area of the surface where one or more particles of a fluid sample are isolated relative to a similar electrode under similar conditions without the coating; (b) a controller comprising one or more processors electrically coupled to the at least one electrode; and (c) a non-transient computer readable storage medium comprising software, where the software comprises executable instructions that, as a result of execution, cause the one or more processors of the controller to: (i) receive an input, where the input indicates parameters (e.g., frequency, described elsewhere herein) for isolating one or more particles of a fluid composition; and (ii) provide the electrical signal to the at least one electrode to isolate the one or more particles of the fluid composition on the surface of the device when the fluid composition is transported across the surface. In some cases, the at least one electrode comprises a curved edge portion, where the curved edge portion may comprise an average tangential angle greater than 45 degrees along the curved edge portion. In some cases, the curved edge portion of the electrode may provide an increase of at least about 5%, at least about 10%, at least about 15%, at least about 20%, or at least about 25% of a capture area of a surface of a device where one or more particles of a fluid sample are isolated relative to a similar electrode under similar conditions without the curved edge portion when the fluid sample is transported across the surface. In some cases, the parameters of the electrical signal may comprise frequency and amplitude of the electrical signal. In some instances, the frequency may comprise one or more frequencies and/or frequency ranges, as described elsewhere herein. In some instances, the surface may comprise the surface of a flow cell, where the flow cell may comprise one or more microfluidic channels. In some instances, the input may comprise a user input, a detected signal from one or more sensors, described elsewhere herein, or a combination thereof. In some cases, the system and/or devices, described elsewhere herein, may comprise an enclosure configured to mechanically and/or electrically couple to the chip, where the enclosure is in electrical communication with the one or more processors.

In some cases, the controller unit may generate instructions for the specification, timing, and location of the electric field frequencies to apply to the at least one electrode. In some cases, the controller unit may comprise a database of predefined algorithms, datasets, described elsewhere herein, and/or tables to isolate one or more particles of a fluid sample. In some cases, the controller unit may control one or more pumps that provide and/or transport the fluid sample across the surface of the device.

In some cases, the at least one electrode comprises a first electrode and a second electrode. In some cases, the electrical signal comprises a first electrical signal provided to the first electrode and a second electrical signal provided to the second electrode, where the first electrode and the second electrode partially or do not overlap, as described elsewhere herein. In some cases, the electrical signal may comprise a first electrical signal provided at a first time and a second electrical signal provided at a second time to the at least one electrode, where the first time precedes the second time. In some instances, the first electrical signal may comprise a first frequency or frequency range and the second electrical signal may comprise a second frequency or second frequency range. The first frequency or frequency range may be the same as the second frequency or second frequency range. In some instances, the first frequency or first frequency range may differ from the second frequency or the second frequency range. In some cases, the at least one electrode is coated as described elsewhere herein.

Device, systems, and/or methods of the present disclosure can be implemented by way of one or more algorithms. An algorithm can be implemented by way of software upon execution by the central processing unit 702. The algorithm can, for example, determine the one or more frequencies or one or more frequency ranges to apply to the one or more electrodes to isolate one or more particles. The algorithm may determine the one or more frequencies or one or more frequency ranges from sensor values and a lookup table of sensor value mapped to one or more frequencies or one or more frequency ranges configured to one or more particles of a measured sensor value.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. It will be obvious to those skilled in the art that such embodiments are provided by way of example only. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables.

It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

Definitions

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Certain inventive embodiments herein contemplate numerical ranges. When ranges are present, the ranges include the range endpoints. Additionally, every sub range and value within the range is present as if explicitly written out. The term "about" or "approximately" may mean within an acceptable error range for the particular value, which will depend in part on how the value is measured or determined, e.g., the limitations of the measurement system. For example, "about" may mean within 1 or more than 1 standard deviation, per the practice in the art. Alternatively, "about" may mean a range of up to 20%, up to 10%, up to 5%, or up to 1% of a given value. Where particular values are described in the application and claims, unless otherwise stated the term "about" meaning within an acceptable error range for the particular value may be assumed.

EXAMPLES

Materials and Methods

For all Examples below, each microelectrode array (Sigil Biosciences, San Diego, CA) was custom designed and constructed using additive manufacturing methods, specifically using aerosol jet printing to print gold Gold Nanoparticle Metalon® Conductive Inks (Novacentrix, Texas, USA) on a microscope glass slide. The shapes created are described in each Example below and shown in their referenced figures. Once constructed on glass, all chips were baked at 225° C. per manufacturer's instructions and then laser etched to remove any excess gold between the electrode lines as well as to create as exact distances and sharp edges to remove unwanted curvature. The electrodes surfaces and depth readings were then measured using the Optical Profilometry settings on a Keyence 3D surface profiler (Keyence Corp of America, Elmwood, NJ, USA). The heights of all connector lines were 5 micrometers on average and the heights of all circular electrode elements were 13 μm on average. For the conductive coating examples, gold nanoparticles were sprayed over each electrode adding an additional ~500 nm height on average. For the dielectric coating, N121 dielectric coating was sprayed as a donut shape around each circular electrode adding an additional ~50 μm height on average.

Experimental Run Conditions

All Examples experiments were performed using the same following materials and conditions to ensure repeatable and comparable measurement:

1. Solution A: Bangs Labs 5 μm dragon green fluorescent carboxylated polystyrene beads (Fishers, IN, USA) was diluted 1:100,000 from stock into de-ionized water. This dilution was created to ensure a countable number of beads would exist in every experiment such that visual bead count can be performed for each electrode array.
2. Each glass slide had 20 μL of Solution A deposited on its surface for each experiment.
3. All Example experiments were performed using a 5 kHz, 10Vp-p run for 5 min which was generated using a HP3145A function generator and delivered to the arrays via gator clips attached to electrical pads that connected to the electrodes. After 5 min, 10 μL of fluid was removed (to remove excess beads and reduce light refraction for a clearer image) and the surface was imaged.
4. All Example experiments were visualized using a 4× and 10× objective on a BX51WI fluorescent microscope (Olympus Corporation of the Americas, Central Valley, PA) set to the FITC green channel. Images shown in FIGS. 11A-14F were captured on a DP28 1" 8.9 MP color CMOS, 3.45 μm, 32 fps CCD Camera (Evident Scientific, Waltham, MA, USA) connected to a computer.
5. The number of 5 μm green-fluorescent beads were counted and quantified visually based on the images taken.

Example 1: Improved Capture of Particles by Incorporating of Curved Edge Electrodes Features into Straight Interdigitated Electrodes.

Figure 11A:
Figure 11B:
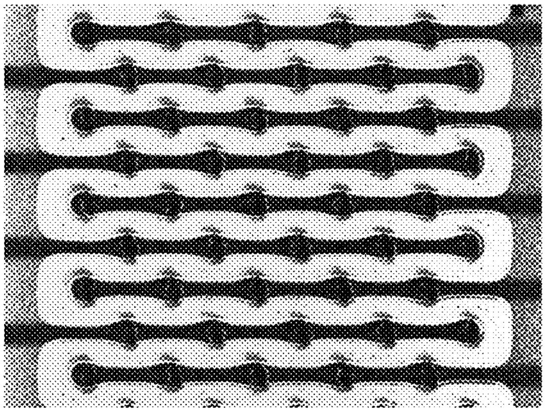
Figure 11C:
Figure 11D:
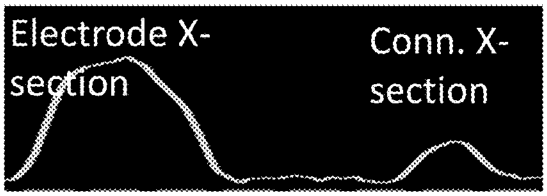

In Example 1 experiments and results are shown that support the increased capture capability of an electrode array by adding curved elements to a straight interdigitated line, as described elsewhere herein. This example demonstrated improvement in capture capabilities between a straight interdigitated electrode array (baseline) and the same array when combined with patterned round electrode pads (FIGS. 11A and 11B). The cross-sectional surface features of the straight connector lines and the circular electrodes with connector lines was calculated by optical profilometry from the Keyence 3D surface profiler is shown in FIG. 11C and FIG. 11D, respectively. As can be observed, the surfaces of both the electrode connector lines and the round pads curved in the Y dimension (height). The top-down perspective view shown in FIG. 11B also demonstrates that the round electrodes incorporate a curve edge portions in XZ dimensions (plane) as well.

Solution A above was added to each of the above electrode arrays and the Experimental run conditions were performed as described above.

Figure 11E:
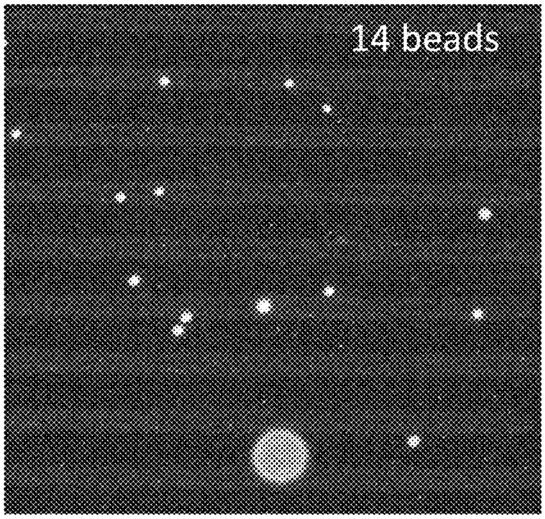
Figure 11F:
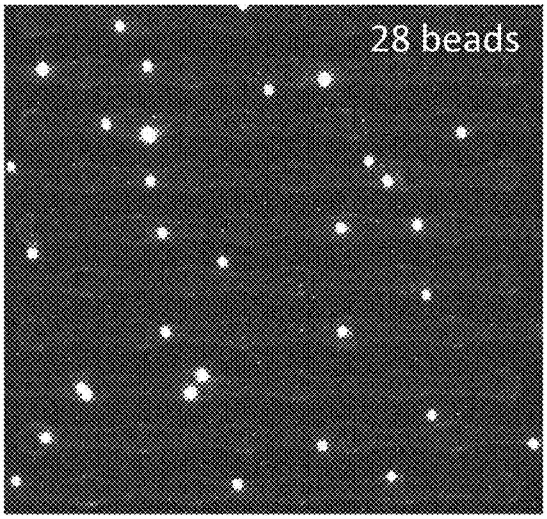

As can be seen in the images in FIG. 11E and FIG. 11F, 14 beads were captured on the baseline straight connector lines by themselves (the fluorescent artifact at the bottom center of the image was excluded), whereas 28 beads were captured on the electrode array with round pads. The experiment demonstrated improved capture efficiency of by approximately 2×, i.e., 100% due to incorporation of curved edge elements (round electrode pads) into straight interdigitated electrodes. Notably, we were able to demonstrate the ability to capture particles on all areas (edges, round pads, top and sides of connector lines) of the patterned electrodes vs edge capture that would be expected on standard arrays. Incorporation of a curve edge into straight electrodes maximized a gradient of electrical flux across as described elsewhere herein the all curved portions of the array, rendering larger areas of electrodes to be available for both activating electric field and capturing particles. The ability to maximize usable areas of an array provides a new and unexpected improvement in the ability to isolate and capture rare particles from any fluid solution.

Figure 12A:
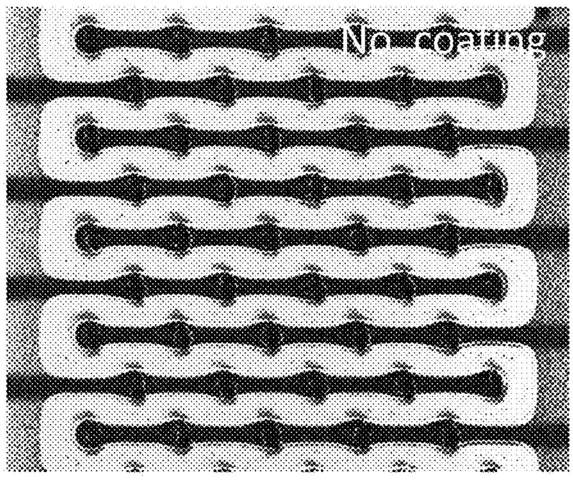

Example 2: Further Improvement of Particle Capture Due to Incorporation of Conductive Electrodes Coating In Example 2, the capture results of the array with straight line connectors that incorporated rounded pads were then compared against the same array coated in a thin layer of gold nanoparticles as described in the Methods section above. As described elsewhere herein, capture efficiency may be increased further if an additional layer of conductive coating is disposed and/or placed on the electrodes and connector lines (as shown in e.g., FIG. 1H and FIG. 6C). FIG. 12A shows the standard array with no coating and FIG. 12C shows the same array with conductive coating. Solution A above was added to each of the arrays and the Experimental run conditions were performed as described above.

Figure 12B:
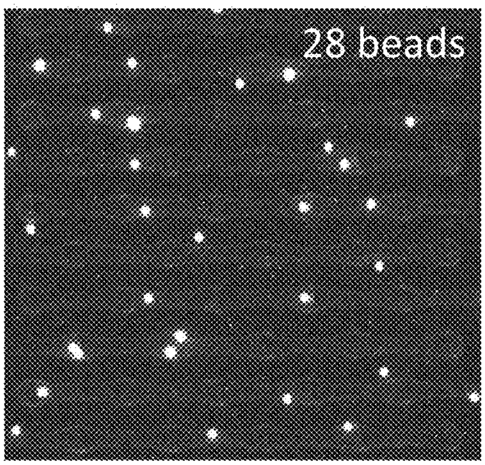
Figure 12C:
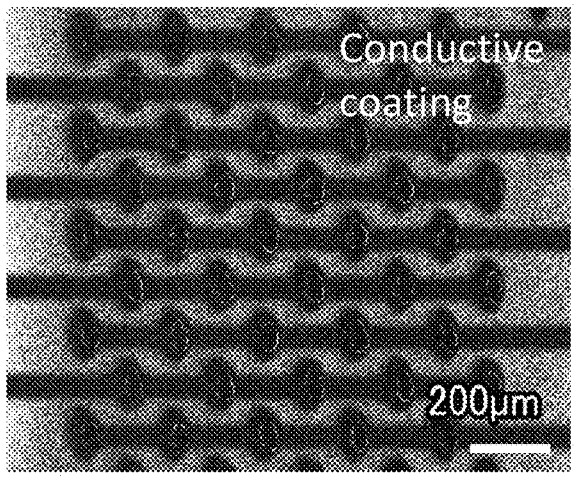
Figure 12D:
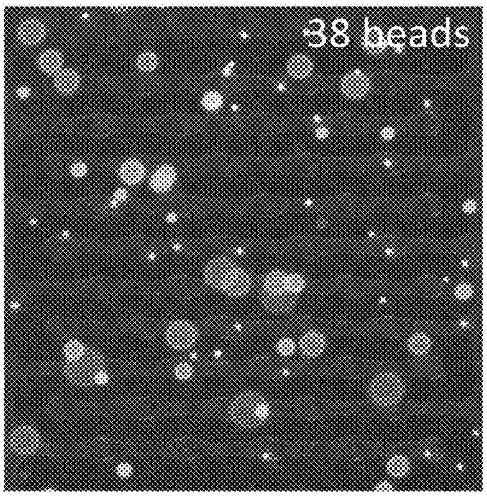

As can be seen in the images in FIG. 12B and FIG. 12D, 28 beads were previously captured in the no coated circular electrode with straight line connectors ("patterned electrodes"), whereas 38 beads were captured on the electrode array with the conductive coating. The conductive gold nanoparticle coating increases the gradient of the electric field as described elsewhere herein (FIG. 6C and FIG. 1G-1H), as well as increased the overall curvature area of the surface making it more "bumpy" which, in turn, increased electric field gradients and capture. The experiment demonstrated that the use of conductive coating that incorporated nanoscale curved edge resulted in approximately 36% improvement in the efficiency of capture vs uncoated patterned electrodes, and approximately 171% improvement in the efficiency of capture vs baseline electrodes that contain neither curved edge nor conductive coating.

The ability to significantly amplify capture performance of an array by incorporating flux-maximizing conductive coating demonstrated in Example 2 provides a new and unexpected improvement in the ability to isolate and capture rare particles from any fluid solution.

Figure 12E:
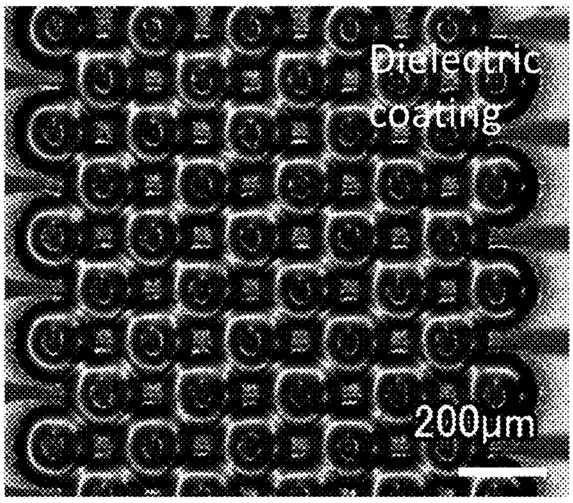

Example 3: Further Improvement of Particle Capture Due to Incorporation of Dielectric Coating In Example 3, the data of patterned uncoated electrodes was then compared against the same array coated in a thick donut style coating of insulative dielectric material as described in Methods section above. As described elsewhere herein, capture efficiency may be further improved if an additional layer of insulative dielectric coating is put on the electrodes (as shown in FIG. 1E-F and FIG. 6B). FIG. 12A shows the standard array with no coating and FIG. 12E shows the same array with insulative dielectric coating on the outside of the circular electrodes. Solution A above was added to each of the arrays and the Experimental run conditions were performed as described above.

Figure 12F:
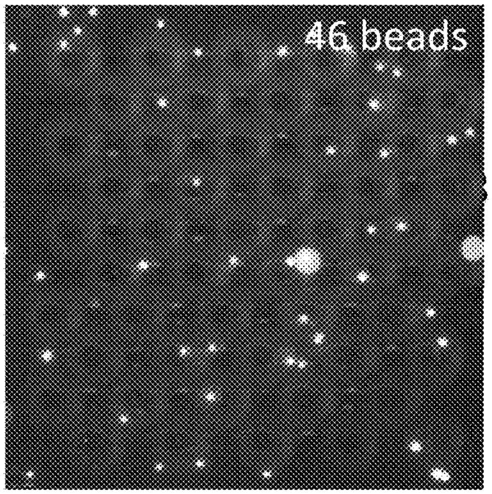

As can be seen in the images in FIG. 12B and FIG. 12F, 28 beads were previously captured on the uncoated electrodes, whereas 46 beads were captured on the electrode array with the dielectric coating. Dielectric coating increases the gradient of the electric field by narrowing and focusing the areas where the electric field can reach solution and by reflecting the electric field creating stronger gradients, as described elsewhere here. Stronger electric field gradients results in an increase in capture and/or isolation of particles, as described elsewhere herein. The difference in efficiency demonstrated by the results of Example 3 was an increase of ~64% more capture efficiency compared to an uncoated patterned array, and ~230% more capture efficiency compared to the baseline array that contained no circular electrodes at all. The results described above in at least Example 3 illustrate the increase in capture efficiency from the additional dielectric coating, as described elsewhere herein.

The ability to focus and strengthen electric field and corresponding capture of the particles by the use of dialectic coating demonstrated in Example 3 provides a new and unexpected improvement in the ability to isolate and capture rare particles from any fluid solution.

Example 4: Improved Capture of Particles by Incorporating of Curved Edge Electrodes Features into Zig-Zag Connector Lines.

Figure 13A:
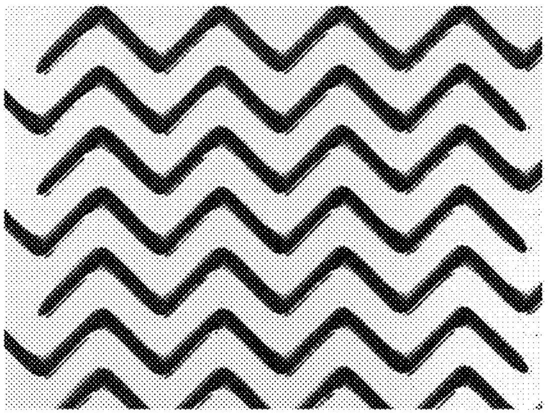
Figure 13B:
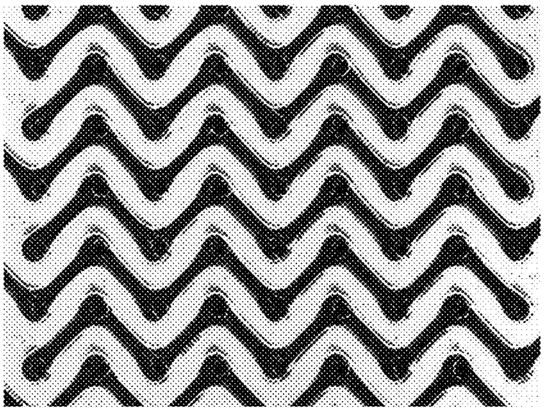
Figure 13C:
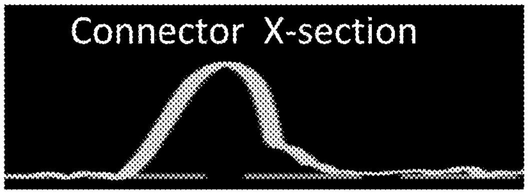
Figure 13D:
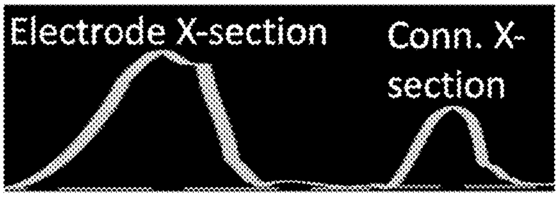

The experiments described in Example 4 illustrate that adding curved elements to a zig-zag connector line, as described elsewhere herein, increases the capture capability of the electrode, as described elsewhere herein. Example 4 shows the difference in capture capabilities between a zig-zag connector line electrode array and the same array with circular elements added in a spaced manner (FIGS. 13A and 13B). The cross-sectional surface features of the zig-zag connector lines and the circular electrodes with the connector lines was calculated by optical profilometry from the Keyence 3D surface profiler is shown in FIG. 13C and FIG. 13D, respectively. As can be seen, the surface of both the connector lines and the circles is curved in the Y dimension (height). The top-down perspective view shown in FIG. 13B also shows that the round electrodes incorporate a curve edge portions in XZ dimensions (plane) as well. Solution A above was added to each of the arrays and the Experimental run conditions were performed as described above.

Figure 13E:
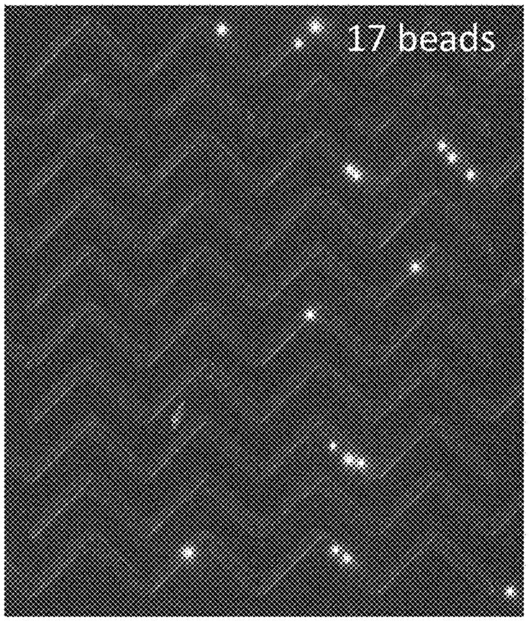
Figure 13F:
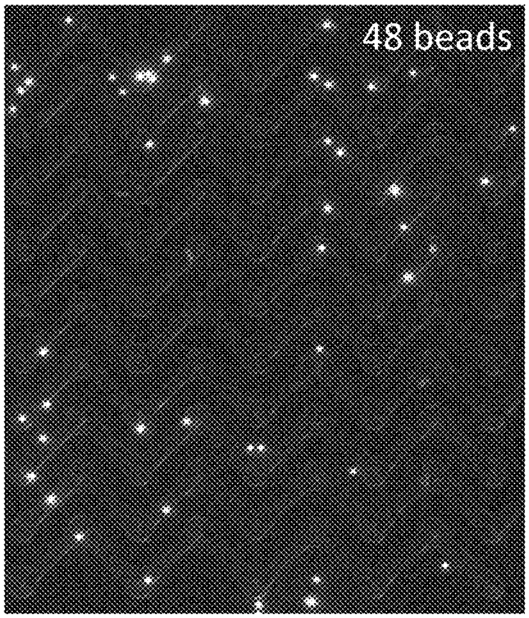

As can be seen in the images in FIG. 13E and FIG. 13F, 17 beads were captured in the zig-zag connector lines, whereas 48 beads were captured on the electrode array with circles. Adding curved elements to the surface increased capture efficiency by about 3×, i.e., 282% more capture than the zig-zag lines without the curved elements under the same run conditions. The beads also captured in every part of the array (both edges, circular elements, and the lines themselves) enabling greater surface area for capture and greater area that the electric field is emanating from.

The increases in capture shown in the results of Example 4 support the unexpected improvement in capture efficiency, area, and/or surface area of the electrodes afforded by e.g., the circular elements, as described elsewhere herein. The ability to maximize usable areas of an array demonstrated in Example 4 provides a new and unexpected improvement in the ability to isolate and capture rare particles from any fluid solution.

Example 5: Addition of Conductive Coating to Curved Electrodes with Zig-Zag Connector Lines Leads to Greater Capture Compared to No Conductive Coating.

Figure 14A:
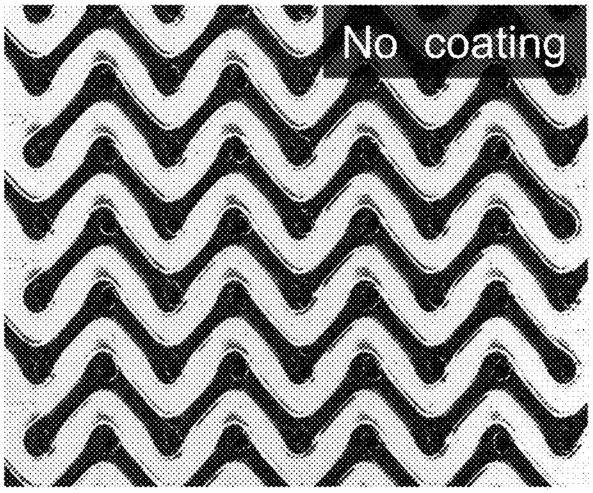

Similar to Example 2, in Example 4 the data of the circular electrodes with zig-zag line connectors was compared against the same array coated in a thin layer of gold nanoparticles as described in the Methods section above, and also shown in FIG. 1G-H and FIG. 6C. FIG. 14A shows the standard array with no coating and FIG. 14C shows the same array with conductive coating. Solution A above was added to each of the arrays and the Experimental run conditions were performed as described above.

Figure 14B:
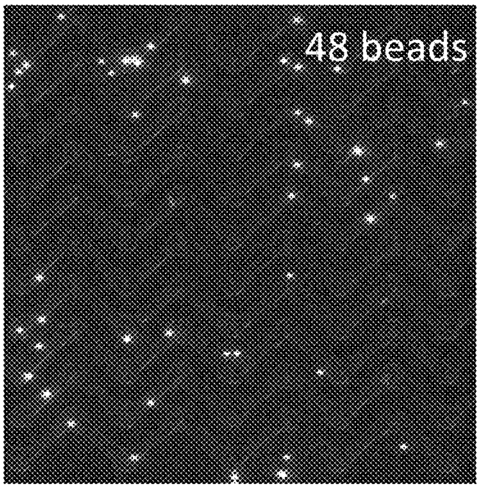
Figure 14C:
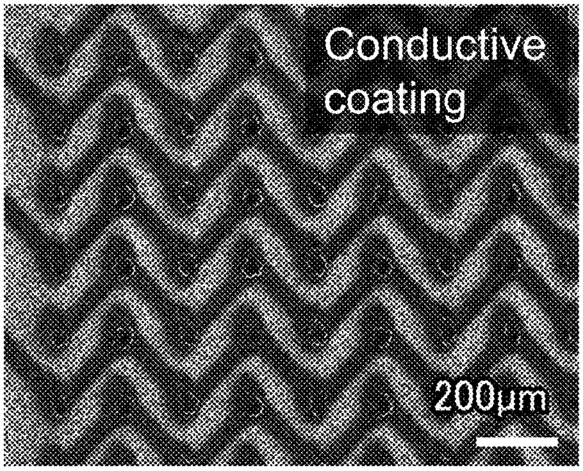
Figure 14D:
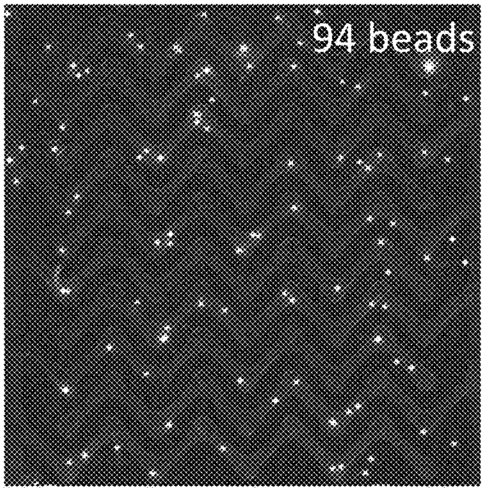

As can be seen in the images in FIG. 14B and FIG. 14D, 48 beads were previously captured on the no coated circular electrode with zig-zag line connectors, whereas 94 beads were captured on the electrode array with the conductive coating. The conductive gold nanoparticle coating increased the gradient of the electric field as described elsewhere herein (FIG. 6C and FIG. 1G-H), as well as increased the overall curvature of the surface making it more "bumpy" which also increases electric field gradients and capture. The difference in efficiency observed was about double the capture and about 96% increase in capture efficiency compared to no coating, and about 5.5× or about 453% increase in capture efficiency compared to no circular electrodes at all. The increase in capture efficiency as observed in the results of Example 5, support the increase in capture efficiency, area, and/or surface of an electrode, as described elsewhere herein.

Example 6: Addition of Dielectric Coating to Curved Electrodes with Zig-Zag Connector Lines Leads to Greater Capture Compared to No Dielectric Coating.

Figure 14E:
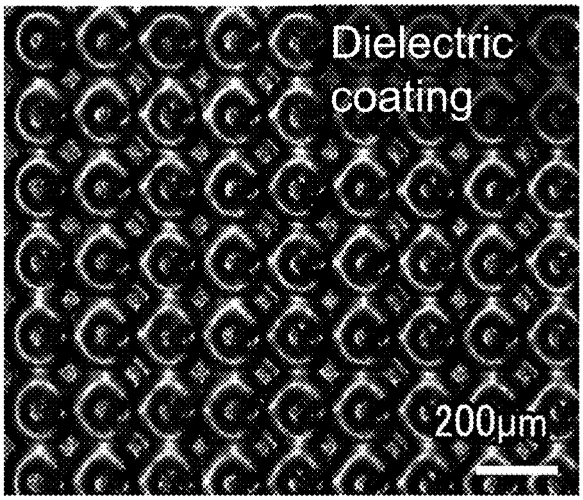

In Example 6, the data of the circular electrodes with zig-zag line connectors was then compared against the same array coated in a thick donut style coating of insulative dielectric material as described in Methods section above. As described elsewhere herein, capture efficiency of an electrode may improve even further if an additional layer of insulative dielectric coating is put on the electrode (as shown in FIG. 1E-F and FIG. 6B). FIG. 14A shows the standard array with no coating and FIG. 14E shows the same array with insulative dielectric coating on the outside of the circular electrodes. Solution A above was added to each of the arrays and the Experimental run conditions were performed as described above.

Figure 14F:
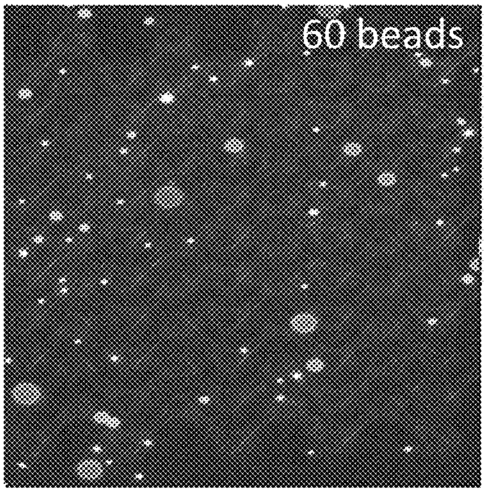

As can be seen in the images in FIG. 14B and FIG. 14F, 48 beads were previously captured in the no coated circular electrode with straight line connectors, whereas 60 beads were captured on the electrode array with the dielectric coating. From the results shown in Example 6, it was observed that the dielectric coating increased efficiency and capture of particles, as described elsewhere herein. Efficiency of capture of the electrodes with dielectric coating was an increase of about 25% more capture efficiency compared to no coating, and about 253% more capture efficiency compared to no circular electrodes at all. The results shown in Example 6 support the increases in capture efficiency, area, and/or surface area of the electrodes, described elsewhere herein.

Example 7: Comparing Capture on Gold-Standard Straight Interdigitated Connector Lines to Capture on Zig-Zag Connector Lines with Circles and with Coating The experiment of Example 7 compared straight interdigitated lines which are the gold standard electrode array (FIG. 11A) to the zig-zag line connectors with circles (FIG. 14A) and with circles and conductive coating (FIG. 14C). The results showed that the standard interdigitated electrode array captured 14 beads (FIG. 11E), the zig-zag connectors with circles captured 48 beads (FIG. 14B), and the zig-zag with conductive coating captured 94 beads (FIG. 14D). The zig-zag lines with circles captured about 3.5× times the number of beads (243% greater efficiency) and the zig-zag lines with conductive coating captured about 6.7× the number of beads (572% more efficiency). The additional advantage arises due to curving both the connector lines as well as the electrodes themselves in the chip. This leads to a 4×-7× increase in capture over the gold standard interdigitated electrode array in the same parameters using the same materials and methods of comparison. This increase in efficiency due to at least a curvature of a surface, edge, and/or contour of an electrode and/or electrode connector, as described elsewhere herein, supports the advantage as shown mathematically elsewhere herein and through experiments in the examples of increasing capture efficiency.

Figure 10A:
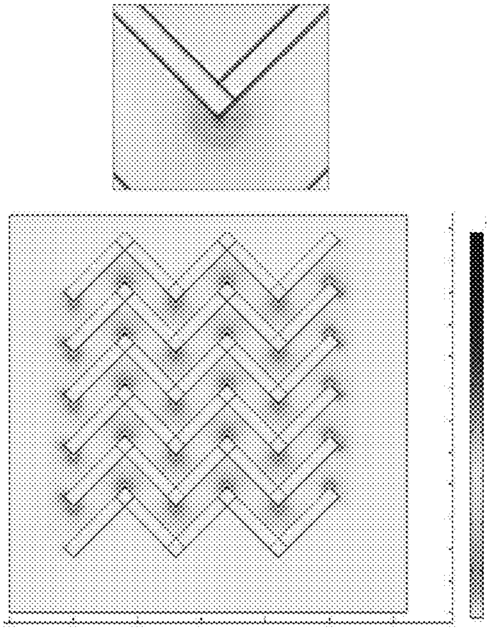
Figure 10B:
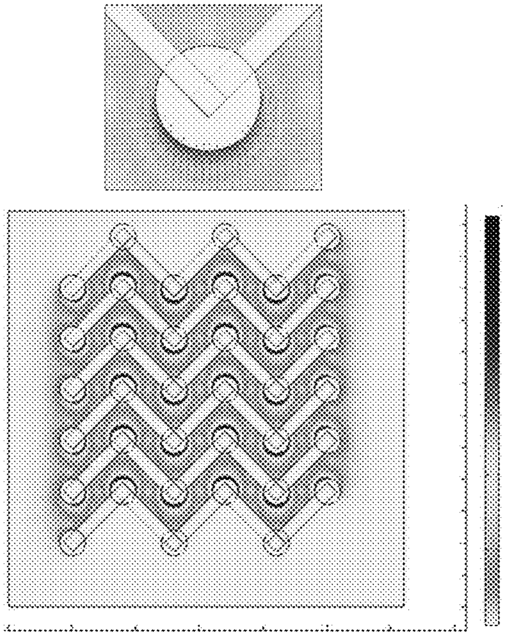
Figure 10C:
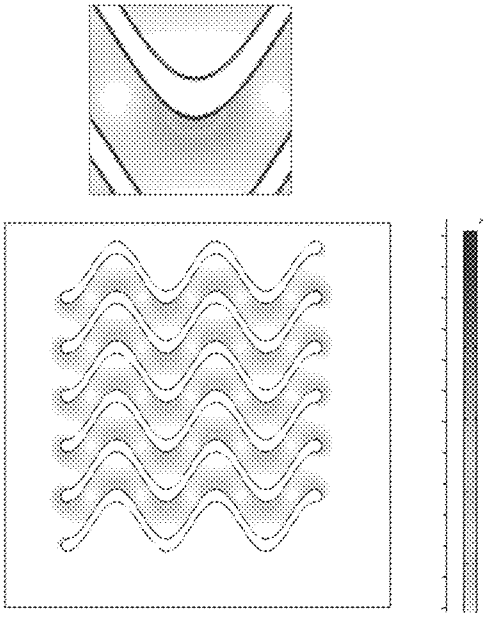
Figure 10D:
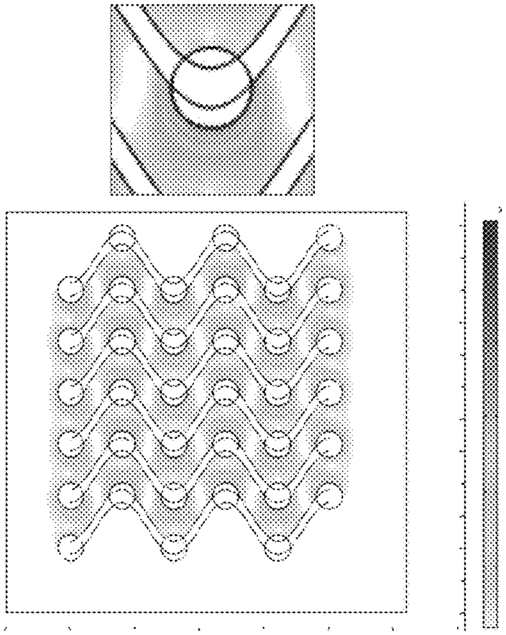

Example 8: Simulation of Electrode Electric Fields with and without Circular Features Finite element modeling of an electric field for various electrode designs, as shown in FIGS. 10A-10D was conducted. A comparison of electric fields was conduct between a zig-zag electrode (FIG. 10A) and zig-zag electrode with circular features (FIG. 10B); and between a curved electrode (FIG. 10C) and a curve electrode with circular features (FIG. 10D). In both zig-zag and curved electrode designs, the electrodes with the circular features emitted an electric field of both greater in strength as well as greater in area as shown by the darker color shown on FIGS. 10A-10D indicating the higher strength of electric field. Thus, the results shown at least in FIGS. 10A-10D support the increase in capture efficiency, area, and/or surface area of particles provided by curvature of the electrode as well as the circular and/or curved features, as described elsewhere herein.

Embodiments

Embodiment 1. An electro fluidic device, comprising:

- a chip electrically coupled with at least one electrode attached to a surface of the chip, wherein the at least one electrode is coated, and
- wherein the coating provides an increase of at least 5% of a capture area of the surface where one or more particles of a fluid sample are isolated relative to a similar electrode under similar conditions without the coating when the fluid sample is transported across the surface.

Embodiment 2. The device of embodiment 1, wherein the surface comprises a surface of a flow cell.

Embodiment 3. The device of embodiment 1 or embodiment 2, wherein the flow cell comprises one or more microfluidic channels.

Embodiment 4. The device of any one of embodiments 1-3, wherein the coating comprises agarose, polyacrylamide, acrylamides, N-substituted acrylamides, N-substituted methacrylamides, methacrylamide chitosan, alginate, collagen, cellulose acetate, cellulose acetate butyrate, cellulose acetate phthalate, sol-gels, metal oxides, metal alkoxides, metal chlorides, organics nanoparticles, ceramic nanoparticles, metallic nanoparticles, aerogels, xerogels, xylogels, cryogels, carbogels, subgels, silicone hydrogels, conjugated polymers, polypyrrole (Ppy), polyethylene, polyaniline, polythiophene derivatives, poly(3,4-ethylenedioxythiophene) doped with poly(styrene sulfonate) (PEDOT:PSS), acrylamide based polymer, polythiophene based polymer, vinyl based polymer, any derivatives thereof, or any combination thereof.

Embodiment 5. The device of any one of embodiments 1-4, wherein the coating comprises one or more type of particles.

Embodiment 6. The device of any one of embodiments 1-5, wherein the one or more particles comprise a diameter from about 1 nanometer to 5 millimeters.

Embodiment 7. The device of any one of embodiment 1-6, wherein the one or more particles comprise dielectric particles, insulative particles, conductive particles, semiconductive particles or a combination thereof.

Embodiment 8. The device of any one of embodiments 1-7, wherein the dielectric particles comprise particles with a relative permittivity range of 100 to 500,000,000 when measured at 1 kHz using conventional measuring methods.

Embodiment 9. The device of any one of embodiments 1-8, wherein the dielectric particles comprise particles with a relative permittivity range of 100,000 to 10,000,000 when measured at 1 kHz using conventional measuring methods.

Embodiment 10. The device of any one of embodiments 1-9, wherein the conductive particles comprise liquid metals, charged polymer R groups, graphene, gold, silver, copper, aluminum, platinum, metallic nanoparticles, polyacrylic acid, silicone hydrogels, conjugated polyelectrolytes, PEDOT-S, PTHS, p(g2T-TT), p(gNDI-g2T), NIPAM, PEDOT:PSS/guar slime (PPGS), ethylene glycol, poly ethylene glycol (PEG), any derivative thereof, or any combination thereof.

Embodiment 11. The device of any one of embodiments 1-10, wherein the conductive particles increase an electric field emitted by the at least one electrode by at least about 5%, at least about 10%, at least about 15%, at least about 20%, or at least about 25%.

Embodiment 12. The device of any one of embodiments 1-11, wherein the dielectric particles comprise poly 2-hydroxyethylmeth acrylate, (pHEMA), Polystyrene, polypropylene, conjugated polymer PVDF, polymers/copolymers—P(VDF-CTFE), P(VDF-TrFE), P(VDF-TrFE-CTFE), P (TFE-HFP), (PVDF-g-HEMA)], PARQ copolymers, cuPc, FePc, PTTEMA/PS, Polythiourea blends, PNIPam, polymer and ceramic particle blends, polymer and metal particle blends, ceramics, metal oxide, graphene oxide, silica beads, silicon dioxide, borosilicate, natural rubber beads, silicone rubber beads, 4-acryloylmorpholine (ACMO), 2-ethylhexyl acrylate (2-EHA), any derivates thereof, or any combination thereof.

Embodiment 13. The device of any one of embodiments 1-12, wherein the dielectric particles increase the surface area where the one or more particles of the fluid sample are isolated by at least about 5%, at least about 10%, at least about 15%, or at least about 20%, at least about 25% compared to a device without the dielectric particles.

Embodiment 14. The device of any one of embodiments 1-13, wherein the one or more particles are suspended in a gel, hydrogel, or a combination thereof.

Embodiment 15. The device of any one of embodiments 1-14, wherein the one or more particles are provided on a top surface of the coating, within the coating, in contact with a surface of the at least one electrode, without contact with a surface of the at least one electrode, or any combination thereof.

Embodiment 16. The device of any one of embodiments 1-15, comprising one or more sensors electrically coupled to the chip.

Embodiment 17. The device of any one of embodiments 1-16, wherein the one or more sensors are integrated into the device or external to the device.

Embodiment 18. The device of any one of embodiments 1-17, comprising a passivation layer wherein a first surface of the passivation layer is in contact with a surface of the chip, and wherein a second surface of the passivation layer is in contact with a surface of the at least one electrode.

Embodiment 19. The device of any one of embodiments 1-18, wherein the passivation layer comprises a material of silicon dioxide, silicon nitride, silicon carbide, high-k dielectric polymers, high-k dielectric plastics, borosilicate glass, PSG, BPSG, or any combination thereof.

Embodiment 20. The device of any one of embodiments 1-19, comprising an enclosure configured to mechanically and electrically coupled to the chip, wherein the enclosure is in electrical communication with one or more processors.

Embodiment 21. The device of any one of embodiments 1-20, wherein the coating comprises a thickness up to about ⅓ a distance between a first electrode and a second electrode of the at least one electrode.

Embodiment 22. The device of any one of embodiments 1-21, wherein a surface of the chip is coupled to a first surface of an impedance layer, and wherein a second surface of the impedance layer is coupled to the at least one electrode.

Embodiment 23. The device of any one of embodiments 1-22, wherein the impedance layer is configured to reduce cross-talk between a first electrode and a second electrode of the at least one electrode by at least about 20%, at least about 30%, at least about 40%, at least about 50%, at least about 60%, at least about 70%, at least about 80%, at least about 90%, or at least about 95%.

Embodiment 24. The device of any one of embodiments 1-23, wherein the coating covers a surface of the passivation layer, the at least one electrode, or a combination thereof.

Embodiment 25. The device of any one of embodiments 1-24, wherein the one or more particles are provided to a first area of the at least one electrode or a second area of the at least one electrode, and wherein the first area and the second area partially overlap or do not overlap.

Embodiment 26. The device of any one of embodiments 1-25, wherein a surface of the chip is electrically coupled to a first surface of a conduction layer, and wherein a second surface of the conduction layer is electrically coupled to the at least one electrode.

Embodiment 27. The device of any one of embodiments 1-26, wherein the chip is comprised of: a base layer, an impedance layer, a metal adhesion layer, conduction layer, or any combination thereof.

Embodiment 28. The device of any one of embodiments 1-27, wherein the metal adhesion layer comprises a thickness of 10 nm-300 nanometers (nm), and wherein the metal adhesion layer is comprised of titanium, tungsten, silver, copper, gold, or any combination thereof.

Embodiment 29. The device of any one of embodiments 1-28, wherein the impedance layer comprises a film deposited or thermally grown on a surface of the base layer, and wherein the impedance layer comprises a thickness of about 1 to about 100 micrometers (μm).

Embodiment 30. The device of any one of embodiments 1-29, wherein the base layer comprises a substrate surface comprised of a silicon wafer, glass wafer, silicon carbide, PET, Polyvinyl chloride (PVC), thermoplastics, ABS resin plastic, polyethylene plastics, polypropylene, polyimides (PIs), thermoplastic elastomers, a black colored plastic configured to minimize fluorescence, or any combination thereof.

Embodiment 31. The device of any one of embodiments 1-30, wherein the conduction layer comprises gold, silver, copper, aluminum, zinc, lithium, brass, nickel, palladium, platinum, tungsten, tin, titanium, or any combination thereof.

Embodiment 32. The device of any one of embodiments 1-30, wherein the at least one electrode comprises a material of platinum, zinc, lithium, brass, nickel, palladium, tungsten, tin, titanium, gold, silver, aluminum, copper, rubidium, carbon, graphene, graphite, platinized carbon, gold alloys, silver alloys, carbon plated gold.

Embodiment 33. The device of any one of embodiments 1-32, wherein a surface, an interior, or a combination thereof region of the coating may comprise one or more moieties configured to bind to nucleic acid molecules that are free floating or associated with particles, and wherein the one or more moieties comprise synthetic polymers, biosynthetic polymers, biological polymers, or any combination thereof, such as antibodies, proteins, aptamers, DNA, RNA, or any combination thereof.

Embodiment 34. The device of any one of embodiments 1-33, wherein the one or more moieties are configured to couple to one or more extracellular vesicles with attached or surface-level proteins, free-floating proteins, aptamers, DNA, RNA, enzymes, phospholipids, synthetic, biosynthetic and biological polymers, or any combination thereof.

Embodiment 35. The device of any one of embodiments 1-34, wherein the at least one electrode comprises one or more ellipsoid shaped electrodes, wherein an anode electrode is adjacent to cathode electrode of the at least one electrode.

Embodiment 36. The device of any one of embodiments 1-35, wherein the ellipsoid shaped electrodes comprise a minor axis of about 5 μm to about 1 mm and a major axis of about 10 μm to about 2 mm for distinct axis and about 5 μm to about 2 mm for equal axis.

Embodiment 37. The device of any one of embodiments 1-36, wherein the surface comprises a surface of a 6, 12, 24, 48, 96, 384 or 1536 well plate.

Embodiment 38. The device of any one of embodiments 1-37, wherein the one or more particles comprise a diameter from about 1 nanometer to 50 micrometers.

Embodiment 39. The device of any one of embodiments 1-37, wherein the one or more particles comprise a diameter from about 500 micrometers to about 5 millimeters.

Embodiment 40. An electro fluidic device, comprising:

- a chip electrically coupled with at least one electrode attached to a surface of the chip,
- wherein the chip comprises at least one dielectric adjacent to the at least one electrode,
- wherein a surface of the dielectric coupled to the at least one electrode comprises a curved edge portion, and
- wherein the curved edge portion provides an increase of at least 5% of an area of the surface where one or more particles of a fluid sample are isolated relative to a surface of dielectric comprising a non-curved edge portion under similar conditions when the fluid sample is transported across the surface.

Embodiment 41. The device of embodiment 40, comprising one or more sensors electrically coupled to the chip.

Embodiment 42. The device of embodiment 40 or embodiment 41, wherein the one or more sensors are integrated into the device or external to the device.

Embodiment 43. The device of any one of embodiments 40-42, comprising an enclosure configured to mechanically and electrically coupled to the chip, wherein the enclosure is in electrical communication with one or more processors.

Embodiment 44. The device of any one of embodiments 40-43, wherein at least one surface of the at least one dielectric is coupled to at least one surface of the at least one electrode.

Embodiment 45. The device of any one of embodiments 40-44, wherein the chip is comprised of: a base layer, an impedance layer, a metal adhesion layer, conduction layer, or any combination thereof.

Embodiment 46. The device of any one of embodiments 40-45, wherein the metal adhesion layer comprises a thickness of 10-300 nanometers (nm), and wherein the metal adhesion layer is comprised of titanium, tungsten, silver, copper, gold, or any combination thereof.

Embodiment 47. The device of any one of embodiments 40-46, wherein the impedance layer comprises a film deposited or thermally grown on a surface of the base layer, and wherein the impedance layer comprises a thickness of about 1 to about 100 micrometers (μm).

Embodiment 48. The device of any one of embodiments 40-47, wherein the base layer comprises a substrate surface comprised of a silicon wafer, glass wafer, silicon carbide, PET, Polyvinyl chloride (PVC), thermoplastics, ABS resin plastic, polyethylene plastics, polypropylene, polyimides (PIs), thermoplastic elastomers, a black colored plastic configured to minimize fluorescence, or any combination thereof.

Embodiment 49. The device of any one of embodiments 40-48, wherein the conduction layer comprises silver, copper, aluminum, zinc, lithium, brass, nickel, palladium, platinum, tungsten, tin, titanium, or any combination thereof.

Embodiment 50. The device of any one of embodiments 40-49, wherein the at least one electrode comprises a material of platinum, zinc, lithium, brass, nickel, palladium, tungsten, tin, titanium, gold, carbon, silver, aluminum, copper, rubidium, carbon, graphene, graphite, platinized carbon, gold alloys, silver alloys, carbon plated gold.

Embodiment 51. The device of any one of embodiments 40-50, wherein the at least one electrode comprises one or more ellipsoid shaped electrodes, wherein an anode electrode is adjacent to cathode electrode of the at least one electrode.

Embodiment 52. The device of any one of embodiments 40-51, wherein the ellipsoid shaped electrodes comprise a minor axis of about 5 μm to about 1 mm and a major axis of about 10 μm to about 2 mm for distinct axis and about 5 μm to about 2 mm for equal axis.

Embodiment 53. The device of any one of embodiments 40-52, wherein the surface comprises a surface of a 6, 12, 24, 48, 96, 384 or 1536 well plate.

Embodiment 54. The device of any one of embodiments 40-53, wherein the one or more particles comprise a diameter from about 1 nanometer to 50 micrometers.

Embodiment 55. The device of any one of embodiments 40-53, wherein the one or more particles comprise a diameter from about 500 micrometers to about 5 millimeters.

Embodiment 56. An electro fluidic device, comprising:

- a chip electrically coupled with at least one electrode attached to a surface of the chip,
- wherein the at least one electrode comprises a curved edge portion,
- wherein the curved edge portion comprises a tangential angle greater than 45 degrees for at least 25% of the curved edge portion, and
- wherein the curved edge portion of the electrode provides an increase of at least 5% of a capture area of the surface where one or more particles of a fluid sample are isolated relative to a similar electrode under similar conditions without the curved edge portion when the fluid sample is transported across the surface.

Embodiment 57. The device of embodiment 56, wherein the at least one electrode comprises a first electrode and a second electrode, wherein a peak of a curved edge portion of the first electrode is centered a distance from the nadir of a curved edge portion of the second electrode.

Embodiment 58. The device of embodiment 56 or embodiment 57, wherein the curved edge portion comprises a varying frequency and amplitude as a function of the length of the at least one electrode.

Embodiment 59. The device of any one of embodiments 56-58, wherein the at least one electrode comprises a non-curved edge portion, wherein the non-curved edge portion comprises a tangential angle of less than 5 degrees along the non-curved edge portion.

Embodiment 60. The device of any one of embodiments 56-59, wherein the surface comprises a surface of a flow cell.

Embodiment 61. The device of any one of embodiments 56-60, wherein the flow cell comprises one or more microfluidic channels.

Embodiment 62. The device of any one of embodiments 56-59, wherein the at least one electrode comprises one or more circular features disposed along a length of the curved edge portion of the at least one electrode.

Embodiment 63. The device of any one of embodiments 56-62, wherein the surface comprises a surface of a 6, 12, 24, 48, 96, 384 or 1536 well plate.

Embodiment 64. The device of any one of embodiments 56-63, wherein the curved edge portion comprises a non-zero derivative along a length of the curved edge portion.

Embodiment 65. The device of any one of embodiments 56-60, wherein the one or more circular features comprise a curved edge coaxial with the curved edge portion of the electrode.

Embodiment 66. The device of any one of embodiments 56-63, wherein the at least one electrode comprises a first electrode comprising a first curved edge portion, and a second electrode comprising a second curved edge portion.

Embodiment 67. The device of any one of embodiments 56-66, wherein the first electrode curved edge portion is at least about 5 μm distance from the second electrode curved edge portion, and wherein the distance is along a short axis of the chip.

Embodiment 68. The device of any one of embodiments 56-67, wherein the first electrode curved edge portion comprises up to about 20 degrees phase shift from the second electrode curved edge portion, and wherein the distance is along a long axis of the chip.

Embodiment 69. The device of any one of embodiments 56-68, wherein the first electrode comprises an angle of orientation of up to about 20 degrees from the second electrode.

Embodiment 70. The device of any one of embodiments 56-69, wherein the at least one electrode comprises a coating.

Embodiment 71. The device of any one of embodiments 56-70, wherein the coating comprises agarose, polyacrylamide, acrylamides, N-substituted acrylamides, N-substituted methacrylamides, methacrylamide chitosan, alginate, collagen, cellulose acetate, cellulose acetate butyrate, cellulose acetate phthalate, sol-gels, metal oxides, metal alkoxides, metal chlorides, organics nanoparticles, ceramic nanoparticles, aerogels, xerogels, xylogels, cryogels, carbogels, subgels, silicone hydrogels, conjugated polymers, polypyrrole (Ppy), polyethylene, polyaniline, polythiophene derivatives, poly(3,4-ethylenedioxythiophene) doped with poly (styrene sulfonate) (PEDOT:PSS), acrylamide based polymer, polythiophene based polymer, vinyl based polymer, any derivatives thereof, or any combination thereof.

Embodiment 72. The device of any one of embodiments 56-71, wherein the coating comprises, one or more particles.

Embodiment 73. The device of any one of embodiments 56-72, wherein the one or more particles comprise a diameter from about 1 nanometer to 50 micrometers.

Embodiment 74. The device of any one of embodiment 56-72, wherein the one or more particles comprise a diameter from about 500 micrometers to about 5 millimeters.

Embodiment 75. The device of any one of embodiments 56-74, wherein the one or more particles comprise dielectric particles, conductive particles, or a combination thereof.

Embodiment 76. The device of any one of embodiments 56-75, wherein the dielectric particles comprise particles with a relative permittivity range of 100 to 500,000,000 when measured at 1 kHz using conventional measuring methods.

Embodiment 77. The device of any one of embodiments 56-75, wherein the dielectric particles comprise particles with a relative permittivity range of 100,000 to 10,000,000 when measured at 1 kHz using conventional measuring methods.

Embodiment 78. The device of any one of embodiments 56-77, wherein the conductive particles comprise liquid metals, charged polymer R groups, graphene, gold, silver, copper, aluminum, platinum, metallic nanoparticles, polyacrylic acid, silicone hydrogels, conjugated polyelectrolytes, PEDOT-S, PTHS, p(g2T-TT), p(gNDI-g2T), NIPAM, PEDOT:PSS/guar slime (PPGS), ethylene glycol, poly ethylene glycol (PEG), any derivative thereof, or any combination thereof.

Embodiment 79. The device of any one of embodiments 56-78, wherein the conductive particles increase an electric field emitted by the at least one electrode by at least about 5%, at least about 10%, at least about 15%, at least about 20%, or at least about 25%.

Embodiment 80. The device of any one of embodiments 56-79, wherein the dielectric particles comprise poly 2-hydroxyethylmeth acrylate, (pHEMA), Polystyrene, polypropylene, conjugated polymer PVDF, polymers/copolymers—P(VDF-CTFE), P(VDF-TrFE), P(VDF-TrFE-CTFE), P (TFE-HFP), (PVDF-g-HEMA)], PARQ copolymers, cuPc, FePc, PTTEMA/PS, Polythiourea blends, PNIPam, polymer and ceramic particle blends, polymer and metal particle blends, ceramics, metal oxide, graphene oxide, silica beads, silicon dioxide, borosilicate, natural rubber beads, silicone rubber beads, 4-acryloylmorpholine (ACMO), 2-ethylhexyl acrylate (2-EHA), any derivates thereof, or any combination thereof.

Embodiment 81. The device of any one of embodiments 56-80, wherein the dielectric particles increase a surface area of an electric field emitted by the at least one electrode by at least about 5%, at least about 10%, at least about 15%, at least about 20%, or at least about 25%.

Embodiment 82. The device of any one of embodiments 56-81, wherein the one or more particles are suspended in a gel, hydrogel, or a combination thereof.

Embodiment 83. The device of any one of embodiments 56-82, wherein the one or more particles are provided on a top surface of the coating, within the coating, in contact with a surface of the at least one electrode, or a combination thereof.

Embodiment 84. The device of any one of embodiments 56-83, comprising one or more sensors electrically coupled to the chip.

Embodiment 85. The device of any one of embodiments 56-84, wherein the one or more sensors are integrated into the device or external to the device.

Embodiment 86. The device of any one of embodiments 56-85, comprising a passivation layer wherein a first surface of the passivation layer is in contact with a surface of the chip, and wherein a second surface of the passivation layer is in contact with a surface of the at least one electrode.

Embodiment 87. The device of any one of embodiments 56-86, wherein the passivation layer comprises a material of silicon dioxide, silicon nitride, silicon carbide, high-k dielectric polymers, high-k dielectric plastics, borosilicate glass, PSG, BPSG, or any combination thereof.

Embodiment 88. The device of any one of embodiments 56-87, wherein the passivation layer is coated with silicon dioxide on a surface of the passivation layer, and wherein the coating increases isolation of the one or more particles by at least about 5%, at least about 10%, at least about 15%, at least about 20%, or at least about 25%.

Embodiment 89. The device of any one of embodiments 56-88, comprising an enclosure configured to mechanically and electrically coupled to the chip, wherein the enclosure is in electrical communication with one or more processors.

Embodiment 90. The device of any one of embodiments 56-89, wherein the coating comprises a thickness up to about ⅓ a distance between a first electrode and a second electrode of the at least one electrode.

Embodiment 91. The device of any one of embodiments 56-90, wherein a surface of the chip is coupled to a first surface of an impedance layer, and wherein a second surface of the impedance layer is coupled to the at least one electrode.

Embodiment 92. The device of any one of embodiments 56-91, wherein the impedance layer is configured to reduce cross-talk between a first electrode and a second electrode of the at least one electrode by at least about 20%, at least about 30%, at least about 40%, at least about 50%, at least about 60%, at least about 70%, at least about 80%, at least about 90%, or at least about 95%.

Embodiment 93. The device of any one of embodiments 56-92, wherein the coating covers a surface of the passivation layer, the at least one electrode, or a combination thereof.

Embodiment 94. The device of any one of embodiments 56-93, wherein the one or more particles may be provided to a first area of the at least one electrode or a second area of the at least one electrode, and wherein the first area and the second area partially overlap or do not overlap.

Embodiment 95. The device of any one of embodiments 56-94, wherein a surface of the chip is electrically coupled to a first surface of a conduction layer, and wherein a second surface of the conduction layer is electrically coupled to the at least one electrode.

Embodiment 96. The device of any one of embodiments 56-95, wherein the chip is comprised of: a base layer, an impedance layer, a metal adhesion layer, conduction layer, or any combination thereof.

Embodiment 97. The device of any one of embodiments 56-96, wherein the metal adhesion layer comprises a thickness of 10-300 nanometers (nm), and wherein the metal adhesion layer is comprised of titanium, tungsten, silver, copper, gold, or any combination thereof.

Embodiment 98. The device of any one of embodiments 56-97, wherein the impedance layer comprises a film deposited or thermally grown on a surface of the base layer, and wherein the impedance layer comprises a thickness of about 1 to about 100 micrometers (μm).

Embodiment 99. The device of any one of embodiments 56-98, wherein the base layer comprises a substrate surface comprised of a silicon wafer, glass wafer, silicon carbide, PET, Polyvinyl chloride (PVC), thermoplastics, ABS resin plastic, polyethylene plastics, polypropylene, polyimides (PIs), thermoplastic elastomers, a black colored plastic configured to minimize fluorescence, or any combination thereof.

Embodiment 100. The device of any one of embodiments 56-99, wherein the conduction layer comprises silver, copper, aluminum, zinc, lithium, brass, nickel, palladium, platinum, tungsten, tin, titanium, or any combination thereof.

Embodiment 101. The device of any one of embodiments 56-100, wherein the at least one electrode comprises a material of platinum, zinc, lithium, brass, nickel, palladium, tungsten, tin, titanium, gold, carbon, silver, aluminum, copper, rubidium, carbon, graphene, graphite, platinized carbon, gold alloys, silver alloys, carbon plated gold.

Embodiment 102. The device of any one of embodiments 56-101, wherein a surface, an interior, or a combination thereof region of the coating may comprise one or more moieties configured to bind to nucleic acid molecules, and wherein the one or more moieties comprise antibodies, proteins.

Embodiment 103. The device of any one of embodiments 56-102, wherein the one or more moieties are configured to couple to one or more extracellular vesicles with attached or surface-level proteins, free-floating proteins, enzymes, phospholipids, or any combination thereof.

Embodiment 104. An electro fluidic device, comprising:

a chip electrically coupled with at least one electrode attached to a surface of the chip, wherein the at least one electrode comprises a curved edge portion, wherein the curved edge portion comprises an average tangential angle greater than 45 degrees along the curved edge portion, and wherein the curved edge portion of the electrode provides an increase of at least 5% of a capture area of the surface where one or more particles of a fluid sample are isolated relative to a similar electrode under similar conditions without the curved edge portion when the fluid sample is transported across the surface.

Embodiment 105. The device of embodiment 104, wherein the at least one electrode comprises a first electrode and a second electrode, wherein a peak of a curved edge portion of the first electrode is centered a distance from the nadir of a curved edge portion of the second electrode.

Embodiment 106. The device of embodiment 104 or embodiment 105, wherein the curved edge portion comprises a varying frequency and amplitude as a function of a length of the at least one electrode.

Embodiment 107. The device of any one of embodiments 104-106, wherein the at least one electrode comprises a non-curved edge portion, wherein the non-curved edge portion comprises a tangential angle of less than 5 degrees along the non-curved edge portion.

Embodiment 108. The device of any one of embodiments 104-107, wherein the at least one electrode comprises one or more circular features disposed along a length of the curved edge portion of the at least one electrode.

Embodiment 109. The device of any one of embodiments 104-108, wherein the surface comprises a surface of a 6, 12, 24, 48, 96, 384 or 1536 well plate.

Embodiment 110. The device of any one of embodiments 104-108, wherein the one or more circular features comprise a curved edge coaxial with the curved edge portion of the electrode.

Embodiment 111. The device of any one of embodiments 104-110, wherein the at least one electrode comprises a first electrode comprising a curved edge portion, and a second electrode comprising a curved edge portion.

Embodiment 112. The device of any one of embodiments 104-111, wherein the first electrode curved edge portion is at least about 5 μm distance from the second electrode curved edge portion, and wherein the distance is along a short axis of the chip.

Embodiment 113. The device of any one of embodiments 104-112, wherein the first electrode curved edge portion comprises up to about 20 degrees phase shift from the second electrode curved edge portion, and wherein the distance is along a long axis of the chip.

Embodiment 114. The device of any one of embodiments 104-113, wherein the first electrode comprises an orientation angle of up to about 20 degrees from the second electrode.

Embodiment 115. The device of any one of embodiments 104-114, wherein the surface comprises a surface of a flow cell.

Embodiment 116. The device of any one of embodiments 104-115, wherein the flow cell comprises one or more microfluidic channels.

Embodiment 117. The device of any one of embodiments 104-116, wherein the at least one electrode comprises a coating.

Embodiment 118. The device of embodiment 104-117, wherein the coating comprises agarose, polyacrylamide, acrylamides, N-substituted acrylamides, N-substituted methacrylamides, methacrylamide chitosan, alginate, collagen, cellulose acetate, cellulose acetate butyrate, cellulose acetate phthalate, sol-gels, metal oxides, metal alkoxides, metal chlorides, organics nanoparticles, ceramic nanoparticles, aerogels, xerogels, xylogels, cryogels, carbogels, subgels, silicone hydrogels, conjugated polymers, polypyrrole (Ppy), polyethylene, polyaniline, polythiophene derivatives, poly(3,4-ethylenedioxythiophene) doped with poly(styrene sulfonate) (PEDOT:PSS), acrylamide based polymer, polythiophene based polymer, vinyl based polymer, any derivatives thereof, or any combination thereof.

Embodiment 119. The device of embodiment 104-118, wherein the coating comprises, one or more particles.

Embodiment 120. The device of embodiment 104-119, wherein the one or more particles comprise dielectric particles, conductive particles, or a combination thereof.

Embodiment 121. The device of any one of embodiments 104-120, wherein the dielectric particles comprise particles with a relative permittivity range of 100 to 1,000,000 when measured at 1 kHz using conventional measuring methods.

Embodiment 122. The device of any one of embodiments 104-121, wherein the dielectric particles comprise particles with a relative permittivity range of 10,000 to 1,000,000 when measured at 1 kHz using conventional measuring methods.

Embodiment 123. The device of any one of embodiments 104-122, wherein the conductive particles comprise liquid metals, charged polymer R groups, graphene, gold, silver, copper, aluminum, platinum, metallic nanoparticles, polyacrylic acid, silicone hydrogels, conjugated polyelectrolytes, PEDOT-S, PTHS, p(g2T-TT), p(gNDI-g2T), NIPAM, PEDOT:PSS/guar slime (PPGS), ethylene glycol, poly ethylene glycol (PEG), any derivative thereof, or any combination thereof.

Embodiment 124. The device of any one of embodiments 104-123, wherein the conductive particles increase an electric field emitted by the at least one electrode by at least about 5%, at least about 10%, at least about 15%, at least about 20%, or at least about 25%.

Embodiment 125. The device of any one of embodiments 104-124, wherein the dielectric particles comprise poly 2-hydroxyethylmeth acrylate, (pHEMA), Polystyrene, polypropylene, conjugated polymer PVDF, polymers/copolymers—P(VDF-CTFE), P(VDF-TrFE), P(VDF-TrFE-CTFE), P(TFE-HFP), (PVDF-g-HEMA)], PARQ copolymers, cuPc, FePc, PTTEMA/PS, Polythiourea blends, PNIPam, polymer and ceramic particle blends, polymer and metal particle blends, ceramics, metal oxide, graphene oxide, silica beads, silicon dioxide, borosilicate, natural rubber beads, silicone rubber beads, 4-acryloylmorpholine (ACMO), 2-ethylhexyl acrylate (2-EHA), any derivates thereof, or any combination thereof.

Embodiment 126. The device of any one of embodiments 104-125, wherein the dielectric particles increase a surface area of an electric field emitted by the at least one electrode by at least about 5%, at least about 10%, at least about 15%, at least about 20%, or at least about 25%.

Embodiment 127. The device of any one of embodiments 104-126, wherein the one or more particles are suspended in a gel, hydrogel, or a combination thereof.

Embodiment 128. The device of any one of embodiments 104-127, wherein the one or more particles are provided on a top surface of the coating, within the coating, in contact with a surface of the at least one electrode, or a combination thereof.

Embodiment 129. The device of any one of embodiments 104-128, comprising one or more sensors electrically coupled to the chip.

Embodiment 130. The device of any one of embodiments 104-129, wherein the one or more sensors are integrated into the device or external to the device.

Embodiment 131. The device of any one of embodiments 104-130, comprising a passivation layer wherein a first surface of the passivation layer is in contact with a surface of the chip, and wherein a second surface of the passivation layer is in contact with a surface of the at least one electrode.

Embodiment 132. The device of any one of embodiments 104-131, wherein the passivation layer comprises a material of silicon dioxide, silicon nitride, silicon carbide, high-k dielectric polymers, high-k dielectric plastics, borosilicate glass, PSG, BPSG, or any combination thereof.

Embodiment 133. The device of any one of embodiments 104-132, wherein the passivation layer is coated with silicon dioxide on a surface of the passivation layer, and wherein the coating increases isolation of the one or more particles by at least about 5%, at least about 10%, at least about 15%, at least about 20%, or at least about 25%.

Embodiment 134. The device of any one of embodiments 104-133, comprising an enclosure configured to mechanically and electrically coupled to the chip, wherein the enclosure is in electrical communication with one or more processors.

Embodiment 135. The device of any one of embodiments 104-134, wherein the coating comprises a thickness up to about ⅓ a distance between a first electrode and a second electrode of the at least one electrode.

Embodiment 136. The device of any one of embodiments 104-135, wherein a surface of the chip is coupled to a first surface of an impedance layer, and wherein a second surface of the impedance layer is coupled to the at least one electrode.

Embodiment 137. The device of any one of embodiments 104-136, wherein the impedance layer is configured to reduce cross-talk between a first electrode and a second electrode of the at least one electrode by at least about 20%, at least about 30%, at least about 40%, at least about 50%, at least about 60%, at least about 70%, at least about 80%, at least about 90%, or at least about 95%.

Embodiment 138. The device of any one of embodiments 104-137, wherein the coating covers a surface of the passivation layer, the at least one electrode, or a combination thereof.

Embodiment 139. The device of any one of embodiments 104-138, wherein the one or more particles may be provided to a first area of the at least one electrode or a second area of the at least one electrode, and wherein the first area and the second area partially overlap or do not overlap.

Embodiment 140. The device of any one of embodiments 104-139, wherein a surface of the chip is electrically coupled to a first surface of a conduction layer, and wherein a second surface of the conduction layer is electrically coupled to the at least one electrode.

Embodiment 141. The device of any one of embodiments 104-140, wherein the chip is comprised of: a base layer, an impedance layer, a metal adhesion layer, conduction layer, or any combination thereof.

Embodiment 142. The device of any one of embodiments 104-141, wherein the metal adhesion layer comprises a thickness of 10-300 nanometers (nm), and wherein the metal adhesion layer is comprised of titanium, tungsten, silver, copper, gold, or any combination thereof.

Embodiment 143. The device of any one of embodiments 104-142, wherein the impedance layer comprises a film deposited or thermally grown on a surface of the base layer, and wherein the impedance layer comprises a thickness of about 1 to about 100 micrometers (μm).

Embodiment 144. The device of any one of embodiments 104-143, the base layer comprises a substrate surface comprised of a silicon wafer, glass wafer, silicon carbide, PET, Polyvinyl chloride (PVC), thermoplastics, ABS resin plastic, polyethylene plastics, polypropylene, polyimides (PIs), thermoplastic elastomers, a black colored plastic configured to minimize fluorescence, or any combination thereof.

Embodiment 145. The device of any one of embodiments 104-144, wherein the conduction layer comprises silver, copper, aluminum, zinc, lithium, brass, nickel, palladium, platinum, tungsten, tin, titanium, or any combination thereof.

Embodiment 146. The device of any one of embodiments 104-145, wherein the at least one electrode comprises a material of platinum, zinc, lithium, brass, nickel, palladium, tungsten, tin, titanium, gold, carbon, silver, aluminum, copper, rubidium, carbon, graphene, graphite, platinized carbon, gold alloys, silver alloys, carbon plated gold.

Embodiment 147. The device of any one of embodiments 104-146, wherein a surface, an interior, or a combination thereof region of the coating may comprise one or more moieties configured to bind to nucleic acid molecules, and wherein the one or more moieties comprise antibodies, proteins.

Embodiment 148. The device of any one of embodiments 104-147, wherein the one or more moieties are configured to couple to one or more extracellular vesicles with attached or surface-level proteins, free-floating proteins, enzymes, phospholipids, or any combination thereof.

Embodiment 149. The device of any one of embodiments 104-148, wherein the curved edge portion comprises a non-zero derivative along a length of the curved edge portion.

Embodiment 150. The device of any one of embodiments 104-149, wherein the one or more particles comprise a diameter from about 1 nanometer to 50 micrometers.

Embodiment 151. The device of any one of embodiments 104-149, wherein the one or more particles comprise a diameter from about 500 micrometers to about 5 millimeters.

Embodiment 152. An electro-fluidic system, comprising:

(a) a chip electrically coupled with at least one electrode attached to a surface of the chip, wherein the at least one electrode is coated, wherein the coating provides an increase of at least 5% of a surface area of the surface where one or more particles of a fluid sample are isolated relative to a similar electrode under similar conditions without the coating;

(b) a controller comprising one or more processors electrically coupled to the at least one electrode; and (c) a non-transient computer readable storage medium comprising software, wherein the software comprises executable instructions that, as a result of execution, cause the one or more processors of the controller to:

(i) receive an input, wherein the input indicates parameters of an electrical signal for isolating one or more particles of a fluid composition; and (ii) provide the electrical signal to the at least one electrode to isolate the one or more particles of the fluid composition on the surface of the device when the fluid composition is transported across the surface.

Embodiment 153. The system of embodiment 152, wherein the input comprises a user input, a detected signal from one or more sensors, or a combination thereof.

Embodiment 154. The system of embodiment 152 or embodiment 153, wherein the parameters of the electrical signal comprise frequency, amplitude, or a combination thereof parameters of the electrical signal.

Embodiment 155. The system of embodiment 152-154, wherein the frequency comprises one or more frequencies or a frequency range.

Embodiment 156. The system of embodiment 152-155, wherein the surface comprises a surface of a flow cell.

Embodiment 157. The system of embodiment 152-156, wherein the flow cell comprises one or more microfluidic channels.

Embodiment 158. The system of any one of embodiments 152-157, wherein the at least one electrode comprises a first electrode and a second electrode.

Embodiment 159. The system of any one of embodiments 152-158, wherein the electrical signal comprises a first electrical signal provided to the first electrode and a second electrical signal provided to the second electrode, wherein the first electrode and the second electrode partially or do not overlap.

Embodiment 160. The system of any one of embodiments 152-159, wherein the electrical signal comprises a first electrical signal provided at first time and a second electrical signal provided at a second time to the at least one electrode, wherein the first time precedes the second time.

Embodiment 161. The system of any one of embodiments 152-160, wherein the first electrical signal comprises a first frequency or frequency range and the second electrical signal comprises a second frequency or second frequency range.

Embodiment 162. The system of any one of embodiments 152-161, wherein the first frequency or frequency range and the second frequency or frequency range are the same.

Embodiment 163. The system of any one of embodiments 152-161, wherein the first frequency or frequency range and the second frequency or frequency range differ.

Embodiment 164. The system of any one of embodiments 152-163, wherein the coating comprises agarose, polyacrylamide, acrylamides, N-substituted acrylamides, N-substituted methacrylamides, methacrylamide chitosan, alginate, collagen, cellulose acetate, cellulose acetate butyrate, cellulose acetate phthalate, sol-gels, metal oxides, metal alkoxides, metal chlorides, organics nanoparticles, ceramic nanoparticles, aerogels, xerogels, xylogels, cryogels, carbogels, subgels, silicone hydrogels, conjugated polymers, polypyrrole (Ppy), polyethylene, polyaniline, polythiophene derivatives, poly(3,4-ethylenedioxythiophene) doped with poly (styrene sulfonate) (PEDOT:PSS), acrylamide based polymer, polythiophene based polymer, vinyl based polymer, any derivatives thereof, or any combination thereof.

Embodiment 165. The system of any one of embodiments 152-164, wherein the coating comprises, one or more particles.

Embodiment 166. The system of any one of embodiments 152-165, wherein the one or more particles comprise dielectric particles, conductive particles, or a combination thereof.

Embodiment 167. The system of any one of embodiments 152-166, wherein the dielectric particles comprise particles with a relative permittivity range of 100 to 1,000,000 when measured at 1 kHz using conventional measuring methods.

Embodiment 168. The system of any one of embodiments 152-167, wherein the dielectric particles comprise particles with a relative permittivity range of 10,000 to 1,000,000 when measured at 1 kHz using conventional measuring methods.

Embodiment 169. The system of any one of embodiments 152-167, wherein the conductive particles comprise liquid metals, charged polymer R groups, graphene, gold, silver, copper, aluminum, platinum, metallic nanoparticles, polyacrylic acid, silicone hydrogels, conjugated polyelectrolytes, PEDOT-S, PTHS, p(g2T-TT), p(gNDI-g2T), NIPAM, PEDOT:PSS/guar slime (PPGS), ethylene glycol, poly ethylene glycol (PEG), any derivative thereof, or any combination thereof.

Embodiment 170. The system of any one of embodiments 152-168, wherein the conductive particles increase an electric field emitted by the at least one electrode by at least about 5%, at least about 10%, at least about 15%, at least about 20%, at least about 25%.

Embodiment 171. The system of any one of embodiments 152-170, wherein the dielectric particles comprise poly 2-hydroxyethylmeth acrylate, (pHEMA), Polystyrene, polypropylene, conjugated polymer PVDF, polymers/copolymers—P(VDF-CTFE), P(VDF-TrFE), P(VDF-TrFE-CTFE), P(TFE-HFP), (PVDF-g-HEMA)], PARQ copolymers, cuPc, FePc, PTTEMA/PS, Polythiourea blends, PNIPam, polymer and ceramic particle blends, polymer and metal particle blends, ceramics, metal oxide, graphene oxide, silica beads, silicon dioxide, borosilicate, natural rubber beads, silicone rubber beads, 4-acryloylmorpholine (ACMO), 2-ethylhexyl acrylate (2-EHA), any derivates thereof, or any combination thereof.

Embodiment 172. The system of any one of embodiments 152-171, wherein the dielectric particles increase a surface area of an electric field emitted by the at least one electrode by at least about 5%, at least about 10%, at least about 15%, at least about 20%, or at least about 25%.

Embodiment 173. The system of any one of embodiments 152-172, wherein the one or more particles are suspended in a gel, hydrogel, or a combination thereof.

Embodiment 174. The system of any one of embodiments 152-173, wherein the one or more particles are provided on a top surface of the coating, within the coating, in contact with a surface of the at least one electrode, or a combination thereof.

Embodiment 175. The system of any one of embodiments 152-174, comprising one or more sensors electrically coupled to the chip.

Embodiment 176. The system of any one of embodiments 152-175, wherein the one or more sensors are integrated into the device or external to the device.

Embodiment 177. The system of any one of embodiments 152-176, comprising a passivation layer wherein a first surface of the passivation layer is in contact with a surface of the chip, and wherein a second surface of the passivation layer is in contact with a surface of the at least one electrode.

Embodiment 178. The system of any one of embodiments 152-177, wherein the passivation layer comprises a material of silicon dioxide, silicon nitride, silicon carbide, high-k dielectric polymers, high-k dielectric plastics, borosilicate glass, PSG, BPSG, or any combination thereof.

Embodiment 179. The system of any one of embodiments 152-178, wherein the passivation layer is coated with silicon dioxide on a surface of the passivation layer, and wherein the coating increases isolation of the one or more particles by at least about 5%, at least about 10%, at least about 15%, at least about 20%, or at least about 25%.

Embodiment 180. The system of any one of embodiments 152-179, comprising an enclosure configured to mechanically and electrically coupled to the chip, wherein the enclosure is in electrical communication with one or more processors.

Embodiment 181. The system of any one of embodiments 152-180, wherein the coating comprises a thickness up to about ⅓ a distance between a first electrode and a second electrode of the at least one electrode.

Embodiment 182. The system of any one of embodiments 152-181, wherein a surface of the chip is coupled to a first surface of an impedance layer, and wherein a second surface of the impedance layer is coupled to the at least one electrode.

Embodiment 183. The system of any one of embodiments 152-182, wherein the impedance layer is configured to reduce cross-talk between a first electrode and a second electrode of the at least one electrode by at least about 20%, at least about 30%, at least about 40%, at least about 50%, at least about 60%, at least about 70%, at least about 80%, at least about 90%, or at least about 95%.

Embodiment 184. The system of any one of embodiments 152-183, comprising a passivation layer, wherein at least one surface of the passivation layer is coupled to at least one surface of the at least one electrode.

Embodiment 185. The system of any one of embodiments 152-184, wherein the coating covers a surface of the passivation layer, the at least one electrode, or a combination thereof.

Embodiment 186. The system of any one of embodiments 152-185, wherein the one or more particles may be provided to a first area of the at least one electrode or a second area of the at least one electrode, and wherein the first area and the second area partially overlap or do not overlap.

Embodiment 187. The system of any one of embodiments 152-186, wherein a surface of the chip is electrically coupled to a first surface of a conduction layer, and wherein a second surface of the conduction layer is electrically coupled to the at least one electrode.

Embodiment 188. The system of any one of embodiments 152-187, wherein the chip is comprised of: a base layer, a resistance layer, a metal adhesion layer, conduction layer, or any combination thereof.

Embodiment 189. The system of any one of embodiments 152-188, wherein the metal adhesion layer comprises a thickness of 10-300 nanometers (nm), and wherein the metal adhesion layer is comprised of titanium, tungsten, silver, copper, gold, or any combination thereof.

Embodiment 190. The system of any one of embodiments 152-189, wherein the impedance layer comprises a film deposited or thermally grown on a surface of the base layer, and wherein the impedance layer comprises a thickness of about 1 to about 100 micrometers (μm).

Embodiment 191. The system of any one of embodiments 152-190, wherein the base layer comprises a substrate surface comprised of a silicon wafer, glass wafer, silicon carbide, PET, Polyvinyl chloride (PVC), thermoplastics, ABS resin plastic, polyethylene plastics, polypropylene, polyimides (PIs), thermoplastic elastomers, a black colored plastic configured to minimize fluorescence, or any combination thereof.

Embodiment 192. The system of any one of embodiments 152-191, wherein the conduction layer comprises silver, copper, aluminum, zinc, lithium, brass, nickel, palladium, platinum, tungsten, tin, titanium, or any combination thereof.

Embodiment 193. The system of any one of embodiments 152-192, wherein the at least one electrode comprises a material of platinum, zinc, lithium, brass, nickel, palladium, tungsten, tin, titanium, gold, carbon, silver, aluminum, copper, rubidium, carbon, graphene, graphite, platinized carbon, gold alloys, silver alloys, carbon plated gold.

Embodiment 194. The system of any one of embodiments 152-193, wherein a surface, an interior, or a combination thereof region of the coating may comprise one or more moieties configured to bind to nucleic acid molecules, and wherein the one or more moieties comprise antibodies, proteins.

Embodiment 195. The system of any one of embodiments 152-194, wherein the one or more moieties are configured to couple to one or more extracellular vesicles with attached or surface-level proteins, free-floating proteins, enzymes, phospholipids, or any combination thereof.

Embodiment 196. The system of any one of embodiments 152-195, wherein the at least one electrode comprises one or more ellipsoid shaped electrodes, wherein an anode electrode is adjacent to cathode electrode of the at least one electrode.

Embodiment 197. The system of any one of embodiments 152-195, wherein the ellipsoid shaped electrodes comprise a minor axis of about 5 μm to about 1 mm and a major axis of about 10 μm to about 2 mm for distinct axis and about 5 μm to about 2 mm for equal axis.

Embodiment 198. The system of any one of embodiments 152-195, wherein the at least one electrode comprises a curved edge portion, wherein the curved edge portion comprises an average tangential angle greater than 45 degrees along the curved edge portion.

Embodiment 199. The system of any one of embodiments 152-195, wherein the at least one electrode comprises a curved edge portion, wherein the curved edge portion comprises a tangential angle greater than 45 degrees for at least 25% of the curved edge portion.

Embodiment 200. The system of any one of embodiments 152-199, wherein a peak of a curved edge portion of the first electrode is centered a distance from the nadir of a curved edge portion of the second electrode.

Embodiment 201. The system of any one of embodiments 152-195 or 198-200, wherein the curved edge portion comprises a varying frequency and amplitude as a function of a length of the at least one electrode.

Embodiment 202. The system of any one of embodiments 152-195 or 198-201, wherein the at least one electrode comprises a non-curved edge portion, wherein the non-curved edge portion comprises a tangential angle of less than 5 degrees along the non-curved edge portion.

Embodiment 203. The system of any one of embodiments 152-195 or 198-202, wherein the at least one electrode comprises one or more circular features disposed along a length of the curved edge portion of the at least one electrode.

Embodiment 204. The system of any one of embodiments 152-195 or 198-203, wherein the one or more circular features comprise a curved edge coaxial with the curved edge portion of the electrode.

Embodiment 205. The system of any one of embodiments 152-195 or 198-204, wherein the at least one electrode comprises a first electrode comprising a first curved edge portion, and a second electrode comprising a second curved edge portion.

Embodiment 206. The system of any one of embodiments 152-195 or 198-205, wherein the first electrode first curved edge portion is at least about 5 μm distance from the second electrode second curved edge portion, and wherein the distance is along a short axis of the chip.

Embodiment 207. The system of any one of embodiments 152-195 or 198-206, wherein the first electrode first curved edge portion comprises up to about 20 degrees phase shift from the second electrode second curved edge portion, and wherein the distance is along a long axis of the chip.

Embodiment 208. The system of any one of embodiments 152-195 or 198-207, wherein the first electrode comprises an orientation angle of up to about 20 degrees from the second electrode.

Embodiment 209. The system of any one of embodiments 152-208, wherein the surface comprises a surface of a 6, 12, 24, 48, 96, 384 or 1536 well plate.

Embodiment 210. The system of any one of embodiments 152-209, wherein the one or more particles comprise a diameter from about 1 nanometer to 50 micrometers.

Embodiment 211. The system of any one of embodiments 152-209, wherein the one or more particles comprise a diameter from about 500 micrometers to about 5 millimeters.

What is claimed is:

1. An electro fluidic device comprising:

a chip; and an electrode attached to and electrically coupled with the chip, the electrode comprising a curved edge having a tangential angle greater than 45 degrees along at least 25% of the curved edge, wherein the curved edge of the electrode provides the electro fluidic device with a capture area that includes a capture surface and is configured to isolate one or more particles from a fluid sample flowing on the capture surface of the capture area of the electrode upon receiving an electrical signal from a controller.

2. The electro fluidic device of claim 1, wherein the capture surface comprises a coating.

3. The electro fluidic device of claim 1, further comprising a microfluidic channel defining a flow cell, and wherein the capture area is disposed on the microfluidic channel.

4. The electro fluidic device of claim 1, further comprising a first well comprising a well inner surface comprising a well side surface and a well bottom surface, wherein the capture area is on the well inner surface.

5. The electro fluidic device of claim 4 further comprising 5, 11, 23, 47, 95, 383 or 1535 additional wells defining a 6-, 12-, 24-, 48-, 96-, 384-, or 1536-well plate, respectively.

6. The electro fluidic device of claim 4 wherein the electrode is on the well side surface.

7. The electro fluidic device of claim 4, wherein the electrode is on the well bottom surface.

8. The electro fluidic device of claim 1, wherein the curved edge selected from the group consisting of a circular shape, a cosine shape, a barrel shape, a pill shape, a dome shape, a bell curve shape and a cylindrical shape, or a combination thereof.

9. The electro fluidic device of claim 1, wherein the electrode comprises a material selected from the group consisting of platinum, zinc, lithium, brass, nickel, palladium, tungsten, tin, indium tin oxide, titanium, gold, silver, aluminum, copper, rubidium, carbon, graphene, graphite, platinized carbon, gold alloys, silver alloys, metal nanowires, and carbon plated gold or a combination thereof.

10. The electro fluidic device of claim 1, wherein the chip comprises:
a base layer,
an impedance layer,
a metal adhesion layer, and
a conduction layer, or a combination thereof.

11. The electro fluidic device of claim 10, wherein the base layer comprises a substrate selected from the group consisting of a silicon wafer, a glass wafer, silicon carbide, Polyvinyl chloride, a thermoplastic, a resin plastic, a polyethylene plastic, polypropylene, a polyimides, a thermoplastic elastomer, and a black colored plastic configured to minimize fluorescence, or a combination thereof.

12. The electro fluidic device of claim 1, wherein electrode comprises an electrode surface, the chip comprises a chip surface and the electro fluidic device further comprises a passivation layer comprising a first passivation layer surface in contact with the chip surface, and a second passivation layer surface layer is in contact with the electrode surface.

13. The electro fluidic device of claim 12, wherein the passivation layer comprises a material selected from the group consisting of a phthalocyanine, a polythiourea blend, a polyimide, a ceramic nanoparticle, a polymer and ceramic particle blend, a polymer and metal particle blend, a ceramic, graphene oxide, a dielectric polymer, a dielectric plastic, or a combination thereof.

14. The electro fluidic device of claim 12, wherein the passivation layer includes at least a passivation layer portion covered with a coating, and wherein the electrode includes an electrode surface optionally covered by the coating.

15. The electro fluidic device of claim 14, wherein the coating comprises agarose, polyacrylamide, acrylamide, an N-substituted acrylamide, an N-substituted methacrylamide, methacrylamide chitosan, alginate, collagen, cellulose acetate, cellulose acetate butyrate, cellulose acetate phthalate, a sol-gel, a metal oxide, a metal alkoxide, a metal chloride, an organic nanoparticle, a ceramic nanoparticle, an aerogel, a xerogel, a xylogel, a cryogel, a carbogel, a subgel, a silicone hydrogel, a conjugated polymer, polypyrrole, polyethylene, polyaniline, polythiophene derivatives, poly (3,4-ethylenedioxythiophene) doped with poly(styrene sulfonate), acrylamide based polymer, polythiophene based polymer, and vinyl based polymer, or a combination thereof.

16. The electro fluidic device of claim 14, wherein the coating comprises a plurality of insulative particles, a plurality of conductive particles, and a plurality of semiconductive particles or a combination thereof.

17. The electro fluidic device of claim 16, wherein the plurality of conductive particles comprise a liquid metal, a charged polymer R group, graphene, gold, silver, copper, aluminum, platinum, a metallic nanoparticle, polyacrylic acid, a silicone hydrogel, indium tin oxide, a conjugated polyelectrolyte, , ethylene glycol, and poly ethylene glycol , or a combination thereof.

18. The electro fluidic device of claim 16, wherein the plurality of insulative particles comprise polypropylene, a conjugated polymer, a Polythiourea blend, a polymer and ceramic particle blend, a polymer and metal particle blend, a ceramic, a metal oxide, a silica bead, borosilicate, a natural rubber bead, a silicone rubber bead, 4-acryloylmorpholine, and 2-ethylhexyl acrylate, or a combination thereof.

19. The electro fluidic device of claim 1, wherein curved surface is configured to isolate the one or more particles using electrostrictive hydrodynamic forces.

20. The electro fluidic device of claim 1 or 12, further comprising a conduction layer comprising a first conduction layer surface and a second conduction layer surface and the chip comprises a chip surface wherein the chip surface is electrically coupled to the first conduction layer surface , and wherein the second conduction layer surface is electrically coupled to the electrode.

21. The electro fluidic device of claim 20, wherein the conduction layer comprises gold, silver, copper, aluminum, zinc, lithium, brass, nickel, palladium, platinum, tungsten, tin, and titanium, or a combination thereof.

22. The electro fluidic device of claim 1, further comprising a sensor electrically coupled to the chip.

23. The electro fluidic device of claim 1, wherein the electrode is configured to emit a direct current signal or an alternating current signal or the alternating current signal superimposed onto the direct current signal.

24. The electro fluidic device of claim 1, wherein the curved edge has a 3D tunnel shape, a dome shaped, an upside-down J shape, a spherical shape, a hemispherical shape, a spheroid shape or ellipsoid shape or a combination thereof.

25. An electro fluidic system comprising:
the electro fluidic device according to claim 1; and
a controller comprising a processor electrically coupled to the electrode and configured to:
receive an input indicative of one or more parameters of an electrical signal for isolating one or more particles of a fluid composition; and
provide the electrical signal to the electrode such that the one or more particles of the fluid composition are isolated on the capture surface of the electro fluidic device when the fluid composition is transported across the capture surface.

26. The electro fluidic system of claim 25, wherein the input comprises a user input, a detected signal from a sensor, or a both.

27. The electro fluidic system of claim 25 and wherein the one or more parameters comprise a time, a frequency, a frequency range, a periodicity, an amplitude, and a phase shift, or a combination thereof.

* * * * *